(12) United States Patent
Breed et al.

(10) Patent No.: US 6,885,968 B2
(45) Date of Patent: Apr. 26, 2005

(54) VEHICULAR EXTERIOR IDENTIFICATION AND MONITORING SYSTEM-AGRICULTURAL PRODUCT DISTRIBUTION

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 10/754,014

(22) Filed: Jan. 8, 2004

(65) Prior Publication Data

US 2004/0148057 A1 Jul. 29, 2004

Related U.S. Application Data

(63) Continuation-in-part of application No. 09/851,362, filed on May 8, 2001.
(60) Provisional application No. 60/202,424, filed on May 8, 2000, and provisional application No. 60/442,204, filed on Jan. 24, 2003.

(51) Int. Cl.[7] ............................ G06F 15/00; G01S 13/00
(52) U.S. Cl. ........................ 702/143; 702/142; 702/149; 702/159
(58) Field of Search .............................. 702/141, 142, 702/143, 149, 159; 700/242, 263; 342/70, 109, 112, 115

(56) References Cited

U.S. PATENT DOCUMENTS

| | | | |
|---|---|---|---|
| 4,016,566 A | * | 4/1977 | Fujiki ........................... 342/52 |
| 4,340,299 A | | 7/1982 | Mongeon |
| 4,713,665 A | | 12/1987 | Phelan |
| 4,728,954 A | | 3/1988 | Phelan |
| 4,893,287 A | | 1/1990 | Stratton |
| 4,942,558 A | | 7/1990 | Hiniker |
| 4,942,765 A | | 7/1990 | Hiniker |
| 4,961,643 A | | 10/1990 | Sakai |
| 4,990,791 A | | 2/1991 | Nishi |
| 5,054,003 A | | 10/1991 | Kobayashi |
| 5,097,453 A | | 3/1992 | Kobayashi |
| 5,100,230 A | | 3/1992 | Brownrigg |
| 5,148,409 A | | 9/1992 | Kobayashi |
| 5,239,516 A | | 8/1993 | Kimura |
| 5,287,329 A | | 2/1994 | Ikeda |
| 5,475,620 A | | 12/1995 | Kuzuya |
| 5,491,648 A | | 2/1996 | Kuzuya |
| 5,621,413 A | | 4/1997 | Lempkowski |
| 5,621,514 A | | 4/1997 | Paranto |
| 5,696,515 A | | 12/1997 | Zyren |
| 6,230,107 B1 | | 5/2001 | Yamamoto |
| 6,285,938 B1 | * | 9/2001 | Lang et al. ................... 701/50 |
| 6,445,338 B1 | | 9/2002 | Ohkubo |

FOREIGN PATENT DOCUMENTS

| CA | 2221403 | 5/1999 |
|---|---|---|
| WO | WO 00/79784 | 12/2000 |

OTHER PUBLICATIONS

High Dynamic Range Imaging: Spatially Varying Pixel Exposures Shree K. Nayar, Tomoo Mitsunaga 2000.

* cited by examiner

Primary Examiner—Bryan Bui
(74) Attorney, Agent, or Firm—Brian Roffe

(57) ABSTRACT

A vehicle including a ground speed sensor arranged to detect the speed of travel of the vehicle on the ground and including a wave transmitter arranged to transmit waves toward the ground, a wave receiver arranged to received waves reflected from the ground and a processor coupled to the transmitter and receiver to determine the speed of travel based on the transmitted waves and received waves. The waves are transmitted in pulses or modulated such that the processor is able to determine the distance between a wave-transmission and reception point and the ground (by time of flight for ultrasonic and electromagnetic waves or phase difference-for electromagnetic waves) and the velocity of the vehicle (using Doppler analysis).

60 Claims, 29 Drawing Sheets

US 6,885,968 B2

VEHICULAR EXTERIOR IDENTIFICATION AND MONITORING SYSTEM—AGRICULTURAL PRODUCT DISTRIBUTION

CROSS-REFERENCE TO RELATED APPLICATION

This application claims the priority under 35 U.S.C. §119(e) of U.S. provisional patent application Ser. No. 60/442,204 filed Jan. 24, 2003.

This application is a continuation-in-part of U.S. patent application Ser. No. 09/851,362 filed May 8, 2001 which claims the priority under 35 U.S.C. §119(e) of U.S. provisional patent application Ser. No. 60/202,424 filed May 8, 2000.

FIELD OF THE INVENTION

The present invention relates generally to a system for agricultural product distribution and harvesting machines, such as cotton pickers, air seeders, precision planters and sprayers, and more specifically methods and system which allow for a more accurate distribution of agricultural products based on a more accurate knowledge of the velocity of the distribution vehicle.

The present invention additionally has application in the control of construction equipment and other on and off road vehicles that can benefit from accurate velocity information.

BACKGROUND OF THE INVENTION

Agricultural Product Distribution Machines

The following description, and similar descriptions elsewhere in this disclosure, of agricultural product distribution machines is adapted from U.S. Pat. No. 6,285,938, which is incorporated herein in its entirety by reference.

Agricultural machines used for applying product over a field will be referred to herein as agricultural product distribution machines and include such machines as seeders, fertilizers, planters, sprayers, and the like. Such machines attempt to apply the product to be distributed evenly across an entire field. With a fertilizer-distributing machine, for example, it is important that each area of the field receive the required amount of fertilizer as accurately as possible. The practice of averaging product requirements for an entire field without paying close attention to the evenness with which the product is distributed is common. However, averaging product requirements may result in over-fertilizing some areas of the field and under-fertilizing others. Sophisticated systems, such as supplied by Beeline of Australia, exist based on accurate mapping and differential Global Positioning Systems (DGPS) that permit the intentional uneven distribution of such products based on the measured needs of each area of the field but are beyond the scope of this invention. The goal of this invention is to apply an even distribution of product without taking into consideration the variation in needs from one area to another.

Even without a DGPS based system, technological advances now enable farmers to obtain greater accuracy in product application. For example, yield monitors used in association with a combine measure the amount of grain being harvested as the grain is sent to a bin in the combine. The actual yield of the best and poorest areas can be observed on the monitor. In addition, GPS can provide information as to the approximate position of the machinery in the field. Yield monitors combined with a GPS receiver, are used to plot yield maps and identify reasons why certain significantly sized areas have low or high yields, which may be related to nutrient differences. With this information, farmers can then determine whether a certain part of the field might need more fertilizer, less fertilizer or should be treated with a different farming method. Farmers can then apply fertilizer, herbicides and seed at the rate needed for a particular soil site. The DGPS system as manufactured by Beeline permits this process to take place much more accurately and for much smaller areas.

Variable rate product delivery systems have been developed to allow operators of agricultural product distribution machines to vary the application rate of the product. Several manufacturers of agricultural equipment offer variable rate drive mechanisms on their machines. One variable rate hydraulic drive control, described in Canadian patent application No. 2,221,403, assigned to Flex-Coil Ltd., of California, essentially consists of an electric motor that provides a rotational drive rate to a hydraulic motor which controls a product metering mechanism. The electric motor input varies with ground speed, thus providing a consistent rate of metering product onto the field based on the accuracy of the ground speed sensor. If the wheels of the tractor slip at a particular area in the field and this is not detected, too much product will be metered onto that area of the field.

A typical agricultural seeder includes a product bin and a product distribution system. The product distribution system generally includes a series of hoses and a manifold. Product is dispensed from the bin into the distribution system through a dispensing mechanism, such as a metering wheel, at a rate related to the desired application rate of the product onto the field. The dispensing mechanism is typically driven by a variable rate drive system. Again, the accuracy of seed distribution is based on the accuracy of the ground speed sensor.

All of the above prior art systems have a product dispensing rate related to the ground speed or forward speed of the agricultural product distribution machine. As the agricultural product distribution machine travels across the field, a sensor system detects the ground speed. The variable rate drive mechanism drives the dispensing mechanism accordingly. As the ground speed varies, the dispensing rate varies to maintain a consistent (constant) distribution of product.

Doppler Vehicle Ground Speed Sensors

The following background, plus other general descriptions below, on vehicle speed sensors was adapted from U.S. Pat. No. 6,230,107, which is incorporated herein in its entirety by reference.

To eliminate errors caused by wheel slip, for example, a common method of measuring vehicle speed relative to the ground uses Doppler principles. Such a sensor system emits ultrasonic or electromagnetic waves from the vehicle toward the ground at a specified beam angle θ and receives waves that have been reflected from the ground. The difference in frequency Δf between the transmitted and received waves, the Doppler shift, is calculated to give the vehicle velocity V relative to the ground.

$$V = C\Delta f/(2f \cos(\theta)) \quad (1)$$

where C is wave propagation velocity in the medium.

This prior art vehicle speed determination system, however, suffers from the problem that when the speed of a vehicle is sensed by the Doppler sensor mounted on the vehicle body, vehicle pitching motion, for example, changes the wave transmission angle θ decreasing the sensing accuracy. Therefore, as pointed out in the '107 patent, a measure of at least the pitching angle is desirable. This is solved by the '107 patent through the use of an angular rate sensor or gyroscope. However, such a sensor only works to compensate for vehicle pitch. When the velocity sensor is mounted high on the vehicle, where it is protected from contamination, it will frequently receive reflections from the ground that are at a significant distance from the vehicle and can therefore be at a significantly different altitude and thus at a significantly different effective θ thus adding additional errors to the calculation.

The problem is exacerbated in the construction industry when the Doppler sensor is mounted at a level low on the vehicle such that there is a strong likelihood that mud may stick to the sensor or the sensor may get damaged by striking rocks etc. Thus, such sensors should be mounted high on the vehicle where the ground that reflects the waves can be at a significantly different altitude from the vehicle that may be bulldozing the field, for example. However, if these problems are solved by mounting a Doppler radar-based velocity sensor high on the vehicle there can be a problem where the RF radiation exceeds permitted levels or interfere with similar systems on other vehicles at the same worksite. Also, laser radar-based systems are to be avoided due to the difficulty of keeping the lens of such laser radar-based systems clean.

Pulsed Ultrasonic Vehicle Speed Sensors

Thus, the ground speed sensors used for agricultural and construction equipment control systems include Doppler radar, Doppler laser radar, Doppler ultrasonic and wheel speed sensors. As discussed in U.S. Pat. No. 4,942,558, which is incorporated herein in its entirety by reference, such sensor systems can also be degraded, depending on the particular technology used and the mounting location on the vehicle, by sensor crosstalk, vehicle vibration, temperature effects, sensing time at low speeds, blowing grass, wheel slippage and other factors that are eliminated or minimized by the teachings of this invention. Although the '558 patent attempts to solve some of these problems, its main contribution is the use of an ultrasonic transducer in the pulse mode. However, this is done to reduce system cost and it is not used to determine the distance to the reflecting surface as is taught here.

Other Relevant Prior Art Vehicle Ground Speed Sensors

U.S. Pat. No. 4,713,665 describes an ultrasonic ground speed sensor that eliminates cross talk between a transmitting and receiving transducer. This problem is solved herein when ultrasonic sensors are used by using a single sensor for both transmitting and receiving and controlling the ringing of the transducer as disclosed in commonly assigned U.S. Provisional Patent application Ser. No. 10/190,805 filed Jul. 30, 2002, which in incorporated herein by reference.

U.S. Pat. No. 4,728,954 describes an ultrasonic sensor that operates in the continuous mode and uses the Doppler frequency shift for determining vehicle velocity. No attempt is made to compensate for vehicle pitch or for changes in ground elevation.

U.S. Pat. No. 4,942,765 uses a single transducer for both transmitting and receiving ultrasonic waves and operates in the pulse mode. Velocity is measured by the Doppler frequency shift and no attempt is made to compensate for vehicle pitching. The sensor is mounted low on the tractor where it can be subjected to contamination and thus must be periodically cleaned when operated in many common environments. A temperature sensor is provided to measure the air temperature and thus to compensate for the variation in the speed of sound with temperature.

U.S. Pat. No. 5,054,003 describes a continuous ultrasonic Doppler velocity sensor optimized for a vehicle traveling on a road by transmitting a particular wavelength. No attempt is made to measure the distance to the road surface and to compensate for vehicle pitching.

In the above-mentioned prior art, the sensor is not mounted high on the vehicle where it is protected from contamination and where the effective angle between the sensing beam and the ground is determined by measuring the distance from the sensor to the reflection point on the ground thereby permitting compensation for both pitch and ground slope and altitude variation. Since this angle is a critical factor in the Doppler velocity equation, all prior art systems will suffer from this inaccuracy.

The present invention solves this problem by measuring the distance to the ground using either a time of flight measurement or a phase measurement system as described in detail below. By practicing this invention, therefore, the accuracy with which agricultural product, for example, can be distributed is significantly enhanced thereby reducing the total product used, increasing the crop yield and yielding many other advantages. These advantages flow from an improved accuracy in the vehicle ground speed without going to the expense of installing a DGPS such as based on the Beeline system. Thus, many advantages of the Beeline system are achieved at much lower cost.

Although the above-described system leads to the lowest cost series of solutions to the ground speed determination, and the Beeline the highest cost, there is also an intermediate solution that will now be described.

The Beeline solution requires that a differential GPS (DGPS) correction signal be available to the vehicle system such that the vehicle can determine its position, and hence its velocity, to within a few centimeters or centimeters per second. The system uses a GPS receiver, a DGPS receiver and an inertial measurement unit (IMU) that contains three gyroscopes and three accelerometers. If only a precise velocity is required, then the GPS signals can be used in a differential mode without differential corrections since the errors in the GPS signals change slowly with time. Thus, using conventional GPS, the change in the position of the vehicle can be known almost as accurately as with the Beeline system at a fraction of the cost.

Similarly, for position and velocity determination in between the GPS signal receptions (once per second) instead of using an IMU, a single accelerometer can be used, greatly simplifying the inertial hardware and software. A Kalman filter can still be used to calibrate the accelerometer every second and the resulting linear velocity is now known almost as accurately as the Beeline system without the need for DGPS subscription costs and at a hardware and software cost that is a small fraction of the Beeline system.

The system can be upgraded by adding more inertial devices (accelerometers and gyroscopes) and the vehicle system can become its own DGPS station if precisely surveyed reference locations are known on the field. Such locations can be magnetic markers that permit the vehicle to exactly know its position whenever it passes over the marker. Other methods of periodic precise positioning are also applicable as disclosed in U.S. patent application Ser. No. 10/190,805 filed Jul. 8, 2002, which is incorporated herein by reference in its entirety.

Vehicle Exterior Monitoring Technology

The sensing of vehicle velocity for a farm tractor is part of the general technology of monitoring an environment surrounding a vehicle that may be traveling on a road or in a field. This technology will now be discussed in some detail.

During the process of operating a motor vehicle, it is necessary for the operator to obtain information concerning the proximity of various dangerous objects and their relative velocities for the operator to make sound driving decisions, such as whether or not there is enough time to change lanes, for example. This information should be obtained from the area that completely surrounds the vehicle. In order to gather this information, the operator is frequently required to physically turn his or her head to check for occupancy of a blind spot, for example. In taking such an action, the attention of the driver is invariably momentarily diverted from control of the vehicle.

For an automobile, the blind spots typically occur on either side of the vehicle starting approximately at the position of the driver and extending backwards sometimes beyond-the rear of the vehicle. These blind spots depend heavily on the adjustment of the angle of the mirror. Different areas are in the blind spot depending on the mirror angle. Since it is in general not known whether or how the mirror is set for the particular vehicle, a blind spot detector must detect objects anywhere along the side of the vehicle regardless of the mirror setting.

The problem is more complicated for trucks, enclosed farm tractors and construction equipment that not only can have much larger blind spots along the sides of the vehicle but also can have a serious blind spot starting in front of the right front bumper of the vehicle and extending beyond the right door. This blind spot is particularly serious with trucks and even cars in urban driving where small vehicles, motorcycles, pedestrians, bicycles etc. in this area can be completely hidden from the view of the driver.

Several systems have been designed which attempt to rotate the mirror to pick up or allow a driver to visually see the object in the blind spot. This is difficult to do without knowledge of the location of the eyes of the driver. For most systems that do not incorporate an occupant sensor capable of determining the location of the driver's eyes, there is a risk that the mirrors will be positioned wrongly thus exacerbating rather than helping the blind spot detection problem. Also, a system that rotates the mirror will make the driver nervous since he or she will not be able to see the scene that he or she is accustomed to seeing in the mirror.

Several systems have also been proposed that display a view of the blind spot, using a video camera, onto a display either on the instrument panel or on the windshield as a "heads-up" display. Any system that displays a picture of the object on the screen that is inside the vehicle is also going to confuse the driver since he or she will not be able to relate that picture to an object such as another vehicle in the blind spot on the side of the host vehicle. Additionally, the state of the art of such displays does not provide equally observable displays at night or in bright sunlight. Thus, displays on a CRT or LCD are not natural and it is difficult for a driver to adjust to these views. The lighting of the views is too faint when sunlight is present and too bright when the vehicle is operating at night or the brightest object is not the object of interest and can be difficult to see in the presence of brighter objects. Therefore, none of the prior art television-like displays can replace the actual visual view of the occupant.

Other systems that are based on radar or ultrasound have also not been widely adopted for automobile blind spot detection for reasons related to cost, accuracy and false alarms. Both systems use beams of energy that can become several feet in diameter by the time that they reach the edges of the blind spot and thus can confuse a large vehicle or a guardrail, sign, parked car etc. two lanes over with a vehicle in the blind spot. Some such systems attempt to filter threatening objects from non-threatening objects based on the relative speed of the object and thus err by eliminating a significant number of such threats. A tradeoff exists in all such systems where, if all threatening objects are made known to the driver, the false alarm rate becomes unacceptable and the driver soon loses confidence in the system and ignores it. If the false alarm rate is kept low, many dangerous situations are ignored.

Thus, all the prior art systems discussed above have serious failure modes. The lesson is that if a vision-based system such as the rear view mirror is going to be replaced with a non-vision system then the non-vision system must be almost as good as the vision system.

Some other problems arise when a vehicle strays into the lane of the host vehicle. Most systems will fail to warn the operator and thus an accident can result. As such, the blind spot problem is really two problems relating to the motion of the potentially striking vehicle and the potentially struck vehicle.

The problem that is addressed by the present invention is to determine what information is needed about the object in the blind spot and then the manner in which this information is presented to the vehicle operator so as to eliminate accidents caused by the failure of the operator to see such an object. This information includes the accurate location of the object relative to the host vehicle, its size, its relative and/or absolute speed, and the identity or kind of object. This information must be known regardless of the changes in road geometry such as steep hills and sharp curves or changes in environmental conditions. Naturally, the system must be low cost if it is going to be purchased by the public.

Studies have shown that giving the driver an extra half-second could eliminate as many as 50 percent of the accidents. Thus, the risk of an accident must also be communicated to the operator in a timely fashion to permit the driver to take evasive action or not take a particular action such as a lane change.

What is needed therefore is a system that acts like the eyes of the driver and interprets the situation and only gives a warning when there is a real possibility of an accident. A passive warning can be given in the form of a light on the mirror whenever an object is in the blind spot but an active signal such as an audible signal or an intervention in the steering of the automobile can only be provided when it is necessary to prevent the accident. This system must work with very high reliability and accuracy since the consequences of an error can be serious injuries or death.

1. Prior Art on Blind Spot Detection Systems

In "A Survey of Automotive Collision Avoidance Systems" by Uttamkumar Dravidam and Sabri Tosunoglu of the Florida International University, the authors provide a good review of the field of obstacle sensors. What follows is a summary of their analysis. Obstacle sensors such as used for blind spot detection can be divided into three types which will now be described:

Optical sensors include passive infrared, laser radar and vision. They generally are sensitive to external environmental conditions, which may not be a problem for blind spot detection since the objects to be detected are usually nearby the host vehicle. Passive infrared and vision cannot provide a direct measurement of distance to an object unless part of the field of view is illuminated by a point or structured light. Laser radar does provide the capability of direct distance measurement, as will be described below, and a stereo camera can also provide distance information.

AMCW (amplitude modulated continuous wave), FMCW (frequency modulated continuous wave) and impulse and noise or pseudo-noise (CDMA) radar are not generally affected by adverse environmental conditions. Although relatively expensive, FMCW radar is a good technique for long-range distance measurement providing the object to be measured can be separated from other objects. Radar in general has a high false alarm rate due to the large pixel size at any significant distance from the host vehicle, to multipath effects and reflections off of signs, bridges, guardrails etc.

Ultrasonics is good in applications where only short relative distance measurements are required, since it is able to provide high distance to the target resolution for a relatively low cost. However, for imaging applications, the slow speed and relatively large pixel size renders ultrasonics marginal even for close up targets. Also, ultrasonic waves can be significantly distorted by thermal gradients and wind.

Various researchers have attempted combinations of these technologies with the particular combination of laser radar and pulse or FMCW being quite advantageous for long distance collision avoidance applications.

What follows in a brief description of the principles of operation for different types of sensors including their main advantages and disadvantages. For blind spot applications, sensors should be able to accurately determine the location of the object and the speed of the obstacle relative to the host vehicle. How well this is achieved can be measured with the following indicators:

Sensing range: the maximum and minimum range over which the technique can be used.

Range Resolution: the relative change in range that can be measured.

Pixel Resolution: the width of the beam or size of the pixel received and to which the sensor is sensitive.

Response time: how quickly the sensor can respond to a change in the blind spot occupancy.

Ultrasonics: These sensors work by measuring the time-to-flight of a short burst of ultrasound energy typically at a frequency of 40–200 kHz. The time taken for the ultrasonic waves to travel to and return from the obstacle is directly proportional to the distance between the obstacle and the host vehicle. The main advantage is their relative low cost and small size. These sensors are also very sensitive to changes in the density of air that can be caused by, e.g., high wind velocity and temperature gradients. Velocity can be measured by the Doppler frequency Passive Infrared: These sensors measure the thermal energy emitted by objects. Their main advantage is their low cost and small size, and main disadvantage is their inability to determine the distance to a detected object and slow response time.

Laser Radar: As with regular radar, two techniques exist: (1) a pulsed-beam of infrared light coupled with time-of-flight measurements, and (2) the modulation of a continuous light beam. The pulsed technique offers long range, high directionality, and fast response time. Its limitations are its sensitivity to environmental conditions.

FMCW or AMCW Radar: This type of radar uses modulated microwave or millimeter frequencies, so that the frequency difference between the reflected and the transmitted signal is proportional to the relative velocity of the object. When two waves of slightly different frequencies are used, the distance to the object can also be determined by the phase relationship between the two received reflections. Despite its high cost, this technique offers the advantages of being insensitive to environmental conditions, but the disadvantage of having a large pixel size. Velocity can be measured by the Doppler frequency shift.

Impulse Radar: This radar differs from FMCW in that it uses very short pulses instead of a continuous wave. Like FMCW radar, it is insensitive to environmental conditions, and the cost is significantly lower than FMCW. Distance can be determined by time-of-flight measurements and velocity can be determined from successive distance measurements. It also has the disadvantage of having a large pixel size resulting in a high false alarm rate and too little information to permit object identification.

Capacitive and Magnetic: Capacitive and magnetic sensors are able to detect close objects (within about 2 m.), using the capacitance or magnetic field variations between electrodes excited at low frequencies, typically about 5 kHz. Despite their limited range, they are low in cost, and robust to external environmental effects. The poor resolution compared to other techniques makes it unlikely that these devices will be used for blind spot detection since most objects are close to the vehicle.

Vision Systems: These techniques are based on the use of a camera and image-processing software. They are sensitive to external environmental conditions; however, this is not a significant shortcoming for blind spot detection. Active infrared vision systems can have significantly longer range in fog, snow and rain than human eyesight.

Considering now some relevant patent prior art.

U.S. Pat. Nos. 4,766,421; 4,926,170; 5,122,796; 5,311,012; 5,122,796; 5,354,983; 5,418,359; 5,463,384 and 5,675,326 and International Publication No. WO 90/13103 are all assigned to the same entity and all describe a modulated optical system. However, these references do not disclose a camera and in fact, each receiver is a single pixel device. The sensor is not mounted on the side rear view mirror but instead is mounted on the rear of the vehicle. These patents do disclose the use of multiple detectors and thereby achieving a sort of mapping of the detected object into one of several zones. The references also provide a crude velocity measurement of the object moving from one zone to another. Otherwise, they do not provide accurate ranging.

All of these patents describe a blind spot detection system wherein beams of infrared radiation are sent from the interrogating or host vehicle at a significant angle in order to illuminate possible objects in an adjacent lane. No direct measurement of the distance is achieved, however, in some cases multiple detectors are used in such away that when the adjacent detected vehicle is very close to the detector, that is, below the threshold distance, the sensing of the adjacent vehicle is suppressed. In other cases, multiple beams of infrared are used and distance is inferred by the reception of reflected radiation. The detectors are single pixel devices. No attempt is made to image the detected object. Also, no attempt is made to directly measure the location of the detected object.

U.S. Pat. No. 5,008,678 describes a phased array radar system wherein the antenna can be made to conform to the geometry of an edge of the automobile. The locations of the antenna, however, make it difficult to detect many objects in the side blind spots. The particular location and velocity of such objects are also not accurately determined. No image of the device is formed. The device is based on a single pixel having a relatively large size making recognition and identification of the object impossible.

U.S. Pat. No. 5,087,918 describes the use of a combination of two types of radar: dual frequency Doppler radars and frequency modulated continuous wave radar (FMCW). The system provides an indication of the range of the object from the vehicle but does not indicate where in a plane perpendicular to the vehicle the object is located and therefore whether it is a threat or not. Also, the system does not apply pattern recognition so that different types of objects in the blind spot can be identified. This patent gives a good description of the limitations of radar systems.

U.S. Pat. No. 5,229,975 describes a method for diagnosing when the system is not operating properly by placing an LED outside the vehicle next to the sensor. This is a single pixel device and thus no imaging or object recognition is possible. Range is not measured directly but through a series of sensors whereby each sensor covers a particular zone. Thus, no accurate range measurement is provided. As the object moves in the blind spot area, it is sensed by a variety of the sensors and the last one to sense it gives a crude indication of the distance.

U.S. Pat. No. 5,235,316 describes an ultrasonic blind spot detecting system that in fact interrogates as much as 200 degrees around the vehicle. It is mounted in place of the conventional mirror and a new side mirror is provided. The ultrasonic sensor rotates until it locates an object and then it causes the mirror to rotate so that the driver can see the object. The patent does not take an image of the threatening object or the object in blind spot. It is a one-pixel device and it does not employ pattern recognition. Additionally, it provides too much information for the driver thus creating the possibility of driver information overload.

U.S. Pat. No. 5,289,321 describes a camera and an LCD display on the instrument panel. The camera views rearward and driver sees the image captured on an LCD. It does not disclose the camera mounted on the rear view mirror. The main problem is that the LCD driver-viewing screen is more likely to confuse than to aid the driver due to its poor dynamic light intensity range and the ability to relate the image to the location and velocity of the object in the blind spot.

U.S. Pat. No. 5,291,261 describes illumination ports at an angle with respect to single pixel receiver ports. Fiber optics are used to transmit the few pixels to a central processing station. There is no direct ranging. Some crude ranging is accomplished since when the object is in certain zones where the projected light overlays the receiving fields, the reflected light can be sensed. It requires multiple locations and cannot be mounted, for example, on the side rearview mirror.

U.S. Pat. No. 5,325,096 uses Doppler radar to determine the presence and relative velocity of an object blind spot. It filters out stationary objects and concentrates only on those objects that have approximately the same velocity as the vehicle. As a result, many objects, such as a high speed passing vehicle, are missed. A light is used to indicate the presence of an occupying item in the blind spot area and an audible alarm is sounded when the turn signal is activated. There is some crude range measurement possible. It is also a single pixel device and thus, no image of the object can be formed. It invariably will miss objects that move rapidly into blind spot. There is no precise ranging. It does not appear that the system can be easily adjusted for vehicles of different length.

U.S. Pat. No. 5,424,952 describes an optical system using cameras wherein distance is measured stereoscopically. Objects that are not in the adjacent lane are ignored. The problems are that no attempt is made to analyze the image or to determine its velocity and therefore, a high false alarm rate can be expected. Although the image is captured, the information is ignored except for its use to determine a stereo distance.

U.S. Pat. No. 5,467,072 describes a phased array radar system that can scan the blind spot as well as all other areas around vehicle. However, the system does not provide an image and therefore no pattern recognition is possible. The 10-degree divergence angle of radar indicates that a single pixel has a diameter of over 3 feet at 20 feet from the radar transmitter, which is insufficient resolution to determine the lane that the threatening vehicle is occupying, especially if there is a slight curvature in the road. Such a system is not sufficiently accurate to provide drivers who are attempting to merge into adjacent lines with sufficiently accurate position information to permit a safe merge under heavy traffic without visual contact. Additionally, there is no pattern recognition claimed or even possible with this low resolution device.

U.S. Pat. No. 5,517,196 describes a multi-frequency radar system using Doppler techniques. Stationary objects are filtered out. In fact, the system also only looks at objects that are traveling at approximately the same speed as the host vehicle. It has a good range of 0.25 to 100 feet. Some problems are that this system will interfere with other vehicles having the same system. There appears to be no direct measurement of the object's position, but it does give a good distance resolution of 0.55 feet. This patent also contemplates the use of steering wheel angle and vehicle speed inputs to the system. Even though ultrasonic, infrared and radar are disclosed, it is still a single pixel system. Once again, the system will invariably miss a high-speed vehicle passing on either the right or the left since it is limited to a two mile per hour velocity difference between the blind spot object and the host vehicle. It also appears to be a very expensive system. Another potential problem is that when an especially long truck having the system of this patent is turning, the system would pick up the end of truck and treat it as they object in the blind spot.

U.S. Pat. No. 5,668,539 uses thermal imaging to recognize a car or truck in the blind spot. It uses a vibrating element between the field of view containing the blind spot using three lenses thus giving three different locations and a reference field of view that is the road behind the vehicle. The problems with this device are that this system does not know where the infrared rays are coming from. It could be from the sun or from reflections from the wrong lane. The slow cycle time prevents averaging to eliminate errors. At a 60 km per hour passing rate, the vehicle will travel 1.7 m each cycle based on a 10 hertz cycle rate. The patent also mentions that the form of the signal that comes from a vehicle and the blind spot has high frequency associated with it whereas the form of the signal from the road does not. This is an alternate method of discriminating between a vehicle and the road but one that still lacks resolution.

U.S. Pat. No. 5,670,935 describes a camera and a display where the actual images of the vehicle in the blind spot and behind the subject vehicle are displayed on the visual display. Unfortunately, the various figures in the patent that illustrate this phenomenon are not accurate and appear to show that the positions of the vehicles relative to the subject vehicle can be visually seen which is not the case. Thus, the invention described in this patent cannot be used for blind spot detection in the manner that is described in this patent since the relative locations of vehicles cannot be determined. Also, no attempt has been made to identify and analyze objects in the blind spot and warn the driver of a pending accident.

U.S. Pat. No. 5,765,116 describes a system wherein a torque is artificially applied to the steering wheel to keep a driver in the center of his lane. This is not a blind spot related patent but this same technique can be used to prevent a driver from attempting to change lanes when there is an object in the blind spot and thus is applicable to this invention.

U.S. Pat. No. 6,038,496 describes a lane boundary finder. It uses a linear array of LEDs plus a linear CCD with a total of 64 pixels in the CCD array. It can be used for blind spot monitoring, although this is not the main purpose of this invention. The CCD array suffers from the problem that, due to its limited dynamic range, it can be overwhelmed by light from the sun, for example, reflected off a vehicle or other surface. Since there is only a linear array of only 64 pixels, no information as to what is in the blind spot can be obtained. In other words, the system knows that something is in the blind spot but does not know what it is or even accurately where it is. Nevertheless, the use of the scanning system disclosed wherein the particular pixel or the beam that is being activated to create a light on a leading or reflecting surface is an important addition to the technology and may also be used with this invention.

International Publication No. WO 95/25322 describes a passive infrared blind spot detector that processes infrared waves based on a crude form of pattern recognition. There is no accurate ranging and there will likely be a high false alarm rate with this system. There is also sometimes a period when the system is unavailable due to changes in ambient conditions such as the start of a rain shower or when the temperature of the road changes due to shading. It is a one-pixel device and therefore does not permit the location of the object in the blind spot to be determined. This device and other similar passive infrared devices will have trouble distinguishing between a small objects such as a motorcycle which is relatively close to the sensor and larger objects such as a truck which are relatively far away, for example in two lanes over. As a result, it will likely falsely indicate that a relatively large object is within a danger zone when in reality the object is at a distance and does not pose a threat.

International Publication No. WO 99/42856 describes a rear of vehicle mounted blind spot detector based on various radar systems. It has the capability of tracking multiple targets and of accurately determining the ranges to the various targets using range-gating techniques. It does not attempt to capture an image of an object in the blind spot or determine the identity of such an object and thus many non-threatening objects will appear to be threatening. Accordingly, the system can be expected to have a high false alarm rate.

In general, the poor resolution of radar systems requires that they use relative velocity as a filter in order to reduce the false alarm rate. As a result, such systems miss a high-speed vehicle that is in the blind spot and was not observed approaching the blind spot by the driver. This is a very common occurrence on European superhighways and in the United States on two lane roads.

Thus, none of the prior art described above discloses a method or apparatus of monitoring the blind spot of the vehicle that analyzes an image of one or more objects that occupy the blind spot, identifying them and determining the location and relative velocity of the objects relative to the host vehicle in a manner that permits an accurate warning to be issued to the driver of a potentially dangerous situation.

2. Definitions

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

A "blind spot", for the purposes of this invention, will include those areas surrounding a vehicle that could contain an object that may not easily be seen by the driver through the various rear view mirrors but which could pose a threat either to the vehicle occupants or to the occupants of the object, or other others such as pedestrians, in the blind spot.

Pattern recognition is commonly used in practicing the instant invention. "Pattern recognition" as used herein will generally mean any system, which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acoustic or electromagnetic radiation and, if electromagnetic, they can be either visible light, infrared, ultraviolet or radar or low frequency radiation as used in capacitive or magnetic based sensing systems.

A trainable or a trained pattern recognition system as used herein means a pattern recognition system that is taught various patterns by subjecting the system to a variety of examples. The most successful such system is the neural network. Not all pattern recognition systems are trained systems and not all trained systems are neural networks. Other pattern recognition systems are based on fuzzy logic, Kalman filters, sensor fusion, correlation as well as linear and non-linear regression. Still other pattern recognition systems are hybrids of more than one system such as neural-fuzzy systems.

To "identify" as used herein will mean to determine that the object belongs to a particular set or class. The class may be one containing, for example, all human objects, automobiles, trucks, bicycles, motorcycles, guard rails, trees, lamp posts, animals, traffic lights, signs, mail boxes, fire hydrants etc. depending on the purpose of the system. In the case where a particular vehicle such as a fire engine is to be recognized, the set or class will contain only a single element, i.e., the vehicle to be recognized.

An "occupying item" of a blind spot may be an automobile, truck, motorcycle, pedestrian, bicycle, animal, guard rail, tree, utility pole, as well as many other objects.

In the description herein the term "approaching" when used in connection with the mention of an object or vehicle approaching another will mean the relative motion of the object toward the vehicle having the sensor system. In other words, the coordinate system used in general will be a coordinate system residing in the vehicle. This convention permits a general description to cover all of the cases such as where a moving vehicle approaches a stationary vehicle or where both vehicles are moving.

An "electronic shutter" or "light valve" as used herein will mean any method of controlling the amount of light, or other electromagnetic energy, that can pass through the device based on an electronic signal control of the device.

3. Pattern Recognition Prior Art

Neural networks as the pattern recognition technology are used in several of the implementations of this invention since it makes the monitoring system robust, reliable and practical. The resulting algorithm created by the neural network program is usually only a few hundred lines of code written in the C or C++ computer language. The resulting systems are easy to implement at a low cost, making them practical for automotive applications. The cost of the CCD and CMOS arrays, for example, have been expensive until recently, rendering their use for blind spot systems impractical. Similarly, the implementation of the techniques of the above referenced patents frequently requires expensive microprocessors while the implementation with neural networks and similar trainable pattern recognition technologies permits the use of low cost microprocessors typically costing less than $10 in large quantities.

The present invention optionally uses sophisticated trainable pattern recognition capabilities such as neural networks. Usually the data is preprocessed, as discussed below, using various feature extraction techniques. An example of such a pattern recognition system using neural networks on sonar signals is discussed in two papers by Gorman, R. P. and Sejnowski, T. J. "Analysis of Hidden Units in a Layered Network Trained to Classify Sonar Targets", *Neural Networks,* Vol. 1. pp 75–89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same and U.S. Pat. No. 5,517,667 entitled "Neural Network and Method of Using Same" to Wang, S. T. Other examples include U.S. Pat. No. 5,235,339 (Morrison et al.), U.S. Pat. No. 5,214,744 (Schweizer et al), U.S. Pat. No. 5,181,254 (Schweizer et al), and U.S. Pat. No. 4,881,270 (Knecht et al). All of the above references are incorporated herein by reference.

4. Optics

Optics can be used in several configurations for monitoring the exterior of a vehicle. The receiver can be a CCD or CMOS imager, to receive the emitted or reflected light. A laser can either be used in a scanning mode, or, through the use of a lens, a cone of light can be created which covers a large portion of the object in the blind spot. In these configurations, the light can be accurately controlled to only illuminate particular positions of interest on the vehicle. In the scanning mode, the receiver need only comprise a single or a few active elements while in the case of the cone of light, an array of active elements is needed. The laser system has one additional significant advantage in that the distance to the illuminated object can be determined as disclosed in U.S. Pat. No. 5,653,462, incorporated by reference herein in its entirety to the extent the disclosure of this patent is necessary, e.g., for an understanding of the invention.

In a simpler case, light generated by a non-coherent light emitting diode (LED) device is used to illuminate a desired area. In this case, the area covered is not as accurately controlled and a larger CCD or CMOS array is required. Recently, the cost of CCD and CMOS arrays has dropped substantially with the result that this configuration is now the most cost-effective system for monitoring the blind spot as long as the distance from the transmitter to the objects is not needed. If this distance is required, then a laser system using modulation and phase detection or time-of-flight techniques, a stereographic system, a focusing system, a combined ultrasonic and optic system, or a multiple CCD or CMOS array system as described herein is usually required.

In a particular implementation, the illuminating light is in the form of a modulated infrared laser light that is scanned in a line that illuminates an object in the blind spot. The reflected light is received by a pin diode after passing through a narrow frequency band notch or other appropriate filter. The diode is a single pixel device but since the direction of the transmitted light is known, the direction of the reflected light is also known. The phase of received light is then compared with the transmitted light. The modulating frequency was selected so that no more than one wavelength of light exists within the blind spot area. The location of the reflecting object can then be determined by the phase difference between the transmitted and reflected light. Although the described system uses a linear scan, it is also possible to use a two-dimensional scan and thereby obtain a three-dimensional map of the blind spot. This can be done using a pin diode as described or the light received by the CMOS array can be monitored on a pixel by pixel basis in a manner similar to the PMD system described in Schwarte, et. al. "New Powerful Sensory Tool in Automotive Safety Systems Based on PMD-Technology", which is incorporated herein by reference. In this latter case, the entire blind spot area may be flooded with modulated infrared light as described in the paper. On the other hand, it is difficult to overcome the light from natural sources such as the sun by a single floodlight source and therefore a line or even a scanning point source permits better distance measurement using a light source of reasonable intensity.

This technique can also be used for vehicle velocity determination and at the same time the topology of the ground covered by the scanning laser can be determined and reflections from rocks and other debris can be eliminated from the velocity calculation.

A mechanical focusing system, such as used on some camera systems can determine the initial position of an object in the blind spot. A distance measuring system based of focusing is described in U.S. Pat. No. 5,193,124 (Subbarao) which can either be used with a mechanical focusing system or with two cameras. Although the Subbarao patent provides a good discussion of the camera focusing art and is therefore incorporated herein by reference, it is a more complicated system than is needed for the practicing the instant invention. In fact, a neural network or optical correlation system can also be used to perform the distance determination based on the two images taken with different camera settings or from two adjacent CCD's and lens having different properties as the cameras disclosed in Subbarao making this technique practical for the purposes of this instant invention. Distance can also be determined by the system described in U.S. Pat. No. 5,003,166 (Girod) by the spreading or defocusing of a pattern of structured light projected onto the object of interest. Distance can also be measured by using time-of-flight measurements of the electromagnetic waves or by multiple CCD or CMOS arrays as is a principle teaching of this invention.

In each of these cases, regardless of the distance measurement system used, a trained pattern recognition system, as defined above, can be used to identify and classify, and in some cases to locate, the illuminated object. The distance measurements by any of these techniques can be used to determine the distance from the sensor to the ground and provide the correction of the effective angle of transmission as discussed above.

5. Optics and Acoustics

Both laser and non-laser optical systems in general are good at determining the location of objects within the two-dimensional plane of the image and a pulsed or modulated laser or continuous modulated radar system in the scanning mode can determine the distance of each part of the image from the receiver by measuring the time-of-flight, correlation or by phase measurement. It is also possible to determine distance with the non-laser system by focusing as discussed above, or stereographically if two spaced apart receivers are used and, in some cases the mere location in the field of view can be used to estimate the position of the object in the blind spot, for example.

Acoustic systems are additionally quite effective at distance measurements since the relatively low speed of sound permits simple electronic circuits to be designed and minimal microprocessor capability is required. If a coordinate system is used where the z-axis is from the transducer to the object, acoustics are good at measuring z dimensions while simple optical systems using a single CCD are good at measuring x and y dimensions. The combination of acoustics and optics, therefore, permits all three measurements to be made from one location with low cost components as discussed in commonly assigned U.S. Pat. Nos. 5,835,613 and 5,845,000.

One example of a system using these ideas is an optical system that uses natural light coupled with a lens and CCD or CMOS array which receives and displays the image and an analog to digital converter (ADC), or frame grabber, which digitizes the output of the CCD or CMOS and feeds it to an artificial neural network (ANN), correlation system or other pattern recognition system for analysis. This system uses an ultrasonic transmitter and receiver for measuring the distances to the objects located in the blind spot. The receiving transducer feeds its data into an ADC and from there, the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the object and the phased array can direct a narrow beam to the location and determine the distance to the object through time-of-flight, for example.

Although the use of ultrasound for distance measurement has many advantages, it also has some drawbacks. First, the speed of sound limits the rate at which the position of the object can be updated. Second, ultrasound waves are diffracted by changes in air density that can occur when thermal gradients are present or when there is a high-speed flow of air past the transducer. Third, the resolution of ultrasound is limited by its wavelength and by the transducers, which are high Q tuned devices. Typically, the resolution of ultrasound is on the order of about 2 to 3 inches. Finally, the fields from ultrasonic transducers are difficult to control so that reflections from unwanted objects or surfaces add noise to the data. In spite of these drawbacks, ultrasound is a fine solution in some applications such as for velocity and displacement determination for farm tractors and construction machines where the operating speeds are low compared with automobiles.

6. The Blind Spot Problem and Solutions

The above review of a prior art blind spot detecting systems illustrates that no existing system is believed to be sufficiently adequate. A fundamental problem is that vehicle operators are familiar with visual systems and inherently distrust all other technology. As soon as the non-visual system gives a false alarm or fails to detect an object in the blind spot, the operator will cease to depend on the system. Theoretically, the best systems would be based on cameras that allow the operator to view all of the blind spots. However, there are no adequate display systems that will appear to the operator to be equivalent to an actual view of the scene. CRTs and LCDs require driver concentration and do not have the dynamic range of lighting that is comparable to the real world. Either the display will be too bright at night or too dim during daylight or the wrong object will be bright compared with the object of interest. Although radar systems can accurately measure distance to an object, they are poor at placing the object in the lateral and vertical coordinates relative to the vehicle and thus create many false alarms.

The simplest system must be able to accurately position the object in the blind spot relative to the host vehicle and inform the driver that a collision potential exists if the driver decides to change lines, for example. This warning must be given to the driver either at a place where he can almost subconsciously observe the warning when he is contemplating a lane change maneuver, or it must provide an audible warning if he attempts to make such a lane change maneuver. Finally such a system might even prevent a driver from executing such a maneuver.

A more sophisticated system would be to provide a simple icon image of the host vehicle and all surrounding vehicles as viewed from above. In this manner, with a simple glance, the driver can determine the location and identity of all objects that are in his blind spot or in the vicinity of the vehicle in any direction. If this display is kept simple, then the problems of visual dynamic range become much less severe. That is, if the driver need only see dark objects on a white background and if the size of these objects is significant, than the display could be viewed both at night and under daylight conditions.

In some parts of the United States, satellite images are available in real time that show traffic patterns including the subject vehicle. If the vehicle knows exactly its location and the location of the image, then a view of the area surrounding the subject vehicle can be superimposed on a display and the vehicle operator can see the traffic situation surrounding his or her vehicle from above. Also, using pattern recognition, the salient features of the image can be extracted and displayed as icons on a display thereby simplifying the interpretation problem for the driver as discussed above.

To accomplish these goals, it is necessary to positively locate an object in the blind spot and provide some identification as to what that object is. A driver will respond quite differently if the object is a guardrail or a line of parked cars then he will if it is a Porsche overtaking him at 150 kph.

Thus, the requirements of the system are to identify the object and to locate the object relative to the host vehicle. To identify the object preferably requires a pattern recognition system such as neural networks or optical correlation systems. To locate the object preferably requires some means of measuring the distance from the camera to the object. A CMOS camera is quite capable of capturing an image of an object in the blind spot and if the camera is an HDRC camera, then it can perform well under all normal lighting conditions from midnight to bright sunshine especially if minimal illumination is provided on dark nights.

However, even the HDRC camera can be blinded by the sun and thus an alternate solution is to use a scanning laser radar where the point of IR can overpower the emissions of the sun at that wavelength. A scanning laser radar can scan in either one or two dimensions depending on the design. The scanning mechanism can be a rotating polygon mirror, vibrating galvanometer-type mirror, a vibrating MEMS mirror or a solid-state acoustical-optical crystal. In the case of the solid-state device, one or more special lens can be used to increase the effective scan angle. The IR wavelength can be in the far, mid or near IR bands. If the wavelength is in the mid-IR band, it can be selected so as to provide the greatest range in rain, snow or fog. Also, its amplitude at the selected wavelength should be sufficient to be detected in bright sunlight An alternate to the HDRC camera is to use an electronic shutter and/or variable iris. In this case, the camera can be operated in the range that best images objects of interest or a series of images can be taken at different settings and portions of each image combined to create a sharp image of the area of interest as reported in S. K. Nayar and T. Mitsunaga, "High Dynamic Range Imaging: Spatially Varying Pixel Exposures", Proceedings of IEEE Conference on Computer Vision and Pattern Recognition, Hilton Head Island, S.C., June 2000, for example, which is incorporated herein by reference.

The measurement of the distance to the object can be accomplished many different ways including ultrasonically, using laser radar, FMCW or AMCW radar, and range gated pulsed micropower impulse radar. All of these distance measuring techniques as well as stereographic, focusing, structured light, triangulation, correlation using random or pseudorandom code modulation and other similar techniques are envisioned for use in this invention.

A low-cost preferred approach of solving the distance-measuring problem that is consistent with an HDRC camera system is to project onto the volume of the blind spot a series of infrared light pulses. These pulses are created by an array of laser diodes that are displaced from the camera in such a manner that a pulse of light reflected off of an object in the blind spot will appear on a certain pixel area in the camera field of view and since the location of the transmission of the pulse is known and the location of the camera is known, the distance to the reflecting surface is also known by triangulation. By a judicial choice of transmission angles from the laser diode array, the entire volume of the blind spot can be covered with sufficient accuracy so that no significant object can penetrate the blind spot without creating a reflection and thereby permitting the distance to the object to be determined.

In one implementation, a series of pulses from a laser diode array are contemplated. Other techniques will also accomplish the same goal, however, at a generally higher cost. For example, a continuous laser beam can be used that would scan the blind spot area in either one or two dimensions. Since the direction of the laser will be known that all times its reflection and excitation of pixels on the CMOS array would permit, once again, an accurate, mapping of the distance to various points on the object in the blind spot to be accomplished. This technique however requires a scanning laser system that in general, although more accurate, would be more expensive than a simple array of LEDs. Once again, the photonic mixing device described elsewhere would also provide a three-dimensional image of the contents of the blind spot as would a similar and preferred system described below.

Another technique is to superimpose on the blind spot area a pattern of light commonly referred to as structured light. The source of the structured light must be displaced from the imaging array. By observing characteristics of the reflected pattern, such as the distances between portions of the pattern, the distance to the object can be determined. This system, although common in machine vision applications, requires greater computational resources then the simple LED array described above. Nevertheless, it is a viable approach and envisioned for use in the invention.

Various forms of structured light coupled with other patterns which are either inherent in the lens of the camera or are superimposed mathematically on the image can create what is commonly known as Moire patterns that also permit the determination of the distance from the camera to the object. In some sophisticated examples, this technique can actually provide the equivalent of topographical maps of the object in the blind spot that would be of value in interpreting or identifying the object. However, these techniques require considerable computational power and are not as cost-effective as the simple LED array described above or a linear scanning LED or laser with a pin diode, or equivalent, receiver as disclosed below.

All of these systems permit differentiation between light that is reflected from the transmitted infrared systems and light that comes from the sunlight, for example. It is quite likely that at certain times certain pixels in the camera will receive infrared radiation that overwhelms the reflection of the infrared sent by the host vehicle system. If this radiation comes from pixels other than those that are expected, then the system will know that the results are erroneous. Thus, the systems described above have the capability of permitting the diagnosis of the data and thereby achieving a high accuracy of the results. If the results do not agree with what is expected, then they are ignored. If that happens over a significant period of time, then the operator of the vehicle is warned that the blind spot detection system is non-operational.

Using sophisticated image processing and mathematical techniques, however, it is expected that those periods of non-functionality will be minimal. The vehicle operator however will not be subjected to a false alarm but instead will be told that the system is temporarily non-operational due to excessive sunlight etc. A typical driver can easily relate to this phenomenon and thereby would not lose confidence in the system. The use of a narrow notch filter can significantly improve the separation of the artificially illuminated reflected light from the light reflected from the sun.

Initially, one would assume that the only situation that the driver of a vehicle should be concerned with is if he or she decides to change lanes and after looking into the rear view mirror and not seeing an object in the blind spot, proceeds to change lanes. Unfortunately, the blind spot problem is significantly more complicated. The road may be curved and the lane changing maneuver might be quite easily accomplished. However, based on the geometry of the blind spot detecting system, using prior art systems, the driver is warned that he cannot execute such a lane change. This may be fallacious in that the vehicle that the system determines is in the blind spot may actually be in a different lane. Under the stress of congested driving conditions, the driver will not tolerate an erroneous message and thereby he might lose confidence in the system.

The identification of the object in the blind spot is important and a significant part of the present invention. All previous blind spot detectors have only indicated that there is a reflection from some object that is near the vehicle that may or may not interfere with the desired intentions of the vehicle operator to change lanes or execute some other maneuver. This is very disquieting to a vehicle operator who was told that something is there but not what that something is. For example, let us say that an operator of a vehicle wished to move that vehicle to the situation where he is partially on the shoulder in order to avoid a vehicle that is intruding onto his lane from the right. Most if not all current systems would tell the vehicle operator that he cannot do so. The system described in the present invention would say that there is a guard rail fifteen feet to your left, thereby allowing movement of 10 feet onto the shoulder and thereby avoid the vehicle intruding onto the lane from the right. This is a real world situation, yet all existing blind spot detection systems would give an erroneous answer, or no answer at all, to the vehicle operator.

Future automobile safety systems will likely be based on differential GPS and centimeter accurate maps of the roadway. The blind spot detector of this invention is an interim step to help eliminate some of the accidents now taking place. The particular geometry of the road is unknown to vehicles today, therefore, a blind spot detection system cannot use information that says, for example, that the road is about to take a sudden curve to the left, in its decision-making function. Nevertheless, this is a real situation and the system for detecting objects in the blind spot should not give erroneous information to be operator that he is about to have collision when the cause of this analysis is based on the assumption that the road will be straight when in fact a strong left turn is taking place.

This problem cannot be solved absolutely but if features such as angular position of the steering wheel of the host vehicle are data that can be entered into the system, then these types of situations can become less threatening. A preferred implementation of the present invention uses data from other vehicle sources in the decision making process including the steering wheel angle, vehicle speed etc. and map and location information if available.

In the prior art blind spot detection systems, the inventors have generally realized that the operator of the vehicle cannot be continuously informed that there is an object in the blind spot. Every driver on the highway during rush hour would otherwise be subjected to a barrage of such warnings. Prior art systems have therefore generally provided an optical warning typically placed as an LED on the rear view mirror and an audible alert sounded when the driver activates the turn signal. Unfortunately, under normal driving conditions only about 70% of drivers use their turn signals as an indication of a lane change. Under stressful congested automobile driving situations, one can expect that the percentage would drop significantly. The driver must be warned when he is about to change lanes but the activation of a turn signal is not sufficient. Even crude maps that are available on route guidance systems today can add valuable information to the system by permitting the anticipation of a curve in the road, for example.

Various studies have shown that the intentions of a driver can sometimes be forecasted based on his activities during a several second period prior to execution of the maneuver. Such systems that monitor the driver and, using neural networks for example, try to forecast a driver's action can be expected to be somewhat successful. However, these computationally intensive systems are probably not practical at this time.

Another method is to provide a simulated audio rumble strip or vibrating actuation to the steering wheel at such time as the driver elects to redirect the motion of the vehicle based on an object in the blind spot. Whereas a rumble strip-type message can be sent to the driver, control of the vehicle cannot be assumed by the system since the road in fact may be executing a sharp curve and taking control of the vehicle might actually cause an accident.

The rumble strip method, or a tactile messaging system, is the preferred approach to informing the driver of a potentially dangerous situation. Initially, a resistance would be applied to the steering wheel when the driver attempts to alter the course of the vehicle. Since the system will not know whether the driver is following a curve in the road or in fact changing lanes, the driver will be able to easily overcome this added resistance but nevertheless, it should indicate to the driver that there is a potential problem. If the driver persists, then a slight to moderate vibration would be applied to the steering wheel. Once again, this would be easily overcome by the driver but nevertheless should serve to positively warn the driver that he or she is about to execute a maneuver that might result in an accident based on the fact that there is an object in the blind spot.

A preferred implementation of the instant invention will use a passive optical system for monitoring the presence of objects in the blind spot. Pattern recognition technologies such as neural networks and optical correlation systems will be used to positively identify the object that is in the blind spot. This object may be a pedestrian, bicyclist, motorcyclist, guardrail, animal, automobile, truck, fire hydrant, tree, telephone pole, sign or whatever. The system will be trained or otherwise programmed to inform the operator either optically or orally that such an object appears in the blind spot. It will also inform the driver as to which blind spot contains the object. The system can also inform the driver as to whether this object is moving or stationary in an absolute sense and/or also in relation to the host vehicle. This information can be presented to the operator in a variety of ways. Initially, a light or simple icon can appear on the rear view mirror, for example, indicating either that some object exists or that a particular object exists.

In more sophisticated systems, an icon representing the object can be placed on a simple icon display which can show the vehicle from an overhead view, or other convenient view, and an icon which shows the blind spot object and its location. Alternately, an oral annunciation can be provided which tells the driver that, for example, there is a guardrail three feet to his left, or that there is an automobile approaching from the rear in an adjacent lane at a relative speed of 100 kph and is currently 50 feet behind the vehicle. All of these types of warnings can be provided if an identification can be made of the object in the blind spot and an accurate measurement made of the position and velocity of that object relative to the host vehicle. This is an object of this invention.

It can be seen from this description that the system in accordance with the invention will inform the driver of the type of object in the blind spot, where it is located specifically, what its velocity is relative to the host vehicle, and in more sophisticated systems, will show graphically an icon showing the object relative to the vehicle from an overhead view, for example, which is easily understandable by the driver with a mere glance at the display. Therefore, the system overcomes all of the objections and problems described above with respect to the prior art systems.

The use of passive optical camera systems, such as the HDRC camera, has been discussed and the method of using either neural networks, optical correlation, or other pattern recognition systems has also been discussed that illustrates how, in the present invention, the identity of the object occupying the blind spot will be determined. What follows now is a more detailed discussion of how the position of that object will be determined.

As discussed above, many technologies are available for measuring distance, some more complicated and more expensive than others. The system described here is believed to be a low cost approach and a preferred embodiment of the invention. This invention is not limited to this technology, however, and any practical distance measuring system is contemplated.

Although simple icon displays are contemplated by this invention, this is due to the lack of sophistication or capability of current display technology. In other words, the dynamic range of light that can be emitted by conventional displays is insufficient to display other than the simplest messages. Technology advances and it is expected that accurate color displays with high dynamic range will be available in the not too distant future perhaps using the newly developed organic display technology. When such displays are available, a more accurate representation of the object in the blind spot even to the point of an actual image might become feasible.

This invention does not generally contemplate the use of rear view mirrors to permit the vehicle operator to actually see the contents of the blind spot. This is because to accurately accomplish this requires knowledge of the position of the eyes of the driver. It is been observed that drivers adjust side rear view mirrors over an extended range that renders the use of the mirror angle unsuitable for determining the position of the driver's eyes. Furthermore, the driver may change his or her seating position without changing the position of the rear view mirror. Occupant sensing systems are now being deployed on vehicles that have the capability of determining the location of the eyes of a vehicle operator. For those vehicles that contain such a system, the possibility exists not only to automatically adjust the mirror to optimally display the contents of the blind spot, but also to change the orientation of the mirror when some object that the driver should be aware of is in the blind spot. This invention therefore contemplates such activities when occupant sensing systems are placed on vehicles.

For the preferred implementation of the system, the light from laser diodes will actually cross the field of view of the camera. If there is a heavy fog, for example, in the vicinity of the blind spot, then the reflection of the light off of the fog will create an elliptical image on the camera sensor array. This would also be true when heavy rain or heavy snowfall is present. This fact can be used to determine visibility. Observations of visibility conditions of objects in the blind spot even during severe weather conditions has led the inventors of this invention to the conclusion that when the visibility is so poor that the passive optical system using laser diodes described herein is not functioning with sufficient accuracy, that the operator of the vehicle should not be operating the vehicle on the roads and therefore the vehicle operator should be informed that safe travel is not possible. Thus, the use of radar or other technologies to view the blind spot, which is actually quite close to the vehicle, is not necessary since vehicle operation should not be permitted when the visibility is so poor that the object cannot be seen in the blind spot by the system of this invention. Nevertheless, this invention can contribute to safe driving in these conditions, if such driving is attempted, since an indication will be obtained by the system based on the elliptical reflections from the laser diode indicating that the visibility is unacceptable. Note that when using a scanning IR laser radar system, the range of view of the system greatly exceeds that of the human operator especially when range gating is used to remove close-up reflections from the atmosphere (rain, snow, fog etc.)

There will be conditions when the optical system from the CMOS camera has deteriorated due to contaminants obscuring the lens. Similarly, the light emitting laser diodes will emit less light if the lenses are soiled. The system of this invention contemplates a continuous diagnostic feature that will permit sensing of either of these conditions. This can be accomplished in a variety of ways such as a laser diode aimed at the road surface close to the vehicle but within view of the CMOS camera. If the reflection over a period of time is not sufficient, then a warning light will appear on the instrument panel informing the driver that maintenance is required. Naturally, there are many other methods by which a similar diagnostic can be accomplished.

For the embodiment of the invention using triangulation, it is desirable for the laser diodes, scanning laser diode or other light source to be displaced as far as reasonably possible from the camera in order to permit the maximum accuracy for the triangulation calculations. In an automobile, as much as six inches exists from one side of the exterior rear view mirror to the other side. This is marginal. For large trucks, the vertical distance separating the top and bottom of the rear housing can be as much as 24 inches. In both cases, the laser diode would be placed at one extreme and the camera at the other extreme of the mirror housing. An alternate approach is to place the camera on the mirror housing but to place the light source on the vehicle side. Alternately, both the camera and the light source can be placed at appropriate positions on the side of the vehicle. The key is that the direction of the light source should cross field of view of the camera at least at a 10 degree angle.

Since the dots or a line created by the light source will be in the infrared spectrum and the majority of the light coming from objects in the blind spot will be in the optical spectrum, the possibility exists to separate them through the use of an infrared filter which will allow more accurately the determination of the location of the reflection from the laser diode onto the optical array. Such filters can be done either mathematically or through the imposition of a physical filter. However this approach requires a mechanical mechanism to move the filter in and out of the camera field of view. Alternately, to eliminate the need to move the filter, a pin diode or equivalent dedicated receiver can be used to receive the reflected infrared light.

The blind spot problem for trucks is particularly difficult. Trucks experience the same type of blind spot as do automobiles where the blind spot extends the length of the vehicle. However, the truck driver is also unable to see objects that are in another blind spot extending from forward of the front of the vehicle back typically 25 feet. This blind spot has been discussed in greater detail in U.S. Pat. No. 5,463,384 and International Publication No. WO 90/13103. Trucks also have blind spots behind the trailer that are problematic during backup maneuvers. The invention disclosed herein is applicable to all three blind spot situations for trucks, automobiles or other vehicles.

It is noteworthy that some trucks have the capability of automatically rotating the side rear view mirrors based on the relative angle between the cab and the trailer. Such mirror systems are designed so that they maintain their orientation relative to the trailer rather than the cab. The blind spot monitoring system of this invention can make appropriate use of this technology to monitor the space along side of the trailer rather then cab.

Buses, trucks and various municipal people conveyors also have a blind spot directly in front vehicle and children have been run over by school buses when the driver was not aware that a child was crossing in front of the bus after embarking from the bus. The system of this invention is also applicable for monitoring this blind spot and warning a bus driver that a child is in this blind spot.

Naturally, the images obtained from various locations outside of the vehicle can alternately be achieved by cameras or by fiber-optic systems. This invention is not limited to the physical placement of cameras at particular locations when a fiber optic transmission system could be used as well.

The principles of this invention can also be used for other purposes such as intelligent cruise control, speed over ground sensors, parking aids, height sensors for active suspensions, anticipatory crash sensors and obstacle detection systems. One particular application is for rear impact anticipatory sensors where both the distance and velocity (perhaps using Doppler principles) can be determined and used to deploy a movable headrest or equivalent.

Although a trained neural network is contemplated for the preferred embodiments of this invention, adaptive neural networks and other forms of artificial intelligent systems are also applicable especially where the host vehicle may be towing different loads that could confuse a static trained system. In this case, part of the system can be made adaptive to adjust to the particular load being pulled by the vehicle.

OBJECTS AND SUMMARY OF THE INVENTION

The present invention relates to an accurate ground speed sensor system for agricultural product distribution machines using one or more velocity and distance measurement systems. An agricultural product distribution machine may be, for example, an air seeder, a precision planter, a sprayer or the like.

The present invention is directed to overcoming the above problems with prior art ground speed sensors and an object of the invention is therefore to provide a vehicle speed detection system capable of correcting errors due to pitching of a vehicle body and variations in elevation of the ground near the vehicle.

Another object of the present invention is to provide a vehicle speed detection system incorporating a Doppler sensor that can be installed at high levels in a vehicle while maintaining a high accuracy of ground speed detection.

This invention is also primarily a system to identify, locate and monitor objects outside of a motor vehicle, such as a tractor, bulldozer, automobile or truck, by illuminating the objects outside of the vehicle with electromagnetic or ultrasonic radiation, and if electromagnetic, preferably infrared radiation, or using radiation naturally emanating from the object, or reflected from the environment and using one or more horns, reflectors or lenses to focus images of the contents onto one or more arrays of charge coupled devices (CCDs) or CMOS arrays, or on a single detector. Outputs from the CCD or CMOS arrays or other detector may be analyzed by appropriate computational means employing trained pattern recognition technologies, to classify, identify and/or locate the external objects. In general, the information obtained by the identification and monitoring system may be used to affect the operation of at least one other system in the vehicle.

In some embodiments of the invention, several CCD or CMOS arrays are placed in such a manner that the position and the motion of an object toward the vehicle can be monitored as a transverse motion across the field of the array. In this manner, the need to measure the distance from the array to the object is obviated. In other embodiments, a source of infrared light is a pulse modulated laser which permits an accurate measurement of the distance to the point of reflection through the measurement of the time-of-flight of the radiation pulse which may use the technique of range gating. In still other embodiments, a scanning array of infrared LEDs are used to illuminate spots on the object in such a manner that the location of the reflection of the spot in the field of view provides information as to the location of the object relative to the vehicle through triangulation.

In some embodiments, the object being monitored is the ground.

In still other embodiments, a scanning laser diode or equivalent is modulated and the distance determined by phase measurement with or without range gating. The light can also be modulated with more than one frequency, or with a random, pseudo-random or other code to extend the range without a loss in range accuracy at the expense of slightly more complicated electronics and/or software.

In some applications, a trained pattern recognition system, such as a neural network or neural-fuzzy system, is used to identify the object in the blind spot of the vehicle. In some of these cases, the pattern recognition system determines which of a library of images most closely matches the object in the blind spot and thereby the location of the object can be accurately estimated from the matched images and the relative size of the captured image thus removing the requirement for special lighting or other distance measuring systems.

Principle objects and advantages of the sensing system in accordance with the invention are:

1. To provide an accurate and low cost vehicle ground speed sensor.

2. To provide a ground speed sensor that does not emit RF radiation

3. To provide a ground speed sensor that can be mounted high on the vehicle to minimize contamination and thus loss of accuracy of the device.

4. To provide a ground speed sensor that is self-cleaning.

5. To provide a ground speed sensor that compensates for changes in the level or slope of the ground.

6. To provide a ground speed sensor that compensates for the pitch angle of the vehicle.

7. To accurately sense the vehicle ground velocity and to provide for an accurate distribution of agricultural products.

Other objects and advantages of the invention, or other disclosed inventions, are:

1. To recognize the presence of an object in the blind spot on either side, in the front, or the rear of a vehicle and to use this information to affect the operation of another vehicle system such as the steering wheel, brake system, collision warning system, among others.

2. To recognize the presence of a particular object in a blind spot of a motor vehicle and then to determine its position and/or velocity and to use this information to affect the operation of another vehicle system.

3. To determine the position, velocity or size of an object in a blind spot of a motor vehicle and to utilize this information to control the velocity or direction of motion of the vehicle.

4. To provide an anticipatory sensor that permits accurate identification of the about-to-impact object in the presence of snow and/or fog whereby the sensor is located within the vehicle.

5. To provide a smart headlight dimmer system which senses the headlights from an oncoming vehicle or the tail lights of a vehicle in front of the subject vehicle and identifies these lights differentiating them from reflections from signs or the road surface and then sends a signal to dim the headlights and optionally to notify the exterior monitoring system of the existence and location of these other vehicles.

6. To provide a blind spot detector that detects and categorizes an object in the driver's blind spot or other location in the vicinity of the vehicle, and warns the driver in the event the driver begins to change lanes, for example, or continuously informs the driver of the state of occupancy of the blind spot.

7. To provide a vehicle exterior monitoring system which has high resolution permitting the location of all objects proximate to the vehicle to be accurately determined.

8. To provide an object vehicle exterior monitoring system which reduces the glare from sunlight and headlights by imposing a filter between the eyes of an occupant and the light source and then sends a signal to dim the headlights and optionally to notify the exterior monitoring system of the existence and location of these other vehicles.

9. To provide a camera system for exterior monitoring, which can adjust on a pixel by pixel basis for the intensity of the received light.

10. To use modulated illumination to determine the distance to objects in the blind spot either at particular representative points, on a line or on a pixel by pixel basis.

11. To provide a high dynamic range camera system for exterior monitoring, which permits image acquisition during a wide range of ambient lighting conditions permitting its use at night and during strong daylight sunlight conditions.

12. To provide an active pixel camera system for exterior monitoring, which permits image acquisition during a wide range of ambient lighting conditions permitting its use at night and during strong daylight sunlight conditions and also permits the addition of other influencing electronic or optic element within the CMOS structure.

13. To provide a method of obtaining distance measurements to elements of objects exterior to the vehicle by using either time-of-flight or modulated light and phase comparison or differential amplitude information.

14. To provide a method of obtaining three-dimensional information of objects exterior to the vehicle by using either time-of-flight or modulated light and phase comparison information.

15. To provide a device for obtaining three-dimensional information of an object exterior to the vehicle by using an electronic shutter or light valve to control the passage of light reflected from the object as a function of the phase of such reflected light.

These and other objects and advantages will become apparent from the following description of the preferred embodiments of the vehicle exterior identification and monitoring system of this invention.

In order to achieve one or more the foregoing objects, a vehicle in accordance with the invention comprises a ground speed sensor arranged to detect the speed of travel of the vehicle on the ground and including a wave transmitter arranged to transmit waves toward the ground, a wave receiver arranged to received waves reflected from the ground after transmission by the wave transmitter, and a processor coupled to the wave transmitter and the wave receiver and arranged to determine the speed of travel of the vehicle on the ground based on the waves transmitted by the wave transmitter and the waves received by the wave receiver. The waves are transmitted by the wave transmitter in pulses or modulated such that the processor is able to determine the distance between a wave-transmission and reception point and the ground and the velocity of the vehicle based on analysis of the waves transmitted by the wave transmitter and the waves received by the wave receiver.

A control unit may be provided for controlling the wave transmitter to direct the wave transmitter to transmit waves in pulses. The wave transmitter may include a modulator for enabling the transmission of modulated waves in which case, the control unit controls the modulator such that the wave transmitter transmits modulated waves.

Also, the control unit may be arranged to affect the transmission of waves by the wave transmitter to enable the processor to determine the distance between a wave-transmission and reception point and the ground based on an analysis of the waves transmitted by the wave transmitter and the waves received by the wave receiver.

The processor may determine the speed of travel of the vehicle on the ground based on the time difference between the transmitted waves and the received waves.

For agricultural uses, the vehicle may include a storage mechanism defining a compartment in which product to be distributed is stored, a distribution mechanism for distributing the product, a driving mechanism for conveying the product from the storage mechanism to the distribution mechanism at a controlled rate and a control mechanism for controlling the driving mechanism. The ground speed sensor is coupled to the control mechanism to provide the detected speed of travel of the vehicle to the control mechanism such that the control mechanism controls the driving mechanism based on the detected speed of travel of the vehicle.

A user interface may be coupled to the control mechanism for enabling input of commands to the control mechanism such that the control mechanism controls the driving mechanism based in part on the commands input via the user interface. The user interface may comprises operator settings or input mechanism, and/or a display coupled to the control mechanism for displaying information about the product.

The control mechanism may be arranged to calculate the rate at which the driving mechanism conveys product from the storage mechanism to the distribution mechanism based on the detected speed of travel of the vehicle.

The driving mechanism may comprises a metering wheel rotatable at an adjustable rate and arranged in communication with the storage compartment to meter the product into the distribution mechanism. The control mechanism thus control the rotation rate of the metering wheel.

The vehicle can include a frame in which case, the storage mechanism, the distribution mechanism, the driving mechanism and the processor are arranged on the frame.

The distribution mechanism may comprise one or more singulator disks arranged in communication with the storage compartment to meter the product into the distribution mechanism. In this case, the control mechanism control the rotation rate of the singulator disk(s).

In the alternative, the distribution mechanism may comprise a pump having a variable output flow rate and arranged in communication with the storage compartment to vary the flow of the product into the distribution mechanism. In this case, the control mechanism control the output flow rate of the pump.

A compass may be coupled to the control mechanism to provide a directional heading of the vehicle to the control mechanism such that the control mechanism controls the driving mechanism based on the directional heading of the vehicle.

In one embodiment, the ground speed sensor includes a compensation mechanism for eliminating the influence of a pitching angle of the vehicle on the detection of the speed of travel of the vehicle.

As to the manner in which the speed of travel of the vehicle is calculated, the wave transmitter may be arranged to transmit waves which impact the ground at an angle θ and the processor arranged to calculate the speed of the vehicle in the direction that the waves are transmitted (V cos θ) and then calculate the speed of travel of the vehicle in a horizontal plane (V) by dividing the speed of the vehicle in the direction that the waves are transmitted by cos θ. Also, the wave transmitter may be arranged to transmit electromagnetic waves at a frequency f and which impact the ground at an angle θ and the processor is arranged to calculate the speed of the vehicle in the direction that the waves are transmitted (V cos θ) and then calculate the speed of travel of the vehicle in a horizontal plane (V) by dividing the speed of the vehicle in the direction that the waves are transmitted by 2f cos θ and multiplying by the electromagnetic wave propagation velocity.

The wave transmitter and wave receiver may be collocated in a common sensor. Moreover, this sensor may be movably mounted to a frame such that the sensor moves in a curve about a center of rotation of the vehicle upon pitching of the vehicle whereby pitching of the vehicle changes rotates the sensor changing an effective transmission angle of the sensor relative to the ground. A measuring mechanism is provided for measuring the pitching angle of the vehicle and for providing a reference angle for determining pitching of the vehicle. The measuring mechanism is coupled to the processor such that the processor determines the pitching of the vehicle relative to the ground based on the measured pitching angle measured and the measured reference angle. The measuring mechanism may comprise a gravity or tilt sensor. Another comparable system could be mounted on a side of the vehicle to detect the roll angle of the vehicle. In this case, an inertial measurement unit is formed by the pitch angle measurement mechanism, the roll angle measurement system, a compass which provides a directional heading of the vehicle, the wave transmitter, the wave receiver and the processor.

A two antenna GPS receiver for enabling measurement of the pitching angle of the vehicle relative to the ground may also be provided.

The wave transmitter may be arranged to transmit waves at an known angle to the ground. The processor calculates the Doppler velocity and distance that the transmitted waves travel to the ground and return and calculates the pitching angle of the vehicle relative to the ground based on the known angle of transmission of the waves, the calculated Doppler velocity and the calculated distance of travel of the waves.

A detection system for detecting contact between a rear portion of the vehicle and the ground may be provided. The processor provides the speed of travel of the vehicle on the ground only when the detection system detects contact between the rear portion of the vehicle and the ground.

The wave transmitter may be mounted on the frame to transmit waves at an angle of about 35° to the ground when the frame is level. The wave transmitter and the receiver may be mounted on a frame, e.g., a bulldozed body, at a height of at least 1 meter from a bottom of the vehicle.

The processor may be designed to compensate for slipping of a wheel of the vehicle. Also, the processor may determine the speed of travel of the vehicle on the ground based on a plurality of time intervals between transmission of waves by the wave transmitter and reception of waves by the wave receiver and/or the speed of travel of the vehicle on the ground based on a measurement of the Doppler frequency.

A display may be coupled to the ground speed sensor for displaying the detected speed of travel of the vehicle.

A temperature sensor may be coupled to the processor and arranged to measure ambient temperature. The processor factors in the ambient temperature as measured by the temperature sensor in the determination of the speed of travel of the vehicle. Furthermore, a barometric sensor may be coupled to the processor and arranged to measure atmospheric pressure. The processor factors in the atmospheric pressure as measured by the barometric sensor in the determination of the speed of travel of the vehicle. Also, an anemometer may be coupled to the processor and arranged to measure wind speed. The processor would then factor in the wind speed as measured by the anemometer in the determination of the speed of travel of the vehicle.

The wave transmitter may comprise at least one laser, a pulsed laser or a continuous laser beam directing infrared light to scan in a line and transmitter control mechanism for controlling the scanning laser beam of infrared light such that the infrared light traverses an area of the ground near the vehicle. In the latter case, the wave receiver ay comprise a single pixel receptor. The wave receiver may comprise at least one of a CCD array, a CMOS array and an HDRC camera, a dynamic pixel camera and an active pixel camera. The wave transmitter may be arranged to transmit ultrasonic waves and the wave receiver to receive ultrasonic waves. Also, the wave transmitter may be arranged to transmit radar and/or infrared waves and the wave receiver to receive radar and/r infrared waves.

When the wave transmitter is arranged to transmit electromagnetic waves and the wave receiver to receive electromagnetic waves, the processor may be arranged to determine both the distance between a wave transmission and reception point and the ground based on a phase difference or time of flight between the transmitted and received waves and the speed of travel of the vehicle on the ground based on the Doppler velocity. The wave receiver optionally includes a notch filter for filtering light other than infrared light emitted by the wave transmitter. Optionally, the wave receiver comprises a light valve.

In another embodiment of the invention, the vehicle comprises a wave emitting mechanism arranged on the vehicle for emitting waves at an angle toward the ground near the vehicle, a receiver mechanism arranged on the vehicle for receiving waves reflected from the ground near the vehicle, a vehicular system adapted to be controlled or adjusted based on the velocity of the vehicle relative to the ground, and a processor coupled to the wave emitting mechanism, the receiver mechanism and the vehicular system for determining the velocity of the vehicle relative to the ground and the distance to the ground based on the transmission of waves by the wave emitting mechanism and reception of waves by the receiver mechanism. The processor uses the determined distance to correct the determined velocity of the vehicle relative to the ground and controlling the vehicular system based on the corrected velocity. The waves are transmitted by the wave emitting mechanism in pulses or modulated such that the processor is able to determine the distance between a wave-transmission and reception point and the ground and the velocity of the vehicle based on analysis of the waves transmitted by the wave emitting mechanism and the waves received by the wave receiver mechanism. The same features described for the vehicle above may be used in this embodiment as well.

In another embodiment of the invention, an agricultural product distribution vehicle comprises storage mechanism for storing agricultural product to be distributed, conveying mechanism for conveying agricultural product from the storage mechanism to the ground, and control mechanism for controlling a rate of transfer of the agricultural product from the storage mechanism through the conveying mechanism for distribution to the ground. The control mechanism include an operation system for automatically controlling the transfer of agricultural product at a rate dependent on the product to be distributed and the determined average needs of the field and the vehicle ground speed and a user interface for inputting operator settings related to the product and field properties. A ground speed sensor detects the speed of travel of the vehicle on the ground and comprises a wave transmitter arranged to transmit waves toward the ground, a wave receiver arranged to received waves reflected from the ground after transmission by the wave transmitter, and a processor coupled to the wave transmitter and the wave receiver and arranged to determine the speed of travel of the vehicle on the ground based on the waves transmitted by the wave transmitter and the waves received by the wave receiver. The waves are transmitted by the wave transmitter in pulses or modulated such that the processor is able to determine the distance between a wave-transmission and reception point and the ground and the velocity of the vehicle based on analysis of the waves transmitted by the wave transmitter and the waves received by the wave receiver. To the extent possible, the same features described for the vehicle above may be used in this embodiment as well.

These objects of the invention can be achieved by a ground speed detection system incorporating a Doppler sensor according to one aspect of the invention, the detection system comprising:

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
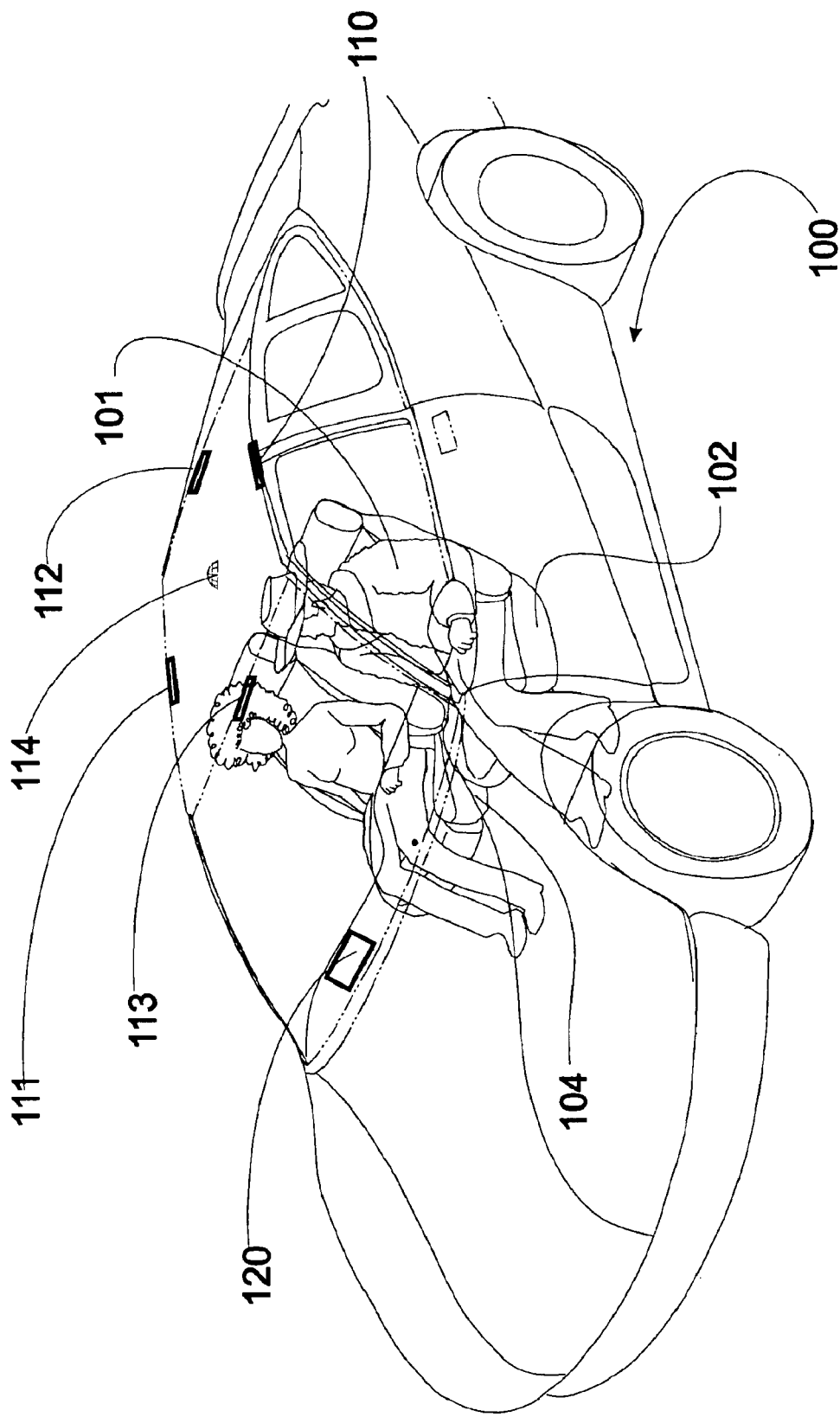
FIG. 1 is a perspective view of an automobile showing a preferred mounting location for the optical blind spot detection system in accordance with the invention.

Referring now to the drawings wherein the same reference numerals refer to like elements, a perspective semi-transparent view of an automobile is shown generally as 100 in FIG. 1. A driver 101 of the automobile sits on a front seat 102. Five transmitter and/or receiver assemblies 110, 111, 112, 113 and 114 are positioned at various places with views of the environment surrounding the vehicle. A processor such as control circuitry 120 is connected to the transmitter/receiver assemblies 110–114 by appropriate wires, not shown, or wirelessly and controls the transmission of waves or energy from the transmitter portion of the assemblies 110–114 and captures the return signals received by the receiver portion of the assemblies 110–114. Control circuitry 120 usually contains one or more analog to digital converters (ADCs) or frame grabbers, a microprocessor containing sufficient memory and appropriate software including pattern recognition algorithms, and other appropriate drivers, signal conditioners, signal generators, etc. Usually, in any given implementation, only two to four of the transmitter/receiver assemblies would be used.

These optical transmitter/receiver assemblies 110–114, also referred to herein as transducer assemblies, are comprised of an optical transmitter or light emitting component, which may be an infrared LED, a laser with a diverging lens, a floodlight or a scanning laser assembly, any of which can be pulsed or modulated, and a receiver such as a CCD or CMOS array or pin diode or equivalent photo detector. If modulation is used, it can be frequency, amplitude or pulse-modulated and the modulation scheme can be sine wave or code and if code, the code can be random or pseudorandom. Preferably, a transmitter/receiver assembly comprises an active pixel CMOS array or an HDRC array as discussed below. The transducer assemblies map the location of the objects and features thereof, in a two and/or three-dimensional image as will also be described in more detail below.

The foregoing examples of possible wave/energy/light emitting components and light/wave/energy receiver components are not intended to limit the invention and it should be understood by those skilled in the art that other transmitter and receiver components and combinations can be used in accordance with the invention without deviating from the scope and spirit thereof.

In a preferred embodiment, four transducer assemblies 110–113 are positioned around the exterior of the vehicle in the spaces to be monitored, each comprising one or more LEDs or scanning laser diodes and a CMOS array with a light valve and an appropriate lens. Although illustrated together, the illuminating source will frequently not be co-located with the receiving array particularly when triangulation distance measurement is used, as described in more detail below. The LED or laser emits a controlled angle diverging beam of infrared radiation that illuminates a particular space and illuminates an object at a particular point that depends on the location of the object relative to the vehicle and the direction of the LED or laser beam.

The image from each array is used to capture two or three dimensions of object position information, thus, the array of assembly 110, which is located approximately behind the driver's door on the B-pillar provides both vertical and transverse information on the location of an object in the vicinity of the vehicle. A similar view from a location on the passenger side is obtained from the array of assembly 111. The mounting locations of the assemblies 110,111 shown in FIG. 1 are exemplary and are not intended to limit the possible positions for placement of the assemblies. Other positions for installation of the assemblies on the sides of the vehicle are contemplated. For example, the assemblies 110, 111 could be placed on the side of the vehicle alongside the passenger compartment, engine compartment or trunk compartment.

If the receiving array of assembly 110 contains a matrix of 100 by 100 pixels, then 10,000 pixels or data elements of information will be created each time the system interrogates the space on the driver side of the vehicle, for example. Interrogation of the space on the driver side of the vehicle would entail commanding the assembly 110 to transmit optical waves or energy into the environment surrounding the vehicle by means of the transmitter component of the assembly 110 and receiving any reflected optical waves or energy by the receiver component of the assembly 110.

There are many pixels of each image that can be eliminated because they do not contain any useful information. This typically includes the corner pixels and other areas where an object cannot reside. This pixel pruning can typically reduce the number of pixels by up to 20 percent resulting in approximately 8,000 remaining pixels. The output from each array is then preferably preprocessed to extract the salient features and fed to an artificial neural network, or other pattern recognition system, to identify the object or ascertain the identity of the object.

The preprocessing step frequently makes use of distance information to separate one object from another and from other parts of the captured scene. Once this operation is completed for all of the object images, the identification of the objects in the space proximate to the driver side of the vehicle has been determined.

The feature extraction frequently involves identifying the edges of objects in the field of view and the angular orientation of the found edges. The locations of the edges and their orientation can then be input into appropriate recognition software. Other feature extraction techniques are also applicable.

A pattern recognition technique such as a trained neural network can be used to determine which of the trained occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of different objects and an appropriate icon. For the case of FIG. 1, it is also known from one of the techniques to be described below where the object is located relative the vehicle.

There are many mathematical techniques that can be applied to simplify the above process. One technique used in military pattern recognition, for example, uses the Fourier transform of particular areas in an image to match by correlation with known Fourier transforms of known images. In this manner, the identification and location can be determined simultaneously. There is even a technique used for target identification whereby the Fourier transforms are compared optically. Other techniques utilize thresholding to limit the pixels that will be analyzed by any of these processes. Still other techniques search for particular features and extract those features and concentrate merely on the location of certain of these features.

A particularly useful technique, as mentioned above, calculates the location of the edges of the object in the blind spot and uses these extracted edges as the features that are fed to the neural network. (See, for example, the Kage et al. artificial retina paper referenced above which, together with the references cited therein, is incorporated herein by reference.)

The principle used in this embodiment of the invention is to use images of different views of an object in the blind spot to correlate with known images that were used to train a neural network for blind spot occupancy. Then, carefully measured positions of the known images are used to locate particular parts of the object such as the windshield, tires, radiator grill, headlights, etc.

An alternate approach is to make a three-dimensional map of the object in the blind spot based on the optical energy or waves received by the receiver components of the assemblies 110–114 and to precisely locate these features using neural networks, fuzzy logic or other rules. One method of obtaining a three-dimensional map is to utilize a scanning laser radar system where the laser is operated in a pulse mode and the distance from the object being illuminated is determined using range-gating in a manner similar to that described in various patents on micropower impulse radar to McEwan. (See, for example, U.S. Pat. Nos. 5,457,394 and 5,521,600). Alternately, the laser can be modulated and the phase of the reflected and the transmitted light can be compared to determine the distance to the object.

The scanning portion of the laser radar device can be accomplished using rotating mirrors, mechanical motors, galvanometer mirrors, MEMS mirrors or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used). An alternate method is to use a micromachined mirror, which is supported at its center or edge and caused to deflect by miniature coils or electrostatically. Such a device has been used to provide two-dimensional scanning to a laser. This has the advantage over the $TeO_2$— lithium niobate technology in that it is inherently smaller and lower cost and provides two-dimensional scanning capability in one small device. The maximum angular deflection that can be achieved with this process is in the order of about 10 degrees. A diverging lens or mirror can be used to achieve a greater angular scan if necessary. A preferred approach is to use passive optical images with superimposed infrared dots created by an array of infrared laser diodes in a manner similar to that described in U.S. Pat. No. 6,038,496 discussed above and incorporated herein in its entirety by reference.

An alternate method of obtaining three-dimensional information from a scanning laser system is to use multiple arrays to replace the single arrays used in FIG. 1. In the case, the arrays are displaced from each other and, through triangulation, the location of the reflection from the illumination by a laser beam of a point on the object can be determined by triangulation and/or correlation in a manner that is understood by those skilled in the art.

One important point concerns the location and number of optical assemblies. For an automobile, one assembly is generally placed on each side of the vehicle such as shown by assemblies 110, 111. In some embodiments, a third assembly 112 can be placed to view the blind spot behind the vehicle and a fourth assembly 113 can be placed to view in front of the vehicle for cruise control.

An alternate configuration is shown at 114 which is a lens arrangement which provides a view of 360 degrees by approximately 20 degrees. Although this camera does not provide as complete a view of objects in the various blind spots, it is possible using a single device to observe areas on both sides as well as the front and back of the vehicle. The same lens is used for receiving the images and for projecting a rotating scanning laser beam that approximately bisects the 20-degree angle. This rotating laser beam is modulated thereby permitting the distance to the reflected laser light to be determined. A rotating mirror, that also serves to deflect the laser beam, captures the returned laser light. This mirror is positioned so that it is above the portion of the lens used for receiving the images such that laser system does not interfere with the imaging system.

Special lenses are used to collect the light from the spherical segmented lens and project the combined image onto a CMOS imager. In some cases, software is provided to remove known distortions for image analysis or, in other cases, this is not necessary as the pattern recognition system has been trained on the combined received image, or a segmented version thereof which divides the image into, for example, four segments representing front, right, rear, and left quadrants.

The particular locations of the optical assemblies are selected to provide accurate information as to the locations of objects in the blind spots. This is based on an understanding of what information can be best obtained from a visual image. There is a natural tendency on the part of humans to try to gauge distance from the optical sensors directly. This typically involves focusing systems, stereographic systems, multiple arrays and triangulation, time-of-flight measurement, phase comparison, etc. What is not intuitive to humans is to not try to obtain this distance directly from apparatus or techniques associated with the mounting location but instead to get it from another location. Whereas ultrasound is quite good for measuring distances from the transducer (the z-axis), optical systems are better at measuring distances in the vertical and lateral directions (the x and y-axes).

For monitoring the interior of the vehicle, such as described in U.S. Pat. No. 6,324,453, which is incorporated herein by reference, this can more easily done indirectly by another transducer. That is, the z-axis to one transducer is the x-axis to another. For external monitoring, the preferred approach, as described below, is to use an array of LEDs or a scanning laser and locate the position of the object in blind spot by triangulation, time-of-flight or phase measurement although sometimes appropriately located cameras in concert can provide three-dimensional information directly.

Systems based on ultrasonics and neural networks, and optics and optical correlation have been very successful in analyzing the seated state of both the passenger and driver seats in the interior of automobiles. Such systems are now in production for preventing airbag deployment when a rear facing child seat or an out-of-position occupant is present. The ultrasonic systems, however, suffer from certain natural limitations that prevent the system accuracy from getting better than about 99 percent. These limitations relate to the fact that the wavelength of ultrasound is typically between 3 mm and 8 mm. As a result, unexpected results occur which are due partially to the interference of reflections from different surfaces.

Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches, although this has been recently improved. These limitations are also present in the use of ultrasound for exterior vehicle monitoring.

In contrast, the wavelength of the portion of the infrared spectrum that is contemplated for one preferred use in the invention is less than five microns and no significant interferences occur. As a result, resolution of the optical system is determined by the pixel spacing in the CCD or CMOS arrays or the speed of the pin diode and scanner when used. For this application, typical arrays have been selected to be 100 pixels by 100 pixels and therefore, the space being imaged can be broken up into pieces that are significantly less than a few inches in size. Naturally, if greater resolution is required, arrays having larger numbers of pixels are readily available.

Another advantage of optical systems is that special lenses can be used to magnify those areas where the information is most critical and operate at reduced resolution where this is not the case. For example, the area closest to the center of the blind spot can be magnified and those areas that fall out of the blind spot, but are still being monitored, can be reduced. This is not possible with ultrasonic or radar systems where it is even very difficult to get an image of sufficient resolution to permit an identification of the object to be accomplished.

Additional problems of ultrasonic systems arise from the slow speed of sound and diffraction caused by variations in air density. The slow sound speed limits the rate at which data can be collected and thus eliminates the possibility of tracking the motion of an object moving at high speed relative to the vehicle.

In the embodiment shown in FIG. 1, transmitter/receiver assemblies 110–114 may be designed to emit infrared waves that reflect off of objects in the blind spot and return thereto. Periodically, the assemblies 110–114, as commanded by control circuit 120, transmits a pulse of infrared waves and the reflected signal is detected by a different assembly. Alternately, a continuous scanning arrangement can be used. The transmitters can either transmit simultaneously or sequentially. An associated electronic circuit and algorithm in control circuit 120 processes the returned signals as discussed above and determines the identity and location of the object in the blind spot. This information is then sent to a warning system that alerts the driver to the presence of the object as described in more detail below. Although a driver side system has been illustrated, a similar system is also present on the passenger side and can be applied to the front and rear of the vehicle.

The accuracy of the optical sensor is dependent upon the accuracy of the camera. The dynamic range of light external to a vehicle exceeds 120 decibels. When a car is driving at night, for example, very little light may be available whereas when driving in a bright sunlight, the light intensity can overwhelm most cameras. Additionally, the camera must be able to adjust rapidly to changes and light caused by, for example, the emergence of the vehicle from a tunnel, or passing by other obstructions such as trees, buildings, other vehicles, etc. which temporarily block the sun and cause a strobing effect at frequencies approaching 1 kHz.

Recently, improvements have been made to CMOS cameras that have significantly increased their dynamic range. New logarithmic high dynamic range technology such as developed by IMS Chips of Stuttgart, Germany, is now available in HDRC (High Dynamic Range CMOS) cameras. This technology provides a 120 dB dynamic intensity response at each pixel in a monochromatic mode. The technology thus has a 1 million to one dynamic range at each pixel. This prevents blooming, saturation and flaring normally associated with CMOS and CCD camera technology. This solves a problem that will be encountered in an automobile when going from a dark tunnel into bright sunlight.

There is also significant infrared radiation from bright sunlight and from incandescent lights. Such situations may even exceed the dynamic range of the HDRC camera and additional filtering may be required. Changing the bias on the receiver array, the use of a mechanical iris, light valve, or electrochromic glass or liquid crystal or a similar filter can provide this filtering on a global basis but not at a pixel level. Filtering can also be used with CCD arrays, but the amount of filtering required is substantially greater than that required for the HDRC camera.

Liquid crystals operate rapidly and give as much as a dynamic range of 10,000 to 1 but may create a pixel interference effect. Electrochromic glass operates more slowly but more uniformly thereby eliminating the pixel effect. The pixel effect arises whenever there is one pixel device in front of another. This results in various aliasing, Moire patterns and other ambiguities. One way of avoiding this is to blur the image. Another solution is to use a large number of pixels and combine groups of pixels to form one pixel of information so that the edges and blurred and eliminate some of the problems with aliasing and Moire patterns. Finally, various light valves based on Kerr or Pockel cells can be used with few problems.

One straightforward approach is the use a mechanical iris. Standard cameras already have response times of several tens of milliseconds range. They will switch, for example, at the frame rate of a typical video camera (1 frame=0.033 seconds). This is sufficiently fast for categorization but probably too slow for dynamic object position tracking when the object in the blind spot is traveling at a high speed relative to the host vehicle.

An important feature of the IMS Chips HDRC camera is that the full dynamic range is available at each pixel. Thus, if there are significant variations in the intensity of light within the vehicle blind spot, and thereby from pixel to pixel, such as would happen when sunlight streams and through a row of trees, for example, the camera can automatically adjust and provide the optimum exposure on a pixel by pixel basis. The use of the camera having this characteristic is beneficial to the invention described herein and contributes significantly to system accuracy. CCDs have a rather limited dynamic range due to their inherent linear response and consequently cannot come close to matching the performance of human eyes.

A key advantage of the IMS Chips HDRC camera is its logarithmic response that comes closest to matching that of the human eye. One problem with a logarithmic response is that the variation in intensity from pixel to pixel at an edge may be reduced to the point that the edge is difficult to recognize. A camera with less dynamic range can solve this problem at the expense of saturation of part of the image. One solution is to take several images at a different resolution and combine them in such a manner as to remove the saturation and highlight the edges. This is described in the article "High Dynamic Range Imaging: Spatially Varying Pixel Exposures" referenced above.

Other imaging systems such as CCD arrays can also of course be used with this invention. However, the techniques will be different since the camera is very likely to saturate when bright light is present and to require the full resolution capability when the light is dim. Generally, when practicing this invention, the blind spots will be illuminated with spots or a line of infrared radiation in a scanning mode. If a non-high dynamic range imager is used, the full illumination of the blind spot area may be required.

In a preferred embodiment, infrared illumination is used although this invention is not limited to the use of infrared illumination. However, there are other bright sources of infrared that must be accounted for. These include the sun and any light bulbs that may be present outside the vehicle including headlights from other vehicles. This lack of a high dynamic range inherent with the CCD technology essentially requires the use of an iris, liquid crystal, light valve and/or electrochromic glass or similar filter to be placed between the camera and the scene.

Even with these filters however, some saturation will take place with CCD cameras under bright sun or incandescent lamp exposure. This saturation reduces the accuracy of the image and therefore the accuracy of the system. In particular, the training regimen that must be practiced with CCD cameras is more severe since all of the saturation cases must be considered because the camera is unable to appropriately adjust. Thus, although CCD cameras can be used, HDRC logarithmic cameras such as manufactured by IMS Chips are preferred. HDRC logarithmic cameras not only provide a significantly more accurate image but also significantly reduce the amount of training effort and associated data collection that must be undertaken during the development of the neural network algorithm or other computational intelligence system. Note that in some applications, it is possible to use other more deterministic image processing or pattern recognition systems than neural networks such as optical correlation techniques.

Another important feature of the HDRC camera from IMS Chips is that the shutter time is constant at less than about 100 ns irrespective of brightness of the scene. The pixel data arrives at constant rate synchronous with an internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken at as high as 4000 frames per second with 4 K pixels per frame. This combination allows the maximum resolution for the identification and classification part of the object sensing problem while permitting a concentration on those particular pixels which track the leading edge of the object for dynamic position tracking. In fact, the random access features of these cameras can be used to track multiple parts of the image and thus, in some cases, multiple objects simultaneously while ignoring the majority of the image, and do so at very high speed.

For example, several motorcycles or pedestrians in the blind spot can be tracked simultaneously by defining separate sub-frames for each individual object that is not connected to other objects. This random access pixel capability, therefore, is optimally suited for recognizing and tracking multiple objects in a blind spot. It is also suited for monitoring the environment outside of the vehicle other than for the purpose of blind spot detection such as collision avoidance and anticipatory sensing. Photobit Corporation of 135 North Los Robles Ave., Suite 700, Pasadena, Calif. 91101 manufactures another camera with some characteristics similar to the IMS Chips camera. Other competitive cameras can be expected to appear on the market.

Photobit refers to their Active Pixel Technology as APS. According to Photobit, in the APS, both the photodetector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking.

The APS utilizes intra-pixel amplification in conjunction with both temporal and fixed pattern noise suppression circuitry (i.e., correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD register overflows. Thus, bright lights "bloom" and cause unwanted streaks in the image. The active pixel can drive column buses at much greater rates than passive pixel sensors and CCDs.

On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features are important to many applications of this invention.

U.S. Pat. No. 5,471,515 provides additional information on the APS camera from Photobit, which is incorporated herein by reference. To put this into perspective, a vehicle passing another vehicle at a relative velocity of 60 mph moves approximately 1 inch per millisecond relative to the slower vehicle. This renders the frame rate and computational times critically important and within the capabilities of the HDRC and APS technologies.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of an electrochromic, liquid crystal, light valve or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a higher monitoring rate is required. This occurs for example, in collision avoidance and anticipatory sensor applications as well as in blind spot applications where one vehicle is overtaking another at high speed. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micrometer wavelength range. This range is generally beyond visual range for humans thereby permitting this camera to be used with illumination sources that are not visible to the human eye. A notch frequency filter is frequently used with the camera to eliminate unwanted wavelengths. These cameras are available from the Institute for Microelectronics (IMS Chips), Allamndring 30a, D-70569 Stuttgart, Germany with a variety of resolutions ranging from 512 by 256 to 720 by 576 pixels and can be custom fabricated for the resolution and response time required.

Figure 2:
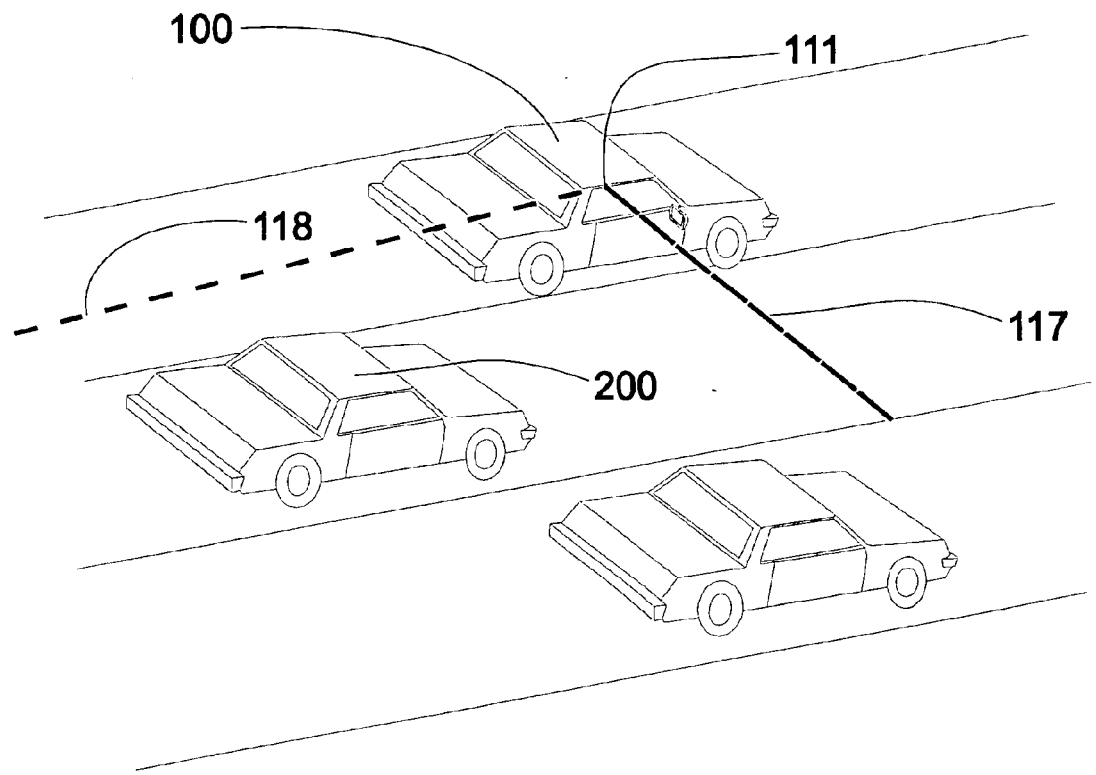
FIG. 2 is a perspective view of the vehicle of FIG. 1 shown operating on a highway.

FIG. 2 illustrates the arrangement of FIG. 1 in a traffic situation. Optical assembly 111 on the subject or "host" vehicle contains an illuminating light source and a CMOS array. The illuminating light source of the optical assembly 111, either an array of scanning LEDs or a scanning laser radar device, distributes infrared radiation or energy in the form of distinct narrow angle beams or a line that covers or fills in the blind spot between bounding lines 117 and 118. Any object such as vehicle 200 that is within this blind spot will be illuminated by infrared and the image of object will be captured by the CMOS array of the optical assembly 111.

Figure 3A:
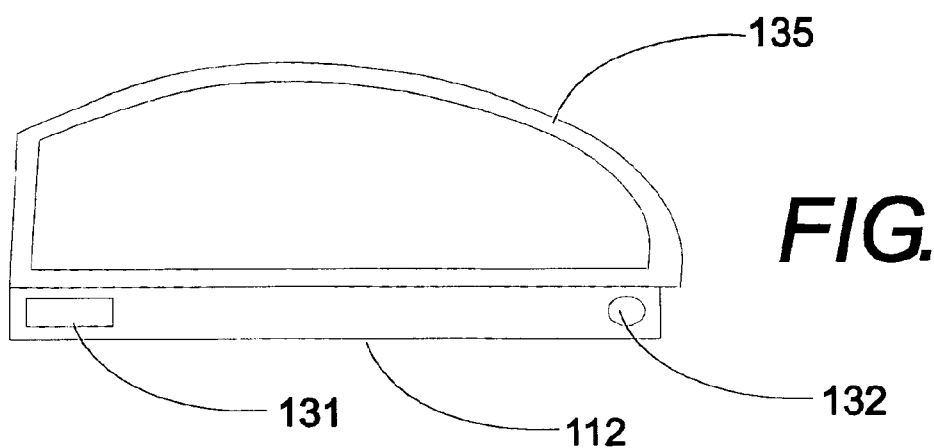
FIG. 3A is a detailed view of an automobile mirror assembly showing the location of a LED array or a scanning laser and the CMOS camera.

An optical infrared transmitter and receiver assembly is shown generally at 112 in FIG. 3A and is mounted onto the side rear view mirror 135. Assembly 112, shown enlarged, comprises a source of infrared radiation including an array of 20 infrared LEDs, shown generally at 131, and a CCD or CMOS array 132 of typically 160 pixels by 160 pixels. The CCD or CMOS array 132 is horizontally spaced apart from the LED array 131. In this embodiment, a "heads-up" display can be used to show the driver an artificial image including the host vehicle and objects in the blind spot as described below.

If two spaced-apart CCD arrays are used (e.g., array 132 and array 133 shown in dotted lines in FIG. 3A), then the distance to the various objects within the blind spot can be found by using a triangulation algorithm that locates similar features on both images and determines their relative location on the images. This is frequently referred to as a stereoscopic system such as described in European Patent Application No. EP 0885782 A1, which is incorporated herein by reference. An alternate method is to use a lens with a short focal length. In this case, the lens is mechanically focused to determine the clearest image and thereby obtain the distance to the object. This is similar to certain camera auto-focusing systems such as one manufactured by Fuji of Japan. Other methods can be used as described in the patents and patent applications referenced above.

Figure 3B:
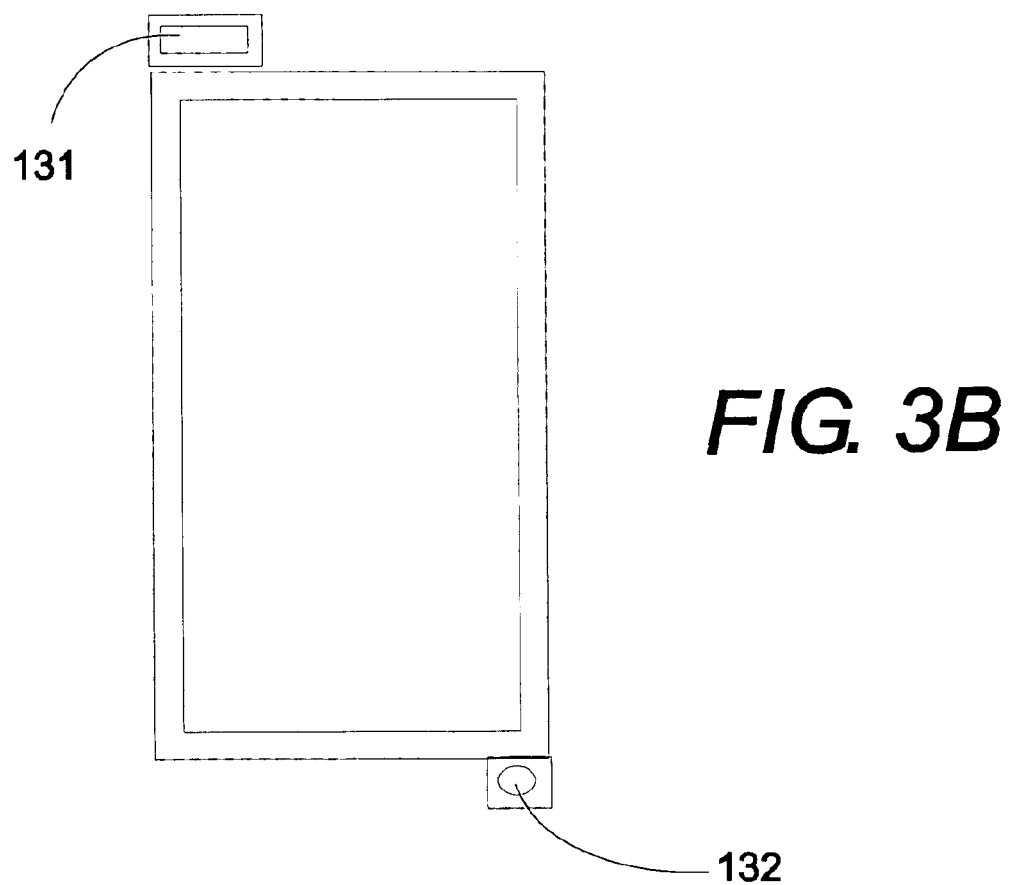
FIG. 3B is a detailed view of a truck mirror assembly showing the location of a LED array or a scanning laser and the CMOS camera.

FIG. 3B shows a similar arrangement for mounting on a truck mirror. In this case, since the geometry of the mirror provides greater separation vertically than horizontally, the illumination source 131 is placed on the top of the mirror housing 134 and the imager 132 is placed at the bottom of the mirror housing 134. The "imager" 132 may comprise a CCD array or CMOS array. Two or more spaced-apart imagers 132 can be used in this embodiment as well and the techniques described above applied to determine the relative location of features in images obtained by the imagers 132.

Once a vehicle exterior monitoring system employing a sophisticated pattern recognition system, such as a neural network or optical correlation system, is in place, it is possible to monitor the motions of the object over time, and thereby determine if the object is acting in a predictable manner. If not, the driver of the host vehicle can be warned so that he or she can take evasive action. For example, a vehicle may be in the blind spot and the driver may be losing control of the vehicle as may happen in a passing situation when the passing vehicle has hit a patch of ice. This warning may be sufficient to allow the driver of the host vehicle to slow down and thereby avoid an accident with the out-of-control vehicle.

The system can also be used to turn on the vehicle hazard lights, sound the horn or take other appropriate action in case the driver of the threatening vehicle has fallen asleep and to warn other adjacent vehicles of a potentially dangerous situation. Thus, in general, another vehicular system can be controlled based on the determination of the presence and/or motion of the object detected in the blind spot. The use of a heads-up display is particularly useful for such a warning system since the driver is presumably looking through the windshield. Out-of-control monitoring can also apply to the host vehicle if its trajectory is unexpected relative to objects along the roadside or other proximate vehicles.

Figure 4:
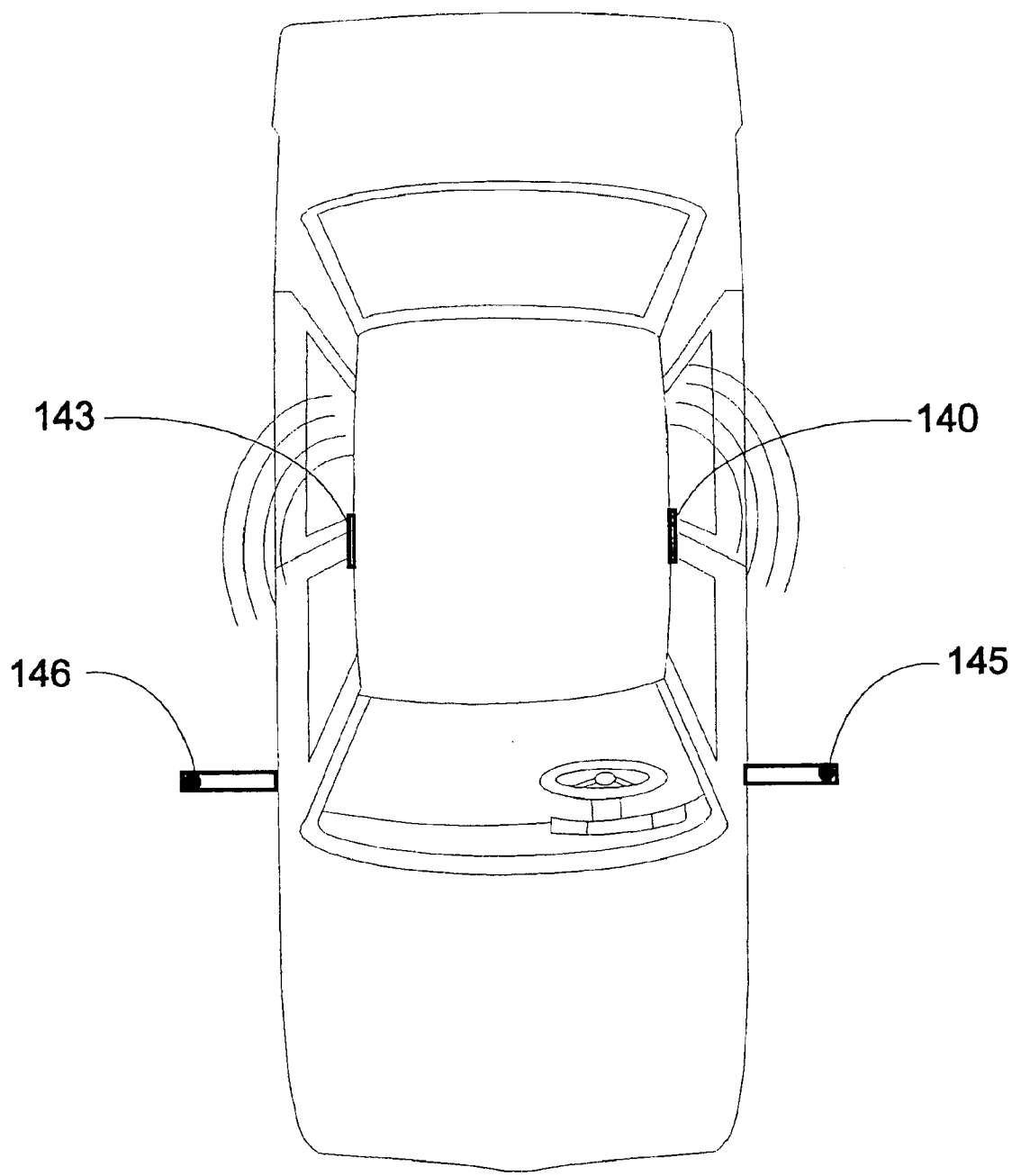
FIG. 4 is an overhead view of an alternate blind spot monitoring system where the light source and camera are not collocated.

Infrared waves are shown coming from side transducer assemblies 140 and 143 in FIG. 4. As such, assemblies 140,143 constitute infrared transmitters. In this case, CMOS imagers 145 and 146 are mounted on the side rear view mirrors providing ample displacement for triangulation calculations. Thus, FIG. 4 shows one arrangement of non-collocated transmitters and receivers, it being understood that other arrangements in which the transmitters are not collocated with the receivers are also within the scope and spirit of the invention.

Figure 5:
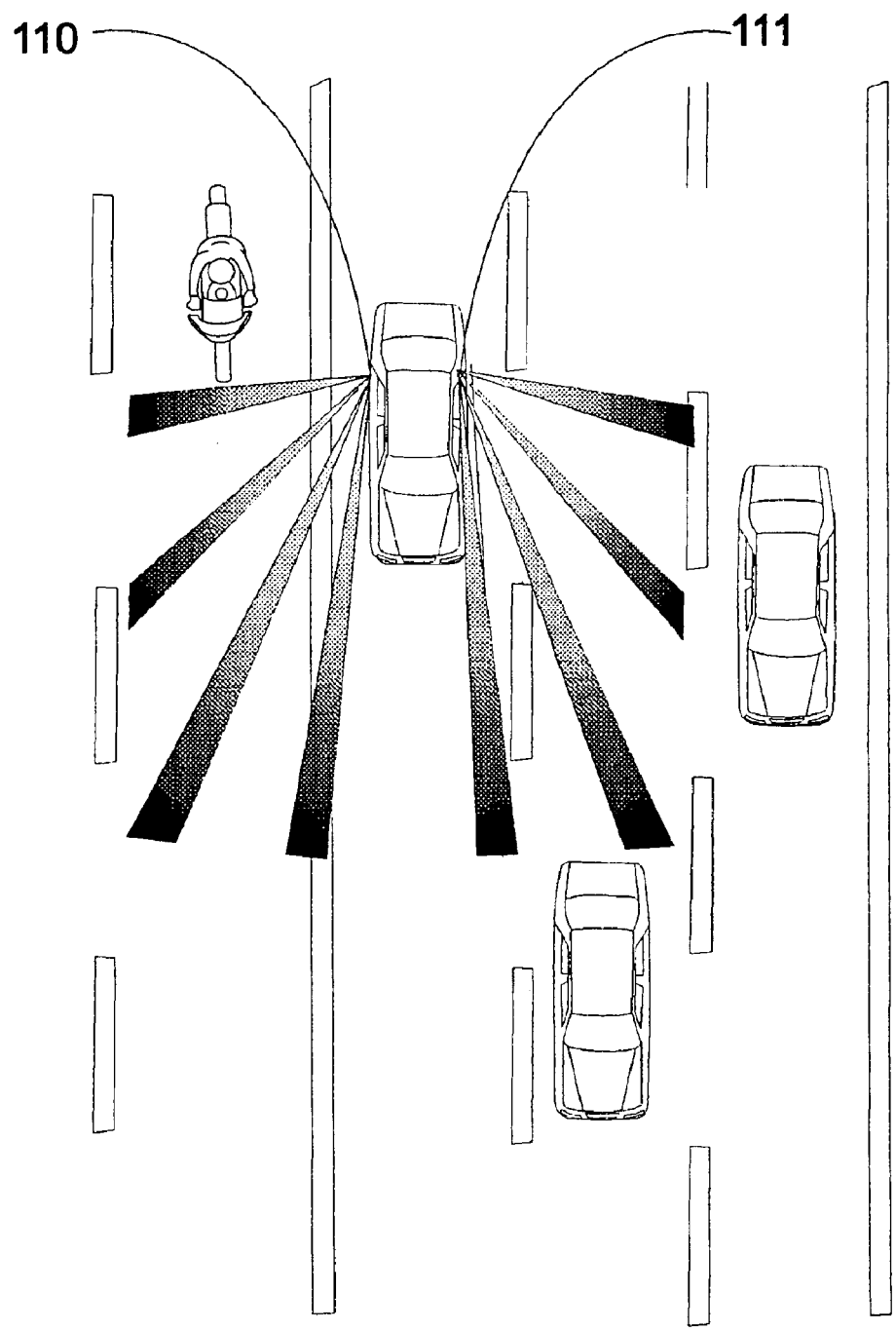
FIG. 5 is a view similar to FIG. 2 however showing the pattern of laser diode illumination projected from a vehicle mirror preferred installation.

FIG. 5 illustrates two optical systems each having a source of infrared radiation and a CCD or CMOS array receiver. In this embodiment, transducer assemblies 110 and 111 are CMOS arrays having 160 by 160 pixels covered by a lens. The lens is carefully designed so that it completely covers the blind spot area under surveillance. One such sensor placed by the left outside mirror where it can monitor the entire vehicle left exterior blind spot with sufficient resolution to determine the occupancy of the blind spot. CCD's such as those used herein are available from Marshall Electronics Inc. of Culver City, Calif.

The lens need not be non-distorting. The distortion of a lens can be designed by modifying the shape of the lens to permit particular portions of the exterior passenger compartment to be observed. The particular lens design will depend on the location on the vehicle and the purpose of the particular receiver. In this example, the light source, which is an array of modulated LCDs (LEDS ????) is collocated with the CMOS imager. Note that although only four beams are illustrated on each side of the vehicle, typically twenty such beams are used. A modulated scanning laser can alternately be used.

CCD arrays are in common use in television cameras, for example, to convert an image into an electrical signal. For the purposes herein, a CCD will be defined to include all devices, including CMOS arrays, TFA arrays, artificial retinas and particularly HDRC and APS arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 120 herein) containing a microprocessor for analysis of the digitized data. In order to minimize the amount of data that needs to be stored, initial processing of the image data can take place as it is being received from the CCD array. In some cases, some image processing can take place on the chip such as described in the Kage et al. artificial retina article referenced above.

One method of determining distance to an object directly without resorting to range finders, requiring multiple arrays, is to use a mechanical focusing system. However, the use of such an apparatus is cumbersome, expensive, and slow and has questionable reliability. An alternative is to use the focusing systems described in U.S. Pat. Nos. 5,193,124 and 5,003,166. However, such systems require expensive hardware and/or elaborate algorithms and again are slow.

Another alternative is where an infrared source having a wide transmission angle such that the entire contents of the blind spot illuminated, a sort of infrared floodlight. The receiving CCD transducers can be spaced apart so that a stereographic analysis can be made by the control circuitry 120. This circuitry 120 contains a microprocessor with appropriate pattern recognition algorithms along with other circuitry as described above. In this case, the desired feature to be located is first selected from one of the two returned images from either of the CCD transducers. The software then determines the location of the same feature, through correlation analysis or other methods, on the other image and thereby, through analysis familiar to those skilled in the art, determines the distance of the feature from the transducers.

Transducer assemblies 110 and 111 are illustrated mounted onto the side mirrors of the vehicle, however, since these transducers are quite small, typically approximately 2 cm on a side, they could alternately be mounted onto the side of the vehicle or many other locations which provide a clear view of the blind spot.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system can be implemented in combination with transducer assemblies 110 or 111. Once a particular feature of an object in the blind spot has been located, this device can be used in conjunction with an appropriate aiming mechanism to direct the laser beam to that particular feature. The distance to that feature is then known to within about 2 cm and with calibration even more accurately.

In addition to measurements within the blind spot, this device has particular applicability in anticipatory sensing applications exterior to the vehicle. An alternate technology using range gating or phase measurements to measure the time-of-flight of electromagnetic pulses with even better resolution can be implemented based on the teaching of the McEwan patents listed above and incorporated herein by reference or by modulation of the laser beam and using phase measurements such as disclosed in U.S. Pat. No. 5,653,462, which is also incorporated herein by reference.

Figure 6A:
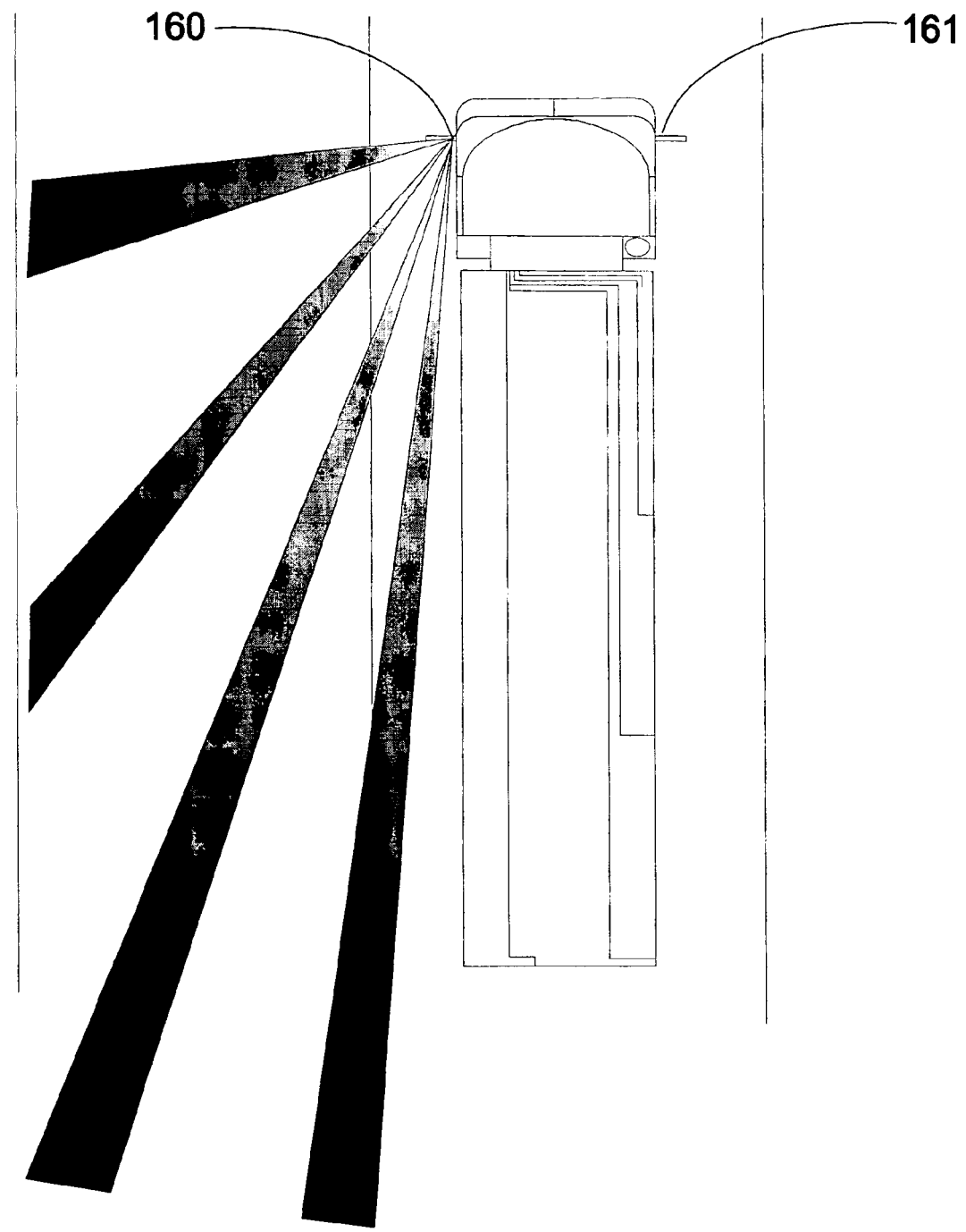
FIG. 6A is a top view of a large truck vehicle showing the coverage of a side blind spot area.
Figure 6B:
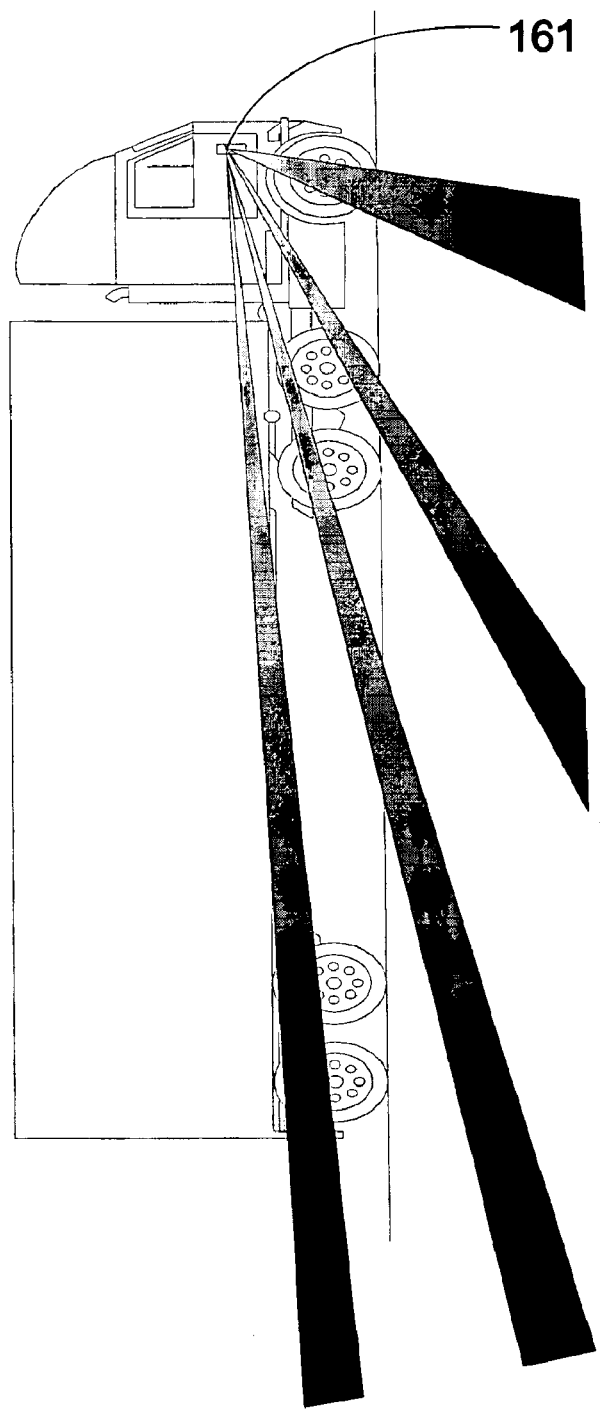
FIG. 6B is a side view of the large truck vehicle of FIG. 6A showing the coverage of a side blind spot area.

FIG. 6A is an overhead view and FIG. 6B a side view of a truck showing preferred mounting locations of optical exterior vehicle monitoring sensors (transmitter/receiver assemblies or transducers) 160,161. In a typical device, the diameter of the lens is approximately 2 cm and it protrudes from the mounting surface by approximately 1 cm. This small size renders these devices almost unnoticeable by observers exterior to the vehicle.

Since the sensors and transducer assemblies used in some embodiments of the invention are optical, it is important that the lens surface remains relatively clean. Control circuitry 120 contains a self-diagnostic feature where the image returned by a transducer assembly or sensor is compared with a stored image and the existence of certain key features is verified. If a receiver part of an assembly or sensor fails this test, a warning is displayed to the driver that indicates that cleaning of the lens surface is required.

The truck system shown in FIGS. 6A and 6B illustrates the use of a single blind spot detection system for the entire length of truck. The fundamental issue that determines the size of the blind spot that can be monitored with a single system relates to the ability to measure the location of the object. When a HDRC camera is used, if an object can seen in the blind spot by the human eye, then the camera should also be able to obtain a reasonable image. At night, this would require that the object in blind spot have some form of attached illumination. On a dark cloudy night, the human eye has trouble seeing a car parked along the roadway with its lights extinguished. The more distant the object, the more difficult it is to obtain a recognizable image if illumination is not present.

Figure 6C:
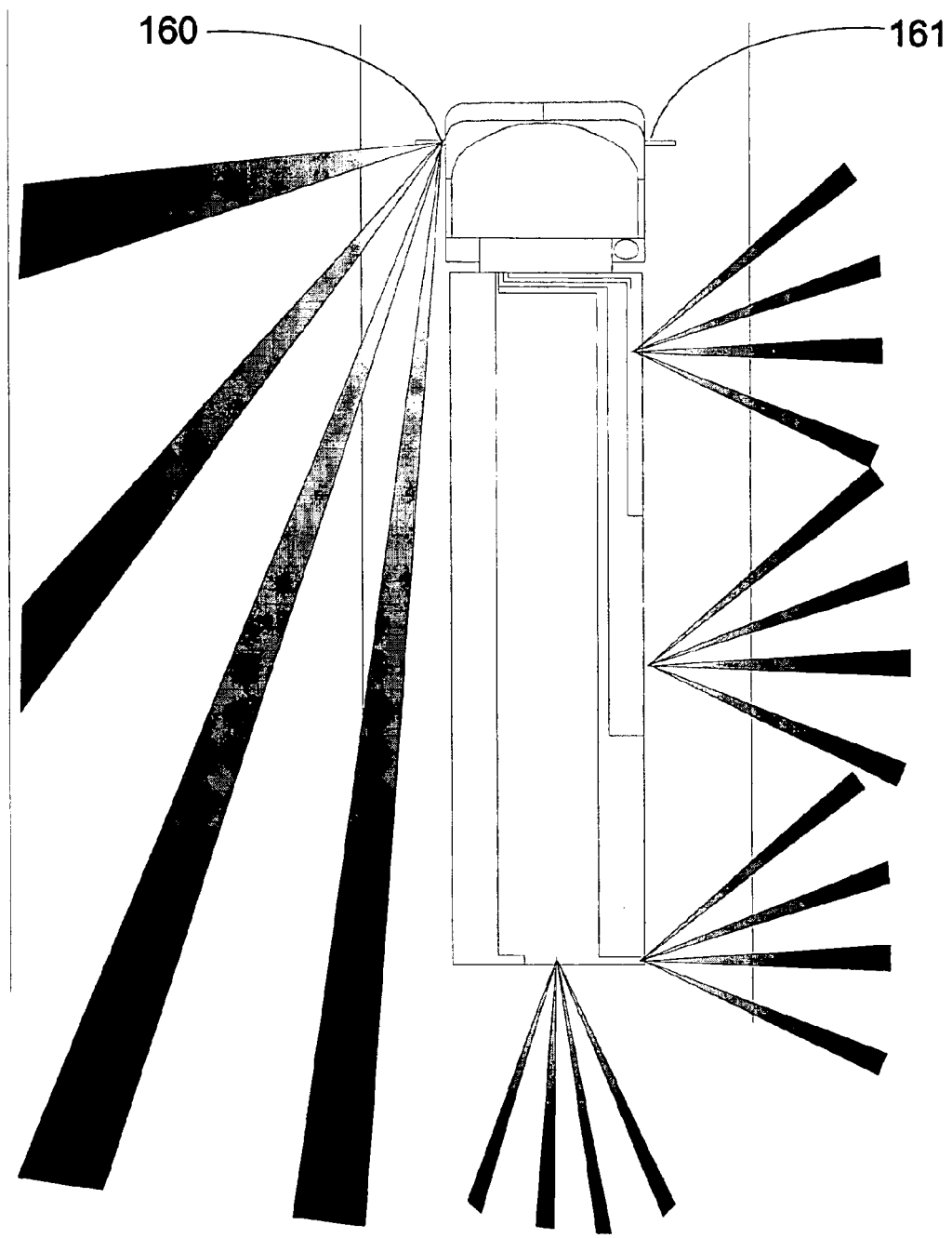
FIG. 6C is a side view of the large truck vehicle of FIG. 6A showing the coverage of a side blind spot area using multiple cameras along the side of the vehicle.

A significant improvement to the situation occurs if the blind spot is flooded even with low-level infrared radiation. This argues for an infrared floodlight in addition to the distance measuring infrared system. If an infrared floodlight is used along with multiple cameras displaced from one another, then the location of object in the blind spot can be determined by optical correlation between the two images and by triangulation calculations. This may be a practical solution for trucks especially those containing multiple trailers. A truck with multiple cameras placed along the left side of the vehicle is illustrated in FIG. 6C.

The other limiting case is when bright sunlight is present and only a single imager is used for a particular blind spot. For this case, a scanning laser infrared beam can still be distinguished as a reflection off of an object in the blind spot providing a narrow notch filter is used to eliminate all frequencies other than the particular infrared frequency used. Even in this case, the distance where the reflected infrared beam can be ascertained in bright sunlight is limited to perhaps fifteen meters. Therefore, this system is marginal for long trucks unless multiple systems are used along the side of the truck as shown in FIG. 6C. Note that certain mid-infrared frequencies having wavelengths above 1 nanometer are particularly good in that the radiation from the sun is significantly attenuated. Low cost imagers are not currently available but are under development for these frequencies.

From the above discussion, it would appear that multiple cameras are the only viable solution for long trucks. A further problem arises in this system design in that if the cameras are located on different trailers, or for some other reason can move relative to each other, then the analysis computer must know the location and orientation of each camera. There are a variety of ways of accomplishing this orientation such as through locating laser beams or monitoring the relative positions of the various components of the truck. In one example, a laser beam is used to illuminate a spot on the road that can be observed from multiple camera locations. Using the position of this reflected dot in the images acquired by various cameras, the relative orientation is approximately determined. Naturally, more complicated and sophisticated systems are possible. SAW-based RFID tags offer another method of determining the relative location of a point on a trailer relative to the tractor if multiple antennas are used and if the relative time of arrival of the received RFID signals are measured.

Figure 7A:
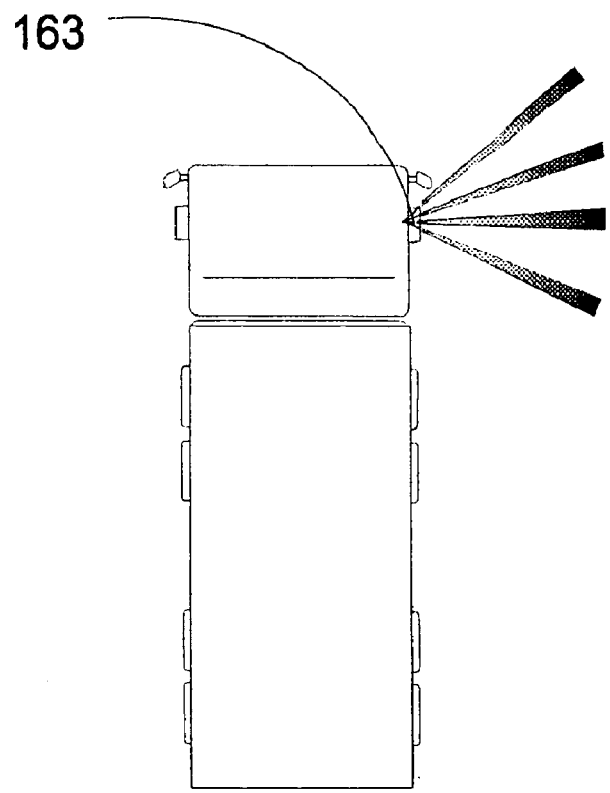
FIG. 7A is a top view illustrating the coverage of the forward right hand side of a truck vehicle blind spot.
Figure 7B:
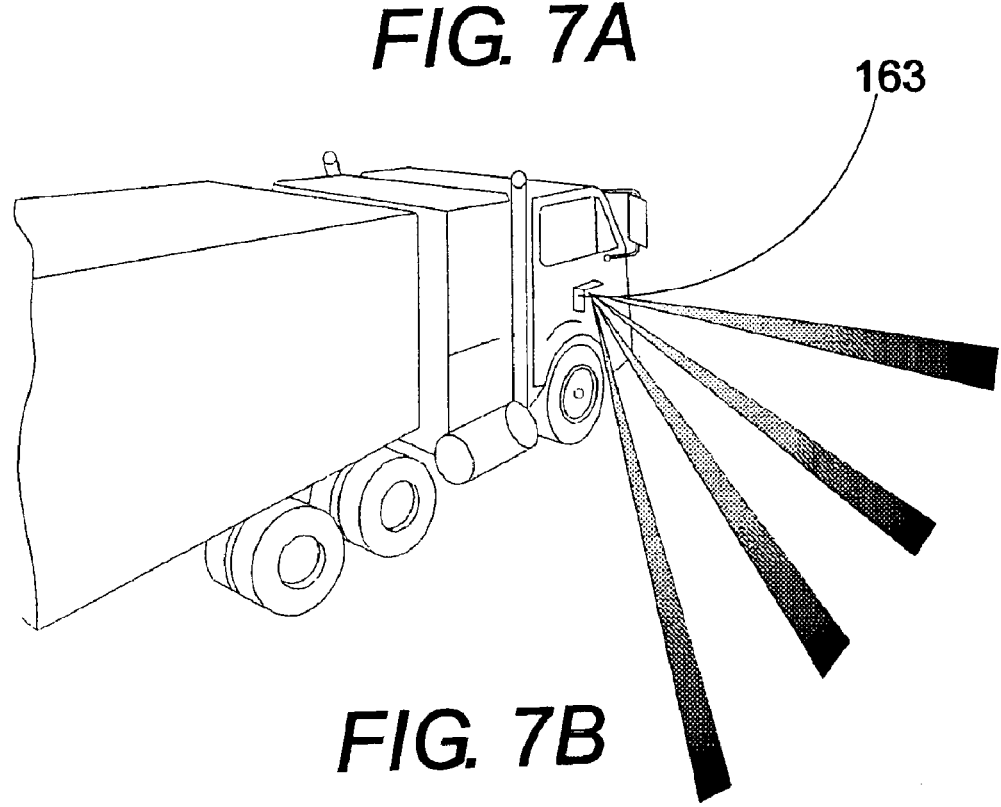
FIG. 7B is a side view illustrating the coverage of the forward right hand side of a truck vehicle blind spot.

The blind spot monitoring systems described above in FIGS. 6A, 6B and 6C are mainly applicable for blind spots occurring during highway travel. For urban travel of a truck where frequent turns are made, another blind spot occurs on right hand side of the vehicle (in countries where vehicles drive on the right side of the road) and extends somewhat forward of the vehicle and back somewhat beyond vehicle cab. This area, which cannot be seen by the driver, can contain pedestrians, small vehicles, bicycles, curbs, fire hydrants, motorcycles, as well as a variety of other objects. Another more local blind spot system that covers this area is therefore necessary, as illustrated in FIGS. 7A and 7B and which is designated 163.

The applications described herein have been illustrated mainly using the driver side of the vehicle. The same systems of determining the position of an object in the blind spot are also applicable on the passenger side.

Figure 8A:
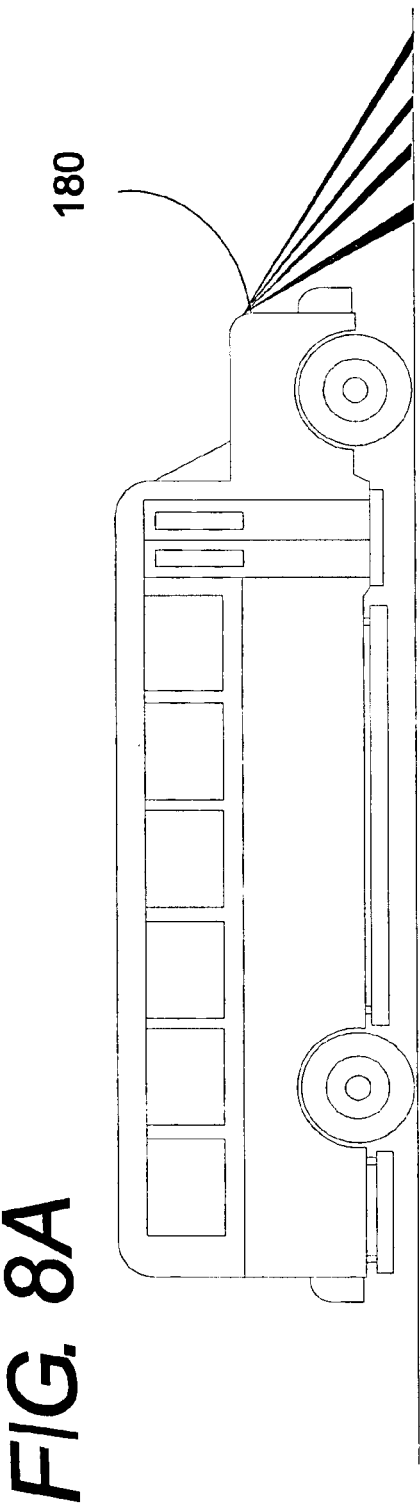
FIG. 8A is a side view illustrating the application to a bus for monitoring the space in front of the bus.
Figure 8B:
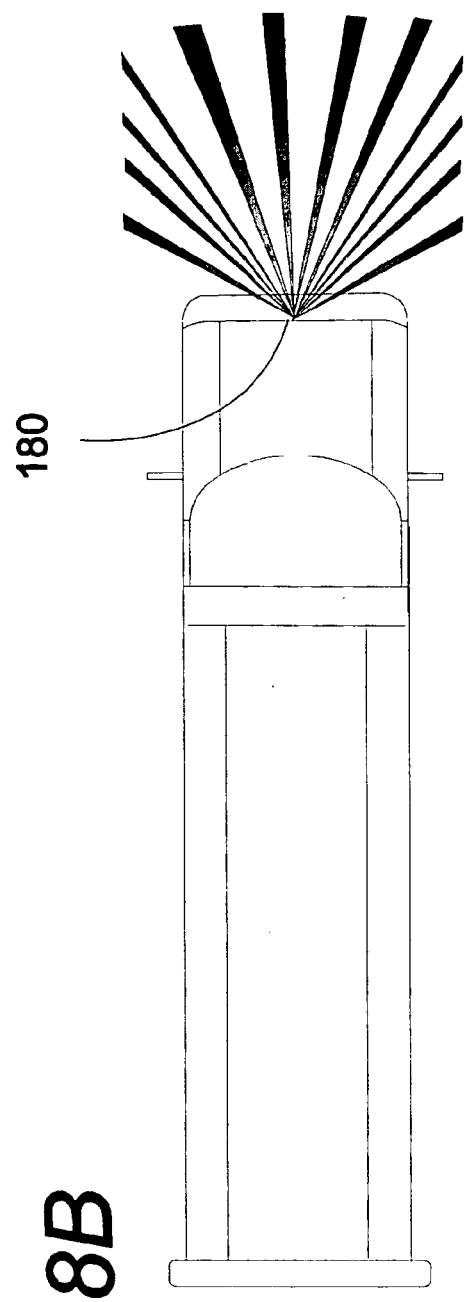
FIG. 8B is a front view illustrating the application to a bus for monitoring the space in front of the bus.

A significant number of children are killed every year by being run over by school buses. This tragic accident occurs when a child leaves the school bus and walks in front of the bus in the driver's blind spot. The driver starts driving the bus and strikes the child. A blind spot monitor of this invention, i.e., one or more transducer assemblies, is shown mounted on the front of school bus 178 near the top of the engine compartment 180 in FIGS. 8A and 8B. This monitoring system alerts the driver of the presence of an object obstructing the path of the school bus 178.

The use of trainable pattern recognition technologies such as neural networks is an important part of this invention, although other non-trained pattern recognition systems such as fuzzy logic, correlation, Kalman filters, and sensor fusion can also be used. These technologies are implemented using computer programs to analyze the patterns of examples to determine the differences between different categories of objects. These computer programs are derived using a set of representative data collected during the training phase, called the training set. After training, the computer programs output computer algorithms containing the rules permitting classification of the objects of interest based on the data obtained after installation on the vehicle.

These rules, in the form of an algorithm, are implemented in the system that is mounted onto the vehicle. The determination of these rules is important to the pattern recognition techniques used in this invention. Neural networks either singularly or combination neural networks are contemplated by this invention. Combination neural networks are groups of two or more neural networks and are also referred to, for example, as modular neural networks and ensemble neural networks among others. Also cellular neural networks and support vector machines are also contemplated by this invention.

Artificial neural networks using back propagation are thus far the most successful of the rule determination approaches. However, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the blind spot and another for determining the location of the object dynamically.

The discussion thus far has identified pattern recognition systems and particularly neural network pattern recognition systems to be used to identify the contents of the blind spot. One particular neural network architecture has been particularly successful in this field. This is known as modular neural networks. The concept behind modular neural networks is that when a complicated task is to be accomplished by a neural network, significant improvements in speed and accuracy can sometimes be obtained if the overall problem is divided into a number of smaller problems. A separate neural network is then assigned each sub-task. Thus, a network of neural networks is created.

When a human observes a tree, the human mind concentrates on characteristics of that tree and not on characteristics of an automobile. Thus, the human mind appears to operate also as a modular neural network. There are many ways of applying this concept to blind spot monitoring. Since both the identity and the location of object in the blind spot are to be determined, it is logical to therefore separate the problem into a first neural network that determines the identity of the object and then a variety of additional neural networks that, given the identity of the object, determine its location. In addition, a separate neural network may be trained to segregate any unknown objects from data that are not understood by the neural networks because nothing similar was a part of the training database.

Additional tasks that can be allocated to specific neural networks are to determine environment that the vehicle is operating in. Obviously, an automobile in a blind spot looks considerably different at night with its headlights on than in bright sunlight. The identification and also the position determining tasks can be more accurate if they are segregated by lighting conditions. Similarly, the presence of fog, rain, snow, soiled lenses, and other factors can have a significant effect on the system accuracy and allocated to separate groups of neural networks.

In some embodiments of this invention, the rules are sufficiently obvious that a trained researcher can look at the returned optical signals and devise an algorithm to make the required determinations. In others, artificial neural networks are frequently used to determine the rules. One such set of neural network software for determining the pattern recognition rules, is available from the NeuralWare Corporation of Pittsburgh, Pa. and another from International Scientific Research in Kyiv, Ukraine. Numerous books and articles, including more than 500 U.S. patents, describe neural networks in great detail and thus the theory and application of this technology is well known and will not be repeated here. Neural networks are now beginning to gain more widespread use in the automotive industry including their use for engine control, occupant spatial sensing for the control of airbags, side and frontal crash sensor algorithms and vehicle diagnostic systems.

The system generally used in this invention for the determination of the presence of an object in the blind spot is the artificial neural network or a neural-fuzzy system. In this case, the network operates on the returned signals from the CCD or CMOS array as sensed by transducer assemblies such as 110, 111, 112, 113 and 114 in FIG. 1, for example. For the case of the left blind spot, through a training session, the system is taught to differentiate between many cases including automobiles, pedestrians, bicycles, trucks, animals, motorcycles, fences, guard rails, parked vehicles etc. This is done by conducting a large number of experiments where data from each of these objects is captured in a variety of positions, velocities and vehicle operating conditions (rain, night, bright sunlight, rural roads, interstate highways, etc.). As many as 1,000,000 such experiments are run before the neural network is sufficiently trained and validated so that it can differentiate among the various cases and output the correct decision with a very high accuracy.

Once the network is determined, it is possible to examine the result to determine, from the algorithm created by the neural network algorithm generating software, the rules that were finally arrived at by the trial and error training technique. In that case, the rules can then be programmed into a microprocessor. Alternately, a neural computer can be used to implement the network directly. In either case, the implementation can be carried out by those skilled in the art of pattern recognition using neural networks.

Many systems are now on the market that monitor obstructions in the rear of a vehicle and warn the driver of the existence of such obstructions when the driver is backing a vehicle. The technologies currently used include radar, ultrasound and TV cameras. Neither radar nor ultrasound are capable of identifying the object and most such systems cannot locate the object which might allow the driver to slightly change his or her direction and avoid a curb or pole, for example. The television camera systems typically do not have illumination sources and at best produce a poor television image to the driver that is difficult to see in sunlight.

Figure 9:
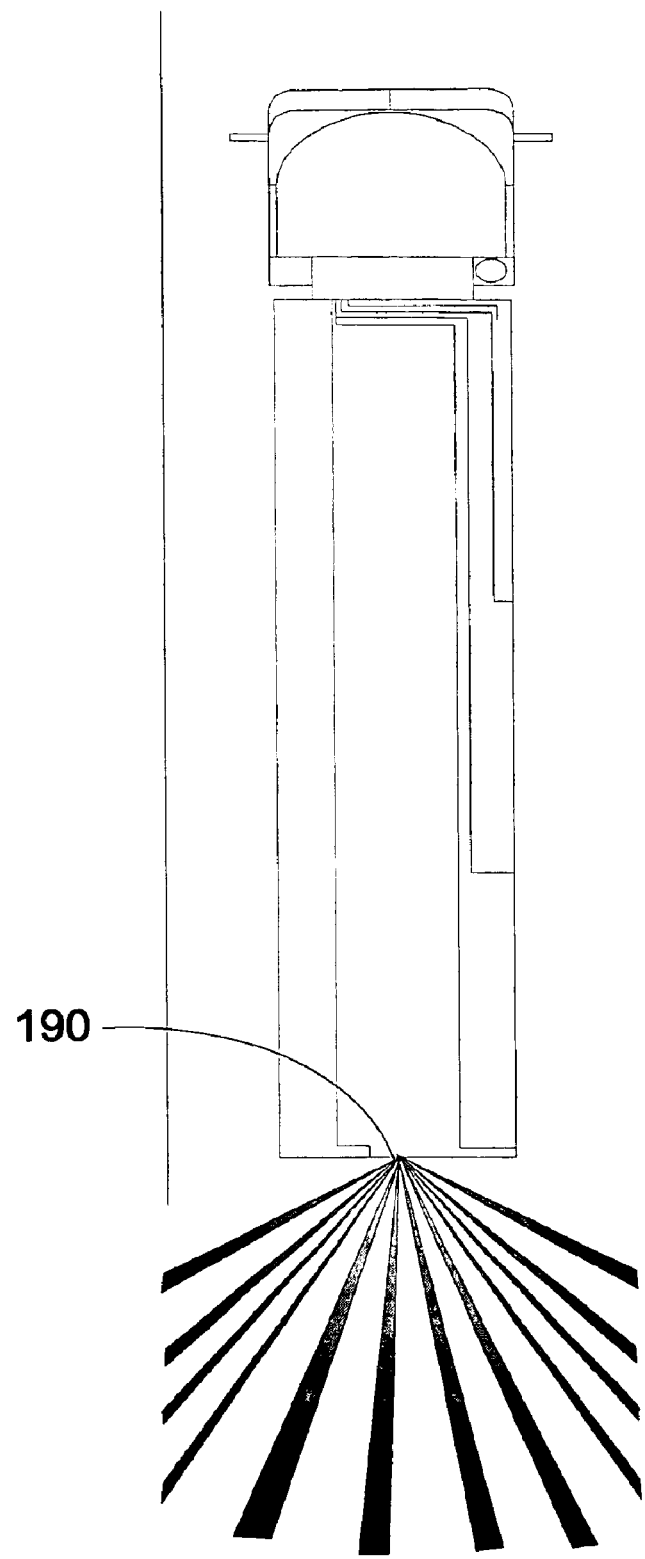
FIG. 9 is a top view of a system applied to monitor the rear of the truck trailer to protect for backup accidents.

The system shown in FIG. 9 illustrates a blind spot monitoring system 190 built according to the teachings of this invention. The system can utilize a high dynamic range camera, identification and ranging capability or, alternately, a linear scanning laser range meter. The view provided to the driver shows the location, size and identity of all objects that are within the path of the backing vehicle. The display provides maximum contrast by using icons to represent the host vehicle and the objects in the blind spot. Naturally although this is shown for a truck, it is equally applicable for other vehicles including buses and automobiles. It can also be used in a rear impact anticipatory sensor where both the displacement and velocity, by either Doppler or differencing distance measurements, of the approaching object can be determined.

The monitoring system 190 could be activated whenever the vehicle is in reverse. Thus, the system 190 would not be needed when the vehicle is traveling forward. When the gear is shifted into reverse, a sensor could be provided to detect the change in gear and then activate the monitoring system 190. Similarly, a monitoring system which is for forward blind spot such as in front of the bus 178 shown in FIGS. 8A and 8B could be designed to activated only when the vehicle is in forward gear and not stopped or in reverse. As such, when the gear is shifted into forward, the system 180 would be activated.

If both a forward and rear monitoring system are provided, then the activation of both of these monitoring systems would not be simultaneous but would depend on the direction of travel of the vehicle. In this case, a single display could be provided to the driver and alternatively display the contents of the forward blind spot or rear blind spot depending on the direction of the travel of the vehicle, i.e., in which gear the vehicle is in.

Figure 10:
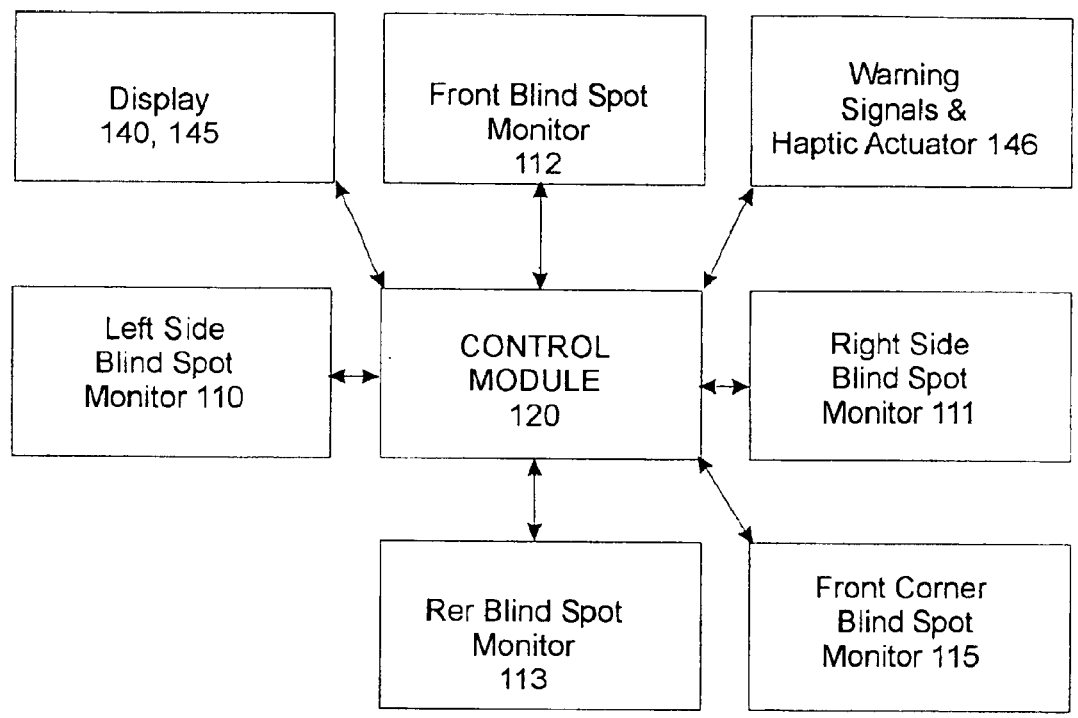
FIG. 10 is a block diagram illustrating the blind spot detector, steering control, display and warning system.

FIG. 10 illustrates a block diagram showing interface between five blind spot monitoring systems and control circuitry 120. The control circuitry 120 monitors the output from the five blind spot monitoring systems and creates icons and places the icons on a display 140,145 that shows the host vehicle and all objects in the immediate vicinity of the host vehicle. Software is provided in the microprocessor to sound a warning signal or activate haptic actuators 146 under a predetermined set of circumstances such as an attempt by the driver to change lanes into a lane occupied by an object in the blind spot. This warning signal may also be activated if the driver activates the turn signal. In addition to the audio warning signal, a visual flashing signal provided on the display and a vibration or pressure or torque or other haptic signal applied to the steering wheel to prevent or make it more difficult for driver execute the maneuver.

The display 140,145 would selectively or alternatively display the contents of each blind spot. A screen-within-a-screen type display could also be used to display one blind spot in a majority of the screen and another blind spot in a small portion of the screen. As noted above, the blind spot displayed could depend on the status of the gear of the vehicle. The blind spot displayed could also depend on the direction of turning of the front wheels, the direction of turning of the rear wheels and/or the activation of the right or left turn signals.

Figure 11:
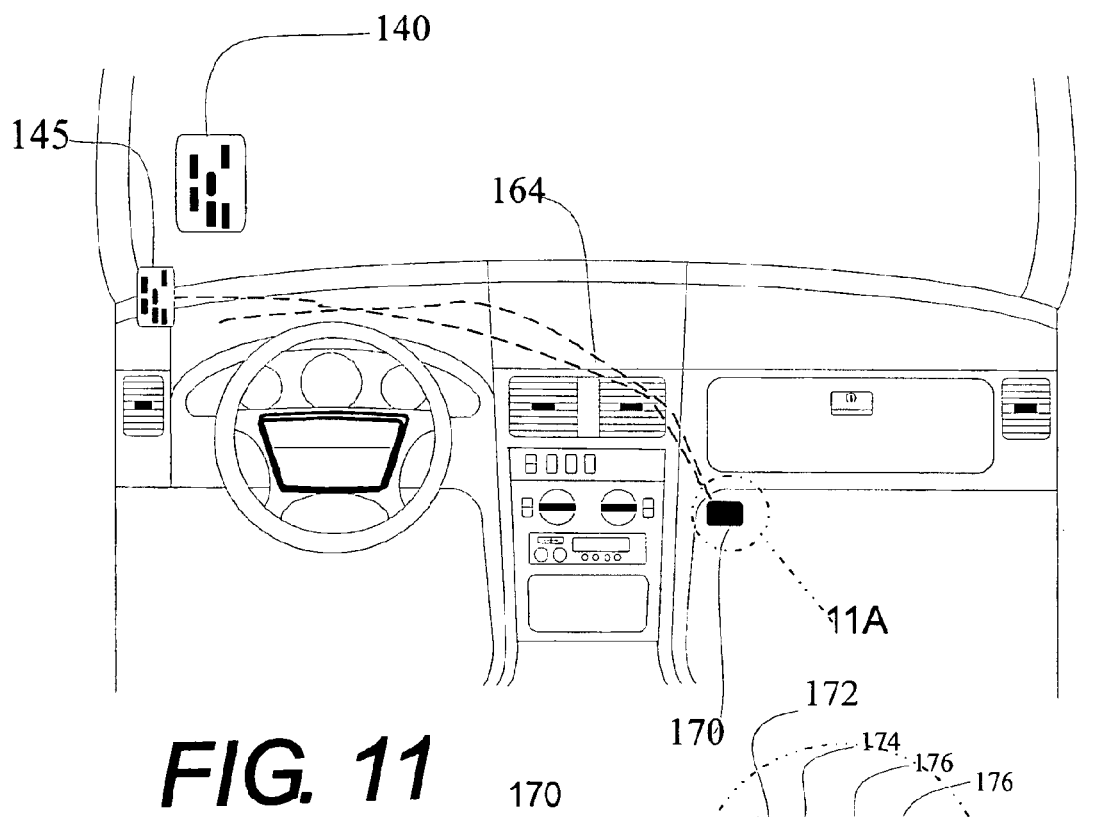
FIG. 11 shows an icon display for the instrument panel and an alternate heads up display indicating the position of the host vehicle and the positions of surrounding potentially threatening vehicles as seen from above.
Figure 11A:
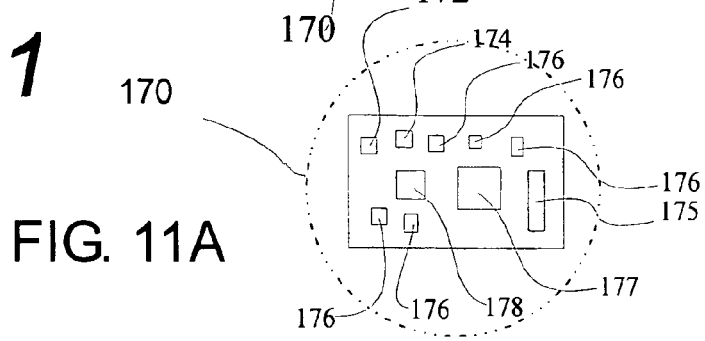
FIG. 11A is an enlarged view of the portion designated 11A in FIG. 11.

FIGS. 11 and 11A illustrate control module 170 that contains a variety of electronic components 172–178. The control module is connected to the blind spot monitoring system including the transducer assemblies 110–114 by wires, not shown, or wirelessly and in turn it connects to a display on the instrument panel 145 or a heads-up display 140. Based on the calculations performed in a microprocessor 177, the control module 170 creates the icons on displays 140 and 145 and additionally initiates audio and haptic warnings as described above. The connection between the control module 170 and the audio and haptic actuators may be a wired connection or a wireless connection.

Figure 12:
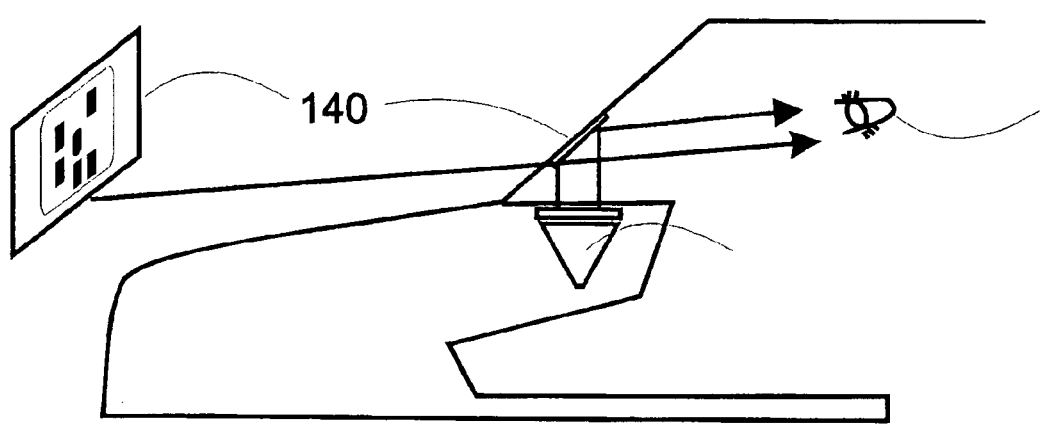
FIG. 12 is an illustration similar to FIG. 11 showing the projection of the images onto a heads-up display.

FIG. 12 is a further illustration of the heads-up display 140 shown in FIG. 11. The heads-up display 140 is constructed according to well-known principles and the image is projected focused in front of vehicle 144 such that the driver can observe the image without taking his or her eyes from the road.

Figure 13A:
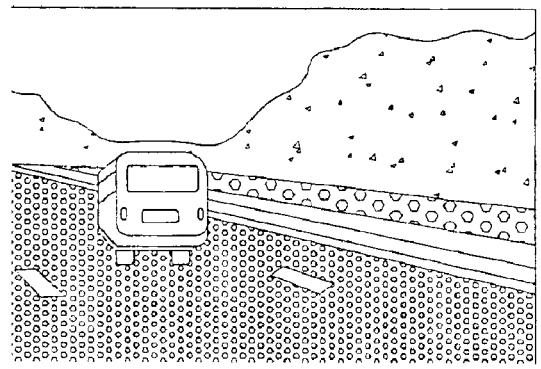
FIG. 13A illustrates a view of the image as seen by a side rear view camera of FIG. 1.
Figure 13B:
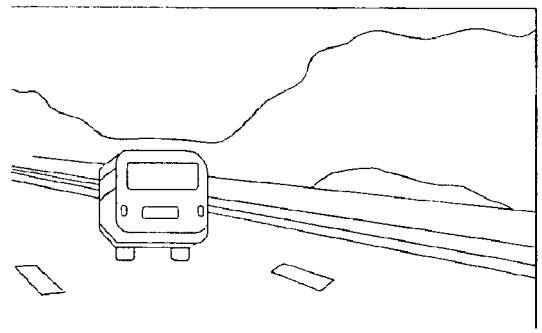
FIG. 13B illustrates a view of the image of FIG. 13A after a stage of image processing.
Figure 13C:
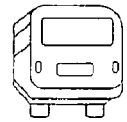
FIG. 13C illustrates a view of the image as FIG. 13B after the vehicle has been abstracted.

FIGS. 13A, 13B and 13C illustrate one preferred method of separating an object in the blind spot from other objects in preparation for input into a neural network for identification and/or position determination. FIG. 13A illustrates a view of the image as seen by a side rear view transducer assembly 112 of FIG. 1.

Various filters are employed to simplify and idealize the view the output of which is shown in FIG. 13B. A variety of technologies exist to eliminate remaining background objects and isolate the vehicle to arrive at the image as shown in FIG. 13C.

In one preferred method, the distance to the objects to the left and right of the vehicle can determined by the laser radar system described above. This permits the elimination of objects that are not in the same plane as the blind spot vehicle. Any of the distance measuring schemes described above along with pattern matching or pattern linking techniques can be used to extract the vehicle. Other techniques involve the use of relative motion of the object in the blind spot that may involve the use of optical flow calculations. No one system is ideal unless the full three-dimensional representation of entire scene has been achieved. Therefore, a variety of techniques are used depending on particular problem at hand.

Figure 14:
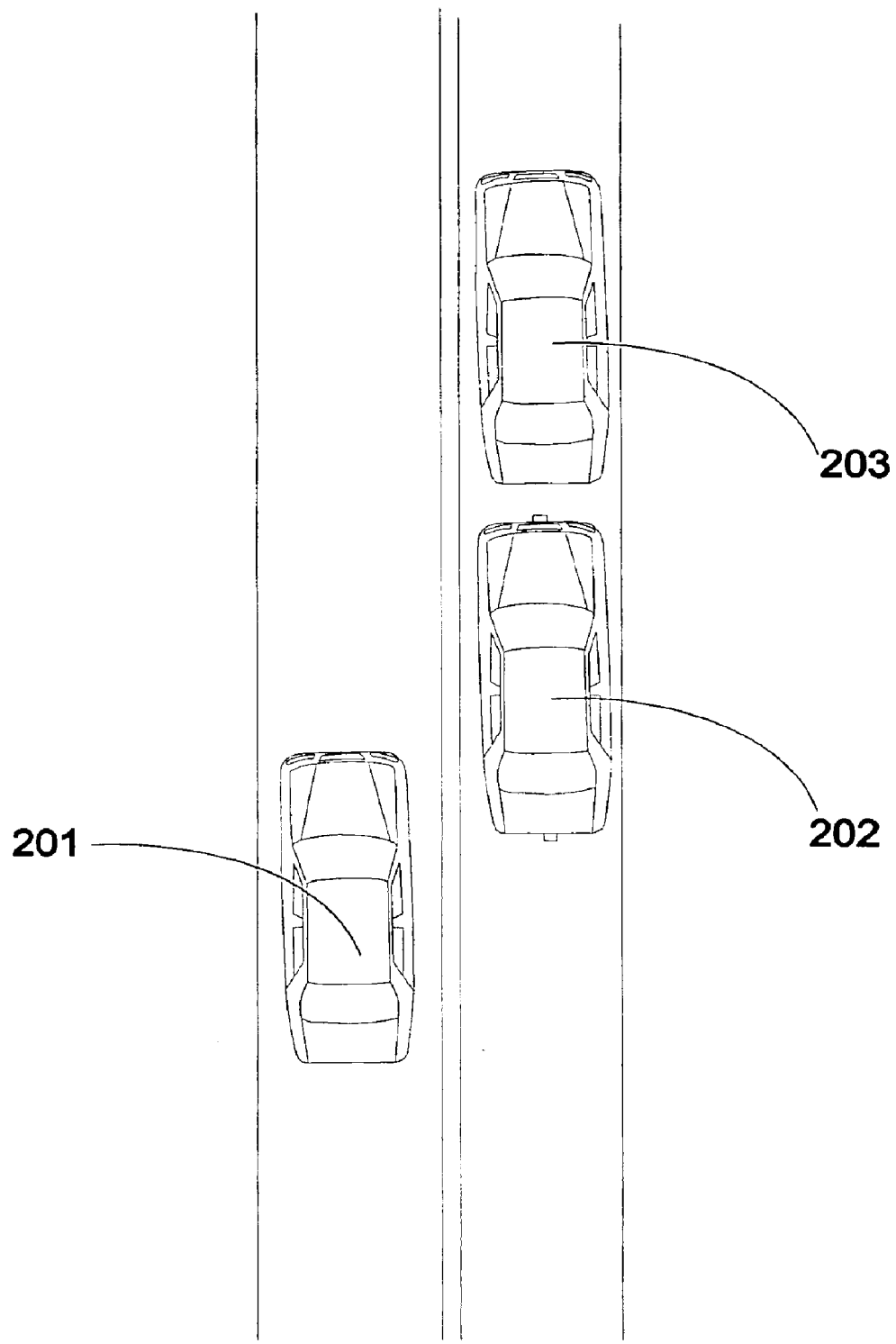
FIG. 14 illustrates a lane change problem in congested traffic.

FIG. 14 illustrates a lane-changing problem in congested traffic. In this illustration, the driver of vehicle 202 wants to change lanes to pass vehicle 203. However, vehicle 201 is in the blind spot and if vehicle 202 attempts this lane change, an accident may result. Using the teachings of this invention, the driver of vehicle 202 will be made aware either through a visual display or through warning signals, optical, audio and/or haptic, should the driver attempt to execute such a lane change. The driver may be made aware of the presence of the vehicle 201 in the blind spot upon activation of the turn signal, upon detection of the beginning of the lane change as reflected in the turning of the steering wheel or front wheels of the vehicle and/or by the presence of an icon showing the vehicle 201 in the display 140,145.

Figure 15:
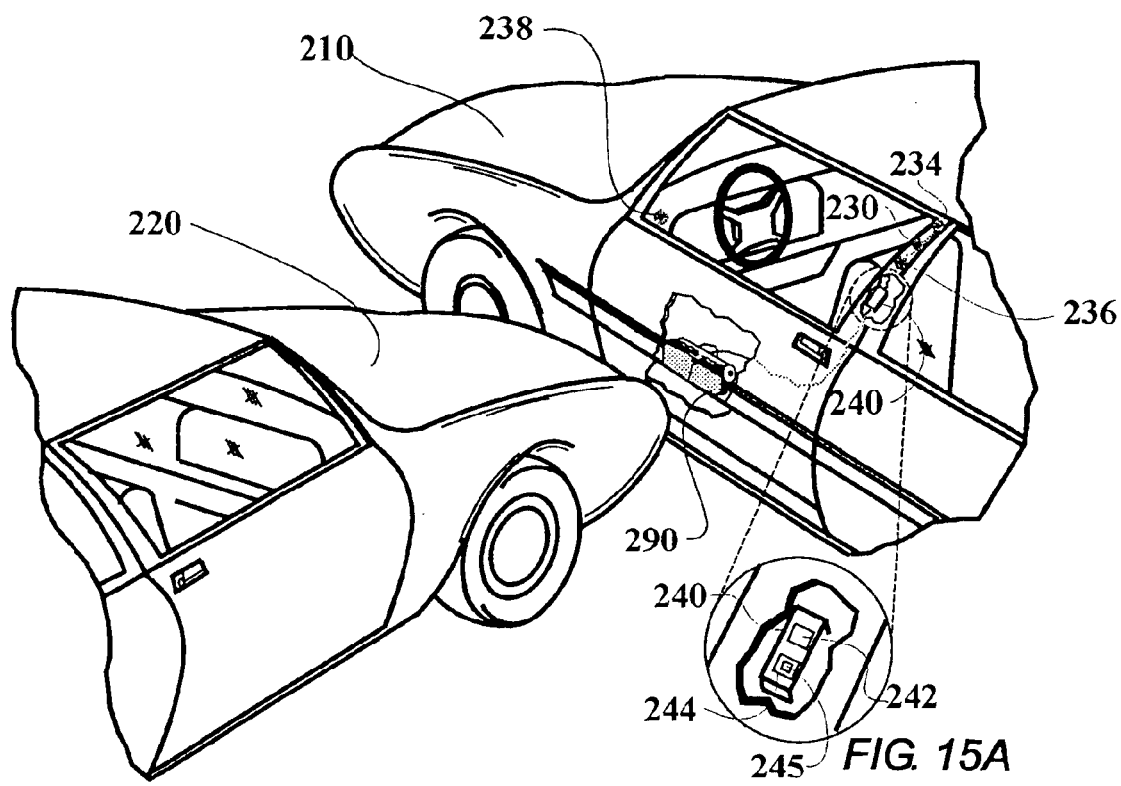
FIG. 15 is a perspective view of a vehicle about to impact the side of another vehicle showing the location of the various parts of the anticipatory sensor system of this invention.

FIG. 15 is an angular perspective overhead view of a vehicle 210 about to be impacted in the side by an approaching vehicle 220, where vehicle 210 is equipped with a blind spot monitor or anticipatory sensor system showing a transmitter 230 transmitting electromagnetic, such as infrared, waves toward vehicle 220. This is one example of many of the uses of this invention for exterior monitoring.

The transmitter 230 is connected to an electronic module 240. Module 240 contains circuitry 242 to drive transmitter 230 and circuitry 244 to process the returned signals from receivers 234 and 236. Circuitry 244 contains a neural computer 245, which performs the pattern recognition determination based on signals from receivers 234 and 236 (FIG. 15A). Receivers 234 and 236 are mounted onto the B-Pillar of the vehicle and are covered with a protective transparent cover. An alternate mounting location is shown as 238 which is in the door window trim panel where the rear view mirror (not shown) is frequently attached.

One additional advantage of this system is the ability of infrared to penetrate fog and snow better than visible light, which makes this technology particularly applicable for blind spot detection and anticipatory sensing applications. Although it is well known that infrared can be significantly attenuated by both fog and snow, it is less so than visual light depending on the frequency selected. (See for example L. A. Klein, *Millimeter-Wave and Infrared Multisensor Design and Signal Processing*, Artech House, Inc, Boston 1997, ISBN 0-89006-764-3 which is incorporated herein by reference). Additionally, some of the reflection from fog, rain or snow can be filtered out using range gating, which masks reflections that come from certain distance ranges from the sensor.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. One particularly advantageous mode of practicing the invention for these cases, therefore, is to use a CW radar or pulsed laser radar system, along with a CCD array. In this case, the radar is used to determine distance and the CCD for identification.

In a preferred implementation, transmitter 230 is an infrared transmitter and receivers 234, 236 and 238 are CCD transducers that receive the reflected infrared waves from vehicle 220. In the embodiment shown in FIG. 15, an exterior-deployed airbag 290 is shown which deploys in the event that a side impact is about to occur as described in U.S. Pat. No. 6,343,810.

In most of the applications above, the assumption has been made that either a scanning spot or a line of light will be provided. This need not be the case. The light that is emitted to illuminate the object can be structured light. Structured light can take many forms starting with, for example, a rectangular or other macroscopic pattern of light and dark can be superimposed on the light by passing it through a filter. If a similar pattern is interposed between the reflections and the camera, a sort of pseudo-interference pattern can result sometimes known as Moire patterns. A similar effect can be achieved by polarizing transmitted light so that different parts of the object that is being illuminated are illuminated with light of different polarization. Once again, by viewing the reflections through a similarly polarized array, information can be obtained as to where the source of light came from which is illuminating a particular object. Different modulation schemes can also be used to create different patterns and the modulation can be varied in time for particular applications.

As disclosed in U.S. Pat. No. 5,653,462 for interior vehicle monitoring and U.S. Pat. No. 6,343,810 for exterior monitoring, a modulated light source can be used to determine the distance to an object either interior or exterior of the vehicle. The basic principle is that the phase of the reflected light is compared to the phase of the transmitted light and the distance to the reflecting object is determined by the phase difference. There are many ways of implementing this principle. One that has recently been disclosed called the photonic mixing device or PMD. In this device, an optical filter is modulated with the same frequency and the phase that is used to modulate the transmitted light beam. In the PMD, this principle is executed on a pixel by pixel basis and incorporated into the CMOS array structure. Although still falling within the teachings of this invention, this results in an unnecessarily complicated structure. An alternate method will now be described.

An object in the blind spot or inside a vehicle is illuminated by modulated light and reflects this light back to a receiver wherein the phase relationship between the reflected light and the transmitted light is a function of the distance to the reflecting surface. For every pixel, the comparison will be made to the same frequency and phase since only one source of illuminating modulated light has been used to illuminate the entire object. Therefore, there is no advantage in attempting to influence each pixel separately with the modulation frequency and phase. A similar and preferable approach is to use a single light valve or electronic shutter to modulate all of the light coming back from the illuminated object.

The technology for modulating a light valve or electronic shutter has been known for many years and is sometimes referred to as a Kerr cell or a Pockel cell. These devices are capable of being modulated at up to 10 billion cycles per second. For determining the distance to a vehicle in the blind spot, modulations between 5 and 100 MHz are needed. The higher the modulation frequency, the more accurate the distance to the object can be determined. However, if more than one wavelength, or better one-quarter wavelength, exists between the host vehicle and the object, then ambiguities result. On the other hand, once a longer wavelength has ascertained the approximate location of the vehicle, then more accurate determinations can be made by increasing the modulation frequency since the ambiguity will now have been removed.

In one preferred embodiment of this invention, therefore, an infrared floodlight is modulated at a frequency between 5 and 100 MHz and the returning light passes through a light valve such that amount of light that impinges on the CMOS array pixels is determined by a phase difference between the light valve and the reflected light. By modulating a light valve for one frame and leaving the light valve transparent for a subsequent frame, the range to every point in the camera field of view can be determined based on the relative brightness of the corresponding pixels.

Once the range to all of the pixels in the camera view has been determined, range gating becomes a simple mathematical exercise and permits objects in the image to be easily separated for feature extraction processing. In this manner, many objects in the blind spot can be separated and identified independently.

As mentioned above, it is frequently not possible to separate light from a broad illumination source from sunlight, for example. It has been determined, however, that even in the presence of bright sunlight a reflection from a narrow beam of infrared laser light can be observed providing a narrow notch frequency filter is used on the light entering the receiver. The principles described above, however, are still applicable since a sampling of pixels that have been significantly illuminated by the narrow laser beam can be observed and used for ranging.

The technique of using a wide-angle infrared floodlight is particularly useful at night when objects, especially those without self-contained lights, are difficult to observe. During bright sunlight, there is considerable information from the visual view taken by the cameras to perform feature extraction, identification, ranging etc. utilizing other techniques such as relative motion. Thus, a superior blind spot monitoring system will make use of different techniques depending on the environmental conditions.

In more sophisticated implementations of the present invention, there can be an interaction between the imaging system and the aiming direction of the infrared laser beam. For example, a particular limited area of the image can be scanned by the infrared system when the imaging system is having difficulty separating one object from another. It is expected, as the various technologies described above evolve, that very smart blind spot, anticipatory sensors and general exterior monitoring systems based on the teachings of this invention will also evolve.

The goal is to determine the direction that a particular ray of light had when it was transmitted from the source. Then, by knowing which pixels were illuminated by the reflected light ray along with the geometry of the transducer mountings, the distance to the point of reflection off of the object can be determined. This requires that the light source is not collocated with the CCD array. If a particular light ray, for example, illuminates an object surface that is near to the source, then the reflection off of that surface will illuminate a pixel at a particular point on the CCD or CMOS array. If the reflection of the same ray however occurs from a more distant surface, then a different pixel will be illuminated in the CCD array. In this manner, the distance from the surface of the object to the CCD can be determined by triangulation formulas.

Similarly, if a given pixel is illuminated in the CCD from a reflection of a particular ray of light from the transmitter, and the direction in which that ray of light was sent from the transmitter is known, then the distance to the object at the point of reflection can be determined. If each ray of light is individually recognizable and therefore can be correlated to the angle at which it was transmitted, then a full three-dimensional image can be obtained of the object that simplifies the identification problem.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light that could be done, for example, by using an addressable light valve, such as a liquid crystal filter, electrochromic filter, or, preferably, a garnet crystal array. Each pixel in this array would be coded such that it could be identified at the CCD. Alternately, the transmitted radiation can be AM or FM modulated to also provide source identification.

The technique described above is dependent upon either changing the polarization or using the time or frequency domain, or a combination thereof, to identify particular transmission angles with particular reflections. Spatial patterns can also be imposed on the transmitted light that generally goes under the heading of structured light, as discussed above. The concept is that if a pattern is identifiable, then either the distance can be determined by the displacement of the pattern in the field of view if the light source is laterally displaced from the receiver or, if the transmission source is located on the same axis but axially displaced with the receiver, then the pattern expands at a different rate as it travels toward the object and then, by determining the size of the received pattern, the distance to the object can be determined. In some cases, Moire pattern techniques are utilized.

A further consideration to this invention is to use the motion of the object, as determined from successive differential arrays, for example, to help identify that there is in fact an object in the blind spot. Differential motion can be used to separate various objects in the field of view and absolute motion can be used to eliminate the background, if desired.

Figure 16:
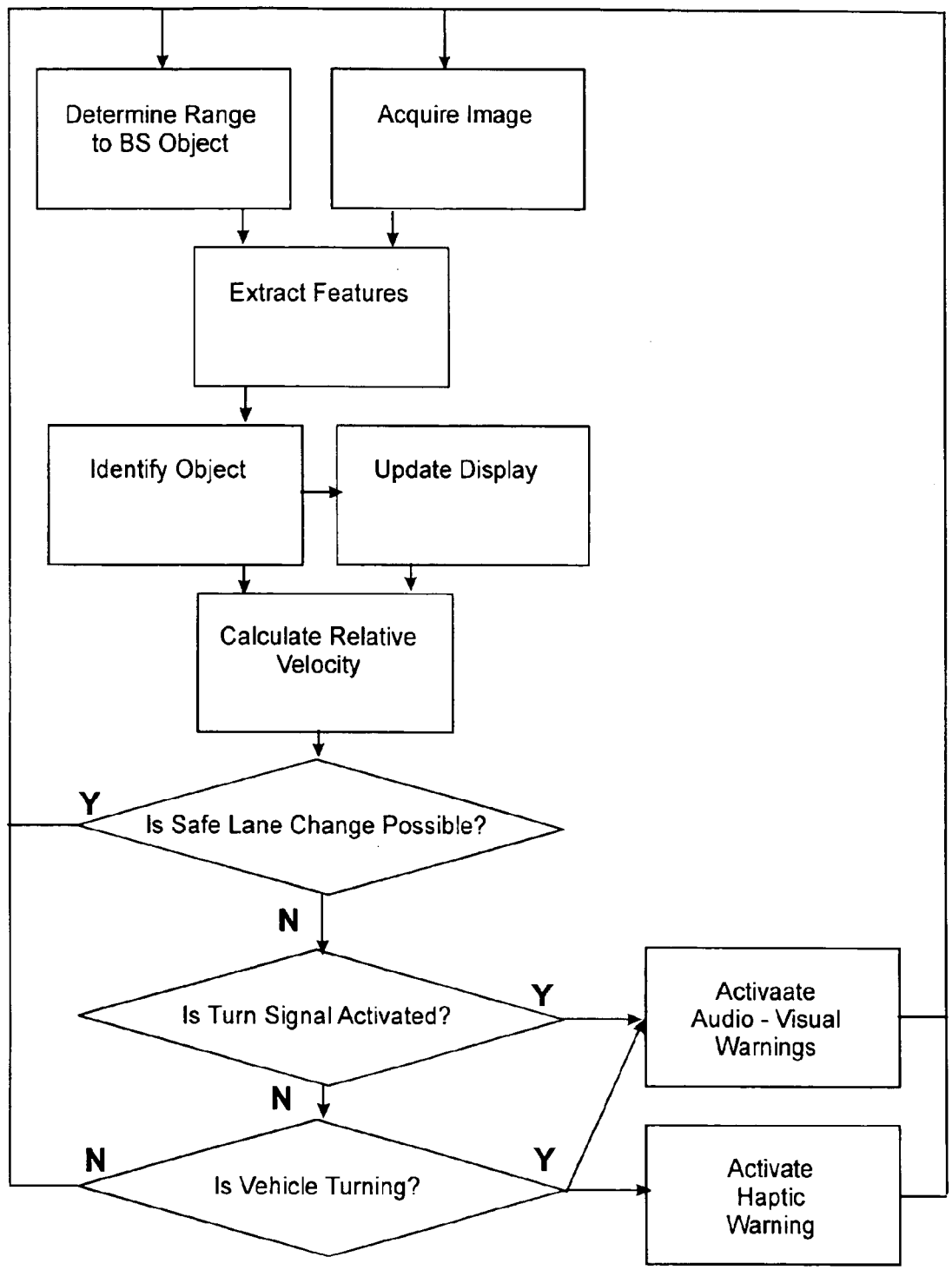
FIG. 16 is a flowchart for the lane change problem.

FIG. 16 is an exemplary flow diagram of one embodiment of this invention. The blind spot monitor begins by acquiring an image of the blind spot that contains an object to be identified (step 76) and by determining the range to the object (step 78) and outputs range information and image information to a feature extraction routine (step 80). The output from the feature extraction routine is fed into the neural network or other pattern recognition algorithm. The algorithm determines the identity of object (step 82). Once the identity and range of the object is known then the display can be updated (step 84). Using current and recent information, the relative velocity algorithm determines the relative velocity of the object to the host vehicle by differencing or by Doppler techniques (step 86). With the position, velocity and identity of the object in the blind spot known, an appropriate algorithm determines whether it is safe for a lane-changing maneuver (step 88). If the determination is yes, then control is returned to the image collection and ranging activities and a new image and range is determined. If the lane change determination is no, then a determination is made if the turn signal is activated (which would be indicative of the driver's intention to change lanes) (step 90). If yes, then audio and/or visual warnings are activated (step 90). If no, then a determination is made if the operator has begun to change the direction of the vehicle to begin executing a lane change (and simply failed to activate the turn signal) (step 92). If map data is present road curvature can also be taken into account. If the vehicle has begun executing a lane change, then the audio and/or visual warnings are again activated (step 90) and a haptic system begins to exert a torque on the steering wheel to oppose the turning motion of the driver (step 94). Alternately, a vibration can be induced into the steering wheel as a further warning to the operator not to execute a lane change. Following these activities, control is returned to the image acquisition and range determination activities and the process repeats.

There has thus been shown and described a monitoring system for monitoring the exterior of the vehicle using an optical system with one or more CCD or CMOS arrays and other associated equipment which fulfills all the objects and advantages sought after.

More particularly, described above is a method for determining the identification and position of objects exterior to a vehicle which comprises the steps of transmitting optical waves into the space surrounding the vehicle from one or more locations, and comparing the images of the exterior of the vehicle with stored images of objects external to the vehicle to determine which of the stored images match most closely to the images of such objects such that the identification of the objects and their position is obtained based on data associated with the stored images. The optical waves may be transmitted from transmitter/receiver assemblies positioned at one or more locations around the exterior of the vehicle such that each assembly is situated where it has a good view of a particular space near the vehicle. Each assembly may comprise an optical transmitter (such as an infrared LED, an infrared LED with a diverging lens, a laser with a diverging lens and a scanning laser assembly, an infrared floodlight, or other light source) and an optical array (such as a CCD array and a CMOS array). The optical array is thus arranged to obtain the images of the exterior of the vehicle represented by a matrix of pixels. To enhance the method, prior to the comparison of the images, the output from each array can be compared with a series of stored arrays representing different objects using optical correlation techniques. Preferably, a library of stored images is generated by positioning an object near the vehicle, transmitting optical waves toward the object from one or more locations, obtaining images of the exterior of the vehicle, each from a respective location, associating the images with the identification and position of the object, and repeating the positioning step, transmitting step, image obtaining step and associating step for the same object in different positions and for different objects in different positions. This is similar to the training and adaptation process described in detail in U.S. Pat. No. 6,529,809 on interior monitoring systems, which is incorporated herein in its entirety by reference.

One of the advantages of the invention is that after the identifications and positions of the objects are obtained, one or more systems in the vehicle may be affected based on the obtained identification and position of at least one of the objects. Such systems include a visual and/or audio warning system to alert the driver to the presence, position and/or velocity of objects in the blind spots as well as a system for adjusting the turning resistance of the steering wheel to prevent movement by the driver into the path of an object. Another system could be associated with the turning indicators to provide an alarm if a turning signal is activated when an object is present in the blind spot which would interfere with the intended turn.

The image comparison may entail inputting the images or a part or form thereof into a neural network that provides for each image, an index of a stored image that most closely matches the inputted image. The index is thus utilized to locate stored information from the matched image including, inter alia, a locus of the center of the front of the object and an appropriate icon for display purposes. To this end, a display could be provided in the passenger compartment or through the use of a heads-up display to provide a visual overview of the environment surrounding the vehicle. The icons could be general icons of objects in general or more specific icons indicative of the type of vehicle, etc. Moreover, the position of the object relative to the vehicle may be determined so that an action by the driver of the vehicle that might result in an accident is prevented. It is also possible to obtain information about the location of the object from the image comparison and adjust the position of one or more of the rear view mirrors based on the location of the object. Also, the location of the object may be obtained such that an external light source may be directed toward the object to permit a better identification thereof.

In addition, the location of the locus of the center of the object exterior to the vehicle may be monitored by the image comparison and one or more systems in the vehicle controlled based on changes in the location of the locus of the center of the object exterior to the vehicle over time. This monitoring may entail subtracting a most recently obtained image, or a part thereof, from an immediately preceding image, or a corresponding part thereof, and analyzing a leading edge of changes in the images or deriving a correlation function which correlates the images with the object in an initial position with the most recently obtained images.

In another method for determining the identification and position of objects external to the vehicle in accordance with the invention, optical waves are transmitted into a space near the vehicle from a plurality of locations, a plurality of images of the exterior of the vehicle are obtained, each from a respective location, a three-dimensional map of the exterior of the vehicle is created from the images, and a pattern recognition technique is applied to the map in order to determine the identification and position of the objects. The pattern recognition technique may be a neural network, fuzzy logic or an optical correlator or combinations thereof. The map may be obtained by utilizing a scanning laser radar system where the laser is operated in a pulse mode or continuous modulated mode and determining the distance from the object being illuminated using time-of-flight, modulated waves and phase measurements with or without range gating. (See for example, H. Kage, W. Freemen, Y Miyke, E. Funstsu, K. Tanaka, K. Kyuma "Artificial retina chips as on-chip image processors and gesture-oriented interfaces", Optical Engineering, December, 1999, Vol. 38, Number 12, ISSN 0091-3286, which is incorporated herein by reference.)

In a method for tracking motion of a vehicle in accordance with the invention disclosed above, optical waves are transmitted toward the object from at least one location, a first image of a portion of the space exterior of the vehicle is obtained, the first image being represented by a matrix of pixels, and optical waves are transmitted toward the object from the same location(s) at a subsequent time and an additional image of the particular space exterior of the passenger compartment is obtained, the additional image being represented by a matrix of pixels. The additional image is subtracted from the first image to determine which pixels have changed in value. A leading edge of the changed pixels and a width of a field of the changed pixels is determined to thereby determine relative movement of the object from the time between which the first and additional images were taken. The first image is replaced by the additional image and the steps of obtaining an additional image and subtracting the additional image from the first image are repeated such that progressive relative motion of the object is attained.

Also disclosed above is a method for controlling the steering system of a vehicle which comprises the steps of transmitting optical waves toward an object located in the vicinity of the vehicle, obtaining one or more images of an exterior space proximate to the vehicle, analyzing each image to determine the distance between the object and the vehicle, and controlling steering system to prevent the operator from causing a collision with the object based on the determined distance between the object and the vehicle.

The image may be analyzed by comparing the image of a portion of the exterior of the vehicle with stored images representing different arrangements of objects in the space proximate to the vehicle to determine which of the stored images match most closely to the image of the exterior of the vehicle, each stored image having associated data relating to the distance between the object in the image and the vehicle. The image comparison step may entail inputting the image or a form or part thereof into a neural network that provides for each such image, an index of a stored image that most closely matches the image of the exterior of the vehicle. In a particularly advantageous embodiment, the size of the object is measured and a vehicle system is controlled based on the determined distance between the object and the vehicle and the measured size of the object.

In another method disclosed above for determining the identification and position of objects proximate to a vehicle, one or more images of the exterior of the space proximate to the vehicle, or part thereof, of radiation emanating from the objects proximate to the vehicle, and the images of the radiation emanating from the objects are compared with stored images of radiation emanating from different objects proximate to the vehicle to determine which of the stored images match most closely to the images of the exterior objects of the vehicle such that the identification of the objects and their position is obtained based on data associated with the stored images. In this embodiment, there is no illumination of the object with optical waves. Nevertheless, the same processes described above may be applied in conjunction with this method, e.g., affecting another system based on the position and identification of the objects, a library of stored images generated, external light source filtering, noise filtering, occupant restraint system deployment control and the utilization of size of the object for vehicle system control.

Referring now to FIGS. 17–26, embodiments of vehicles in accordance with the invention including a new ground speed sensor will be described. The ground speed sensor is designed to more accurately detect the speed of travel of the vehicle on the ground than in prior art constructions discussed above. Specifically, the ground speed sensor in accordance with the invention accounts and compensates for pitching of the vehicle and/or slipping of the wheels which would provide an incorrect ground speed using prior art constructions.

Generally, the ground speed sensor is mounted on a frame of the vehicle and includes a wave transmitter or emitter and wave receiver. The wave transmitter or emitter directs waves at an angle from the vertical plane so that the waves impact the ground and reflect from the ground back to the wave receiver. A processor or other type of computational device considers the information about the transmission or emission of the waves and the reception of the waves and calculates the speed of travel of the vehicle on the ground based on the information. The information may be the frequency of the transmitted and received waves, the time of transmission and the time of reception of the waves and other similar parameters. The speed of travel of the vehicle on the ground may be determined based on a plurality of time intervals between transmission of waves and reception of waves. The processor can also be designed to determine the speed of travel of the vehicle on the ground based on a measurement of the Doppler frequency.

The ground speed sensor may be used with various agricultural machinery and construction equipment as described below. Once the ground speed is determined, the agricultural machinery can be controlled to distribute product based in part on the ground speed or the construction machinery can be operated based in part on the ground speed.

Compensation for pitching of the vehicle may involve mounting collocated transmitter and receiver on the frame to move in a curve about a center of rotation of the vehicle upon pitching of the vehicle. The absolute pitching angle of the vehicle is measured and a reference angle is also measured with the pitching angle of the vehicle relative to the ground being the difference between the absolute pitching angle and the reference angle. The reference angle may be measured using a gravity or tilt sensor. The absolute pitching angle of the vehicle may be measured by a two antenna GPS receiver.

Various constructions of the wave transmitter and receiver may be used including those discussed above. For example, the wave transmitter may comprise one or more laser diodes, a pulsed laser and a continuous laser beam directing infrared light to scan in a line. In the latter case, a transmitter control unit for controlling the scanning laser beam of infrared light such that the infrared light traverses an area of the ground near the vehicle. The wave receiver may comprise a single pixel receptor, a CCD array, a CMOS array, an HDRC camera, a dynamic pixel camera and/or an active pixel camera.

The wave transmitter and receiver can be designed to transmit ultrasonic waves, radar waves and infrared waves among others. In the latter case, a notch filter may be used for filtering light other than infrared light emitted by the wave transmitter. A light valve can also be used as the wave receiver.

Figure 17:
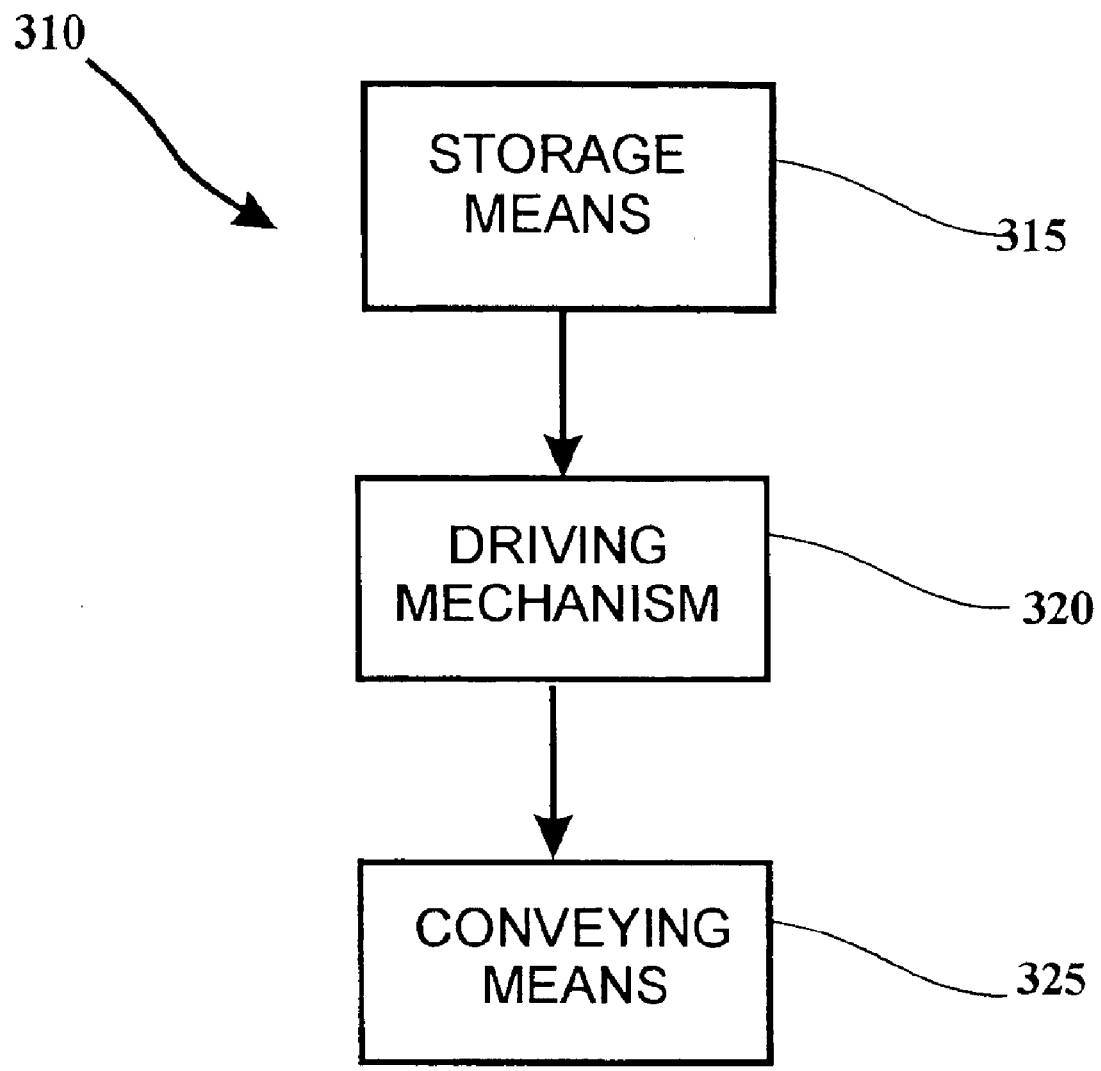
FIG. 17 is a block diagram of a known agricultural product distribution machine.

Referring now to FIG. 17, a known product distribution machine 310 generally includes a frame, at least one tank, bin or other storage compartment 315 for holding product to be distributed, and a distribution system or other conveying mechanism 325 to transmit the product to a desired location such as the field. A driving mechanism 320 passes the product from the storage compartment 315 to the conveying mechanism 325. The storage compartment 315, driving mechanism 320 and conveying mechanism 325 may be mounted on the frame or may constitute the frame.

Figure 18:
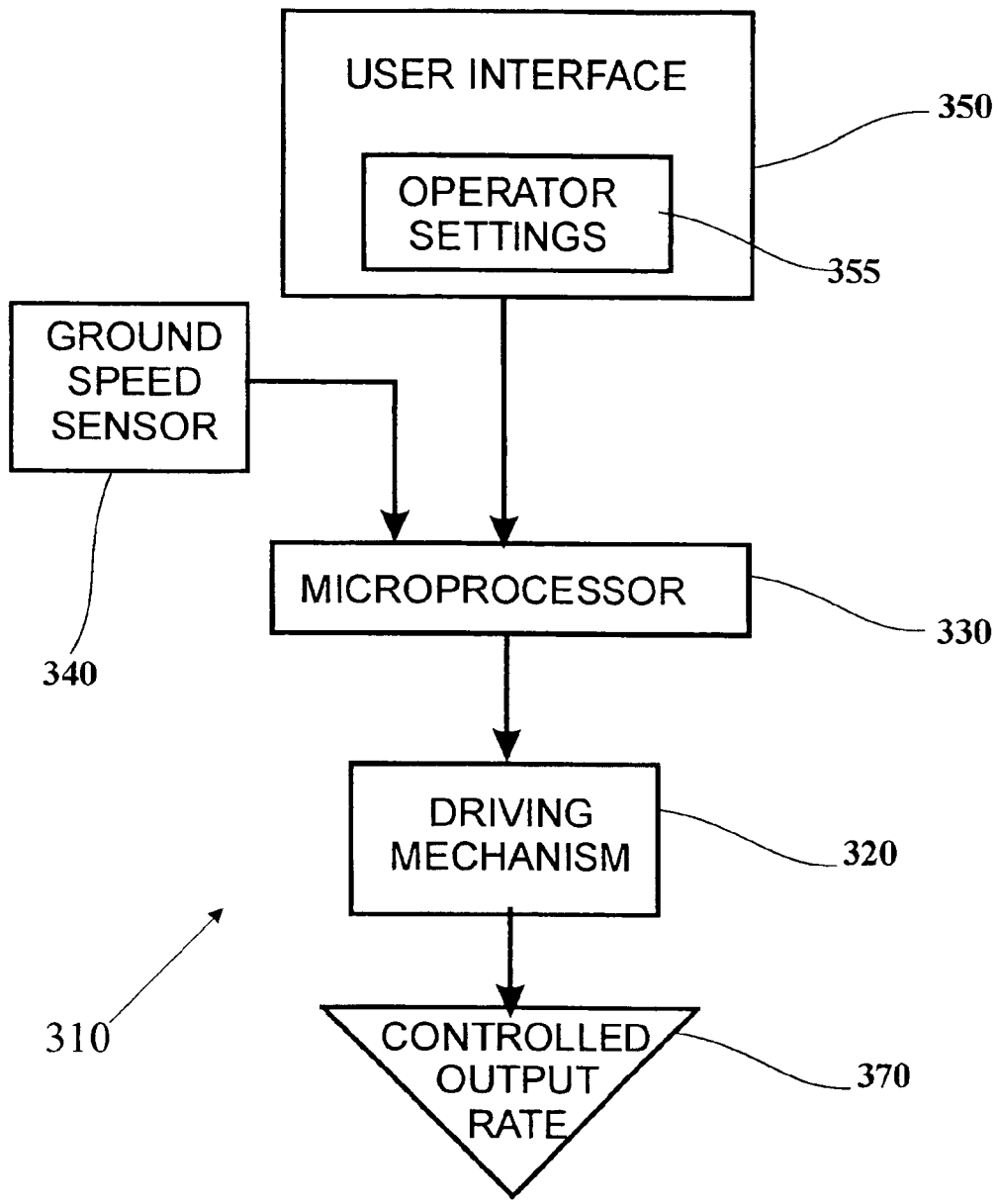
FIG. 18 is a block diagram of a control unit, in accordance with an embodiment of the primer system in FIG. 2.
Figure 19:
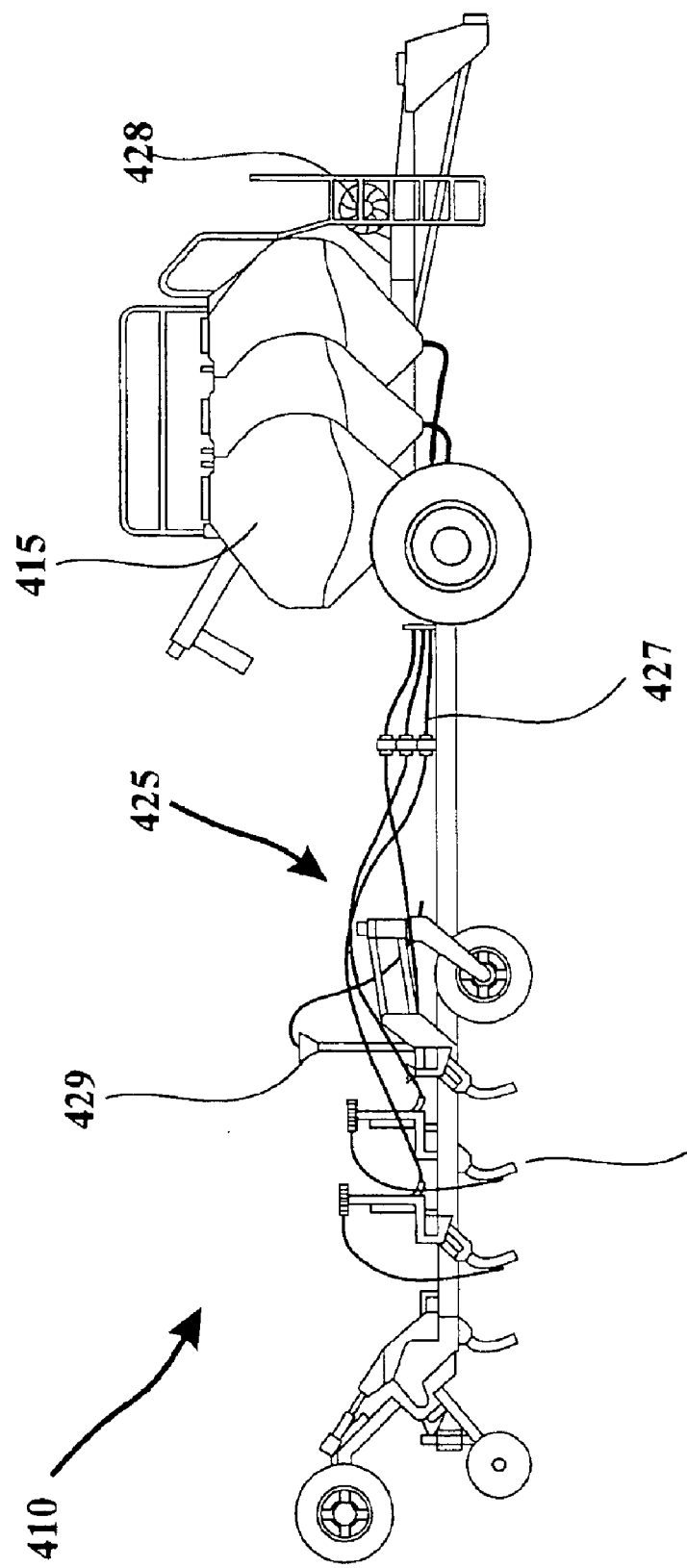
FIG. 19 represents a basic air delivery system.

Referring now to FIGS. 18 and 19, the control unit of the product distribution machine 310 generally includes a microprocessor 330, which enables the driving mechanism 320 to run automatically. The agricultural product distribution machine 310 is towed by a vehicle (not shown) in a field onto which product must be applied. In one embodiment of the invention, the microprocessor 330 receives command signals from a ground speed sensor 340 and from a user interface 350. The ground speed sensor 340 detects the ground speed or forward speed of the tractor, not shown, that is towing the agricultural product distribution machine 310 across the field.

The user interface 350 allows the operator to monitor and set various parameters relating to the process, such as application rate, location in the field, implement widths, calibration numbers, and the like. Some of the process parameters can be changed through controls or operator settings 355.

The operator settings 355 on the user interface 350 may be buttons or any other input means, such as keys on a keypad, switches, levers, or the like, mouse pad or even voice input. The user interface 350 is positioned in such a way that an operator can control the system while the agricultural product distribution machine 310 is traveling on the field. The user interface 350 can comprise a display and a console situated in the cab of the tractor towing the agricultural product distribution machine 310.

The ground speed and the data from the user interface 350 are processed by the microprocessor 330. Upon processing, the microprocessor 330 activates the driving mechanism 320 that, in turn, drives product from the storage compartment 315 into the conveying mechanism 325 at a controlled rate output 370.

During operation, the driving mechanism 320 runs automatically at a dispensing rate calculated based on the detected ground speed, on the operator settings, and on other process specific parameters. Therefore, the controlled rate output 370 varies with the rate data input to compensate for ground speed fluctuations and to produce a consistent application of the product onto the field.

The system in accordance with the invention assumes that detailed meter-by-meter variation in the distribution of the product onto the field is not required. Instead, the goal is the most even distribution of product as possible. Under these assumptions, normally the farmer will try to be certain that every part receives the optimum amount of product and thus he will tend to slightly over apply product in order to account for the inaccuracy in the ground speed sensor 340 for the case where it over calculates the true ground speed. On the other hand, when the wheels are slipping, even more product will be dispensed per linear meter. Thus, in normal operation there will be an uneven distribution of product and it will tend to result in the consumption of an excess of product. Under these assumptions, by practicing the invention, the farmer will save money as now he will not have to over-dispense product on average and in particular when the wheels are slipping. In the other case where the farmer truly dispenses the right amount of product on average but the distribution is uneven under the prior art system, he will be penalized with inferior yield and thus lose money at harvest time compared with what he will receive when practicing this invention.

The invention will be described next in the context of three preferred embodiments: air seeding systems, precision planters, and sprayers. The person skilled in the art will recognize that the present invention may be embodied in other types of product distribution machines.

Air Seeders

Figure 20:
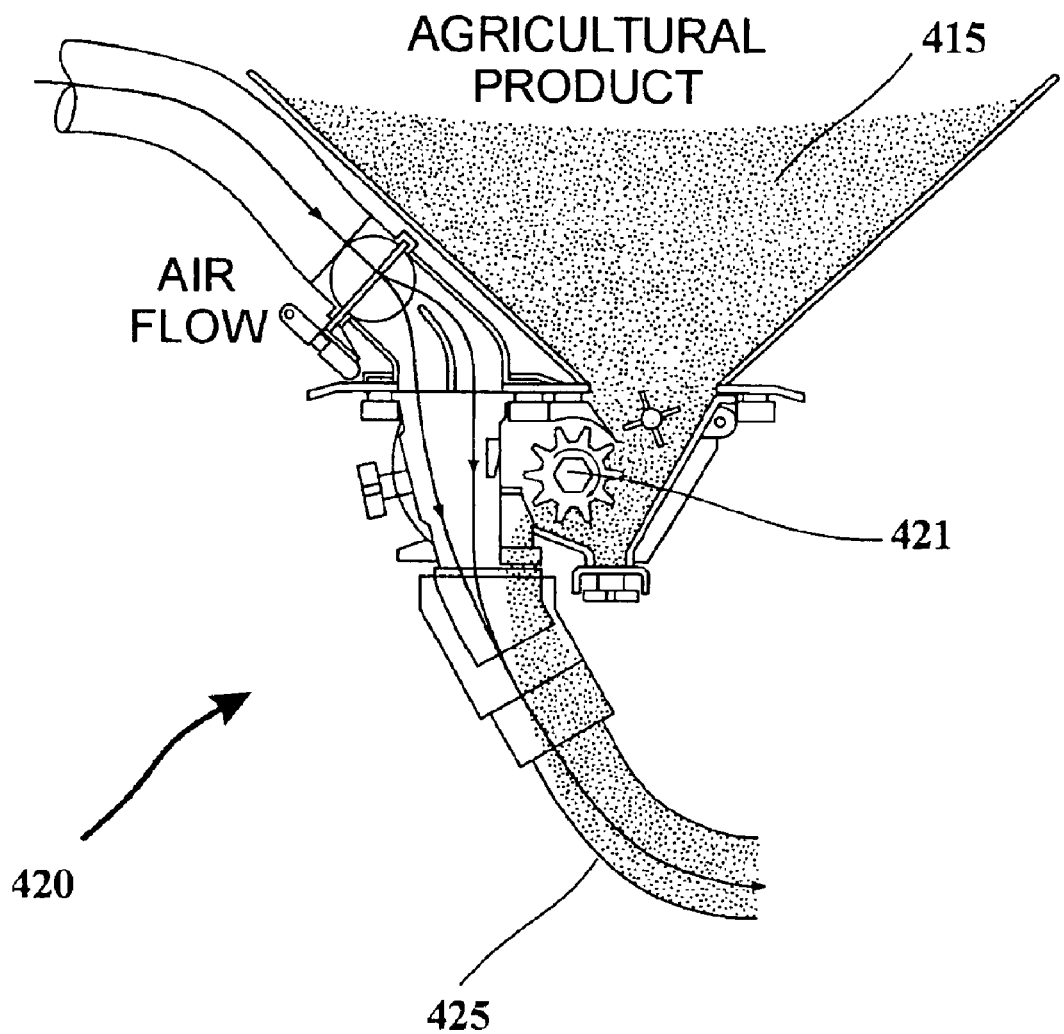
FIG. 20 represents a metering mechanism of the air delivery system in FIG. 20.

FIGS. 19 and 20 depict an air seeder or air cart 410 (which is an agricultural product distribution machine 310) embodying the present invention. The air cart 410 includes an air distribution system 425 (which is a conveying mechanism 325). The air cart 410 also includes a seeding tool 327, which may be a series of ground openers. The air distribution system 425 includes a manifold 427, and in some embodiments, a series of hoses. The air cart 410 can be attached to a vehicle, such as a tractor, or it can be built as an integral part of a vehicle. The air cart 410 includes one or more tanks 415 (which constitute a storage compartment) to hold products like seed and fertilizer. The air cart 410 also includes a driving mechanism 320. The driving mechanism 320 includes a metering system 420 to deliver the appropriate amount of product to the air distribution system 425, and a fan 428.

The metering system 420 controls the dispensing rate of product from the tanks 415 into the air distribution system 425. The dispensing rate of the metering system 420 determines the application rate of product onto the field.

Referring now to FIG. 20, the metering system 420 includes a metering wheel 421 designed to dispense product at a predetermined rate. As product passes through the metering system 420, it is carried by airflow provided by the fan 428 through the manifold 427 to headers 429, where the product is split into several runs and then passes through the ground opener or seeding tool 327 and into the furrow created by the ground opener or seeding tool 327.

The metering system 420 is driven automatically by a variable rate drive mechanism. In the case of a metering wheel 421, the variable rate drive mechanism will rotate the metering wheel 421 at various rates. Many designs of variable rate drive mechanisms are known in the art and can be used in embodiments of the present invention.

The air cart 410 also comprises sensing equipment, including a ground speed sensor 340 for detection of the ground speed of the air cart 410. Thus, variations in the ground speed of the air cart 410 may be taken into account when calculating the application rate, so that seeds can be dispensed evenly. The accuracy with which the seeds are distributed depends on the accuracy of the ground speed sensor 340 as discussed above.

Figure 21:
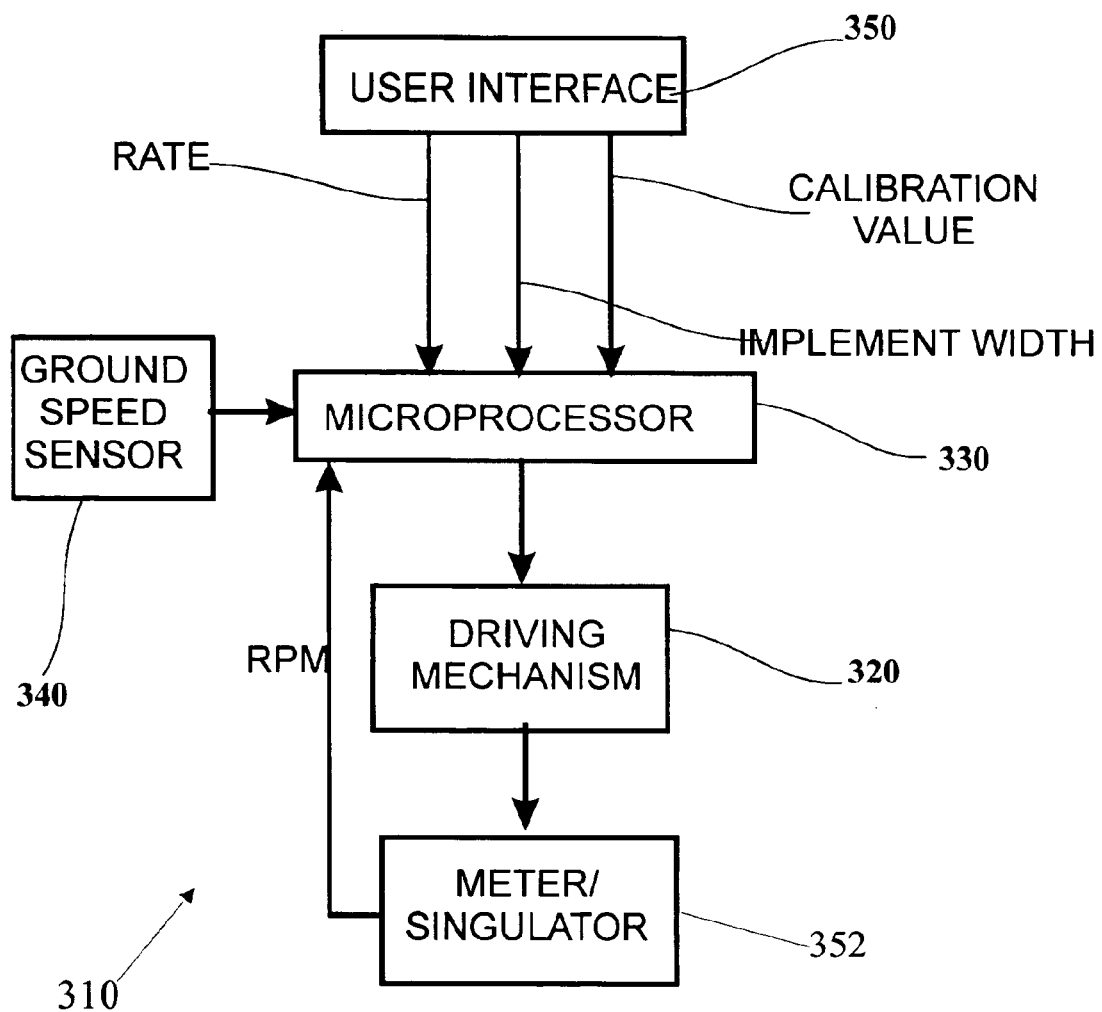
FIG. 21 is a block diagram of a primer system in accordance with an embodiment of the present invention, as it applies to seeders and planters.

FIG. 21 is a block diagram of a system in accordance with the present invention as it applies to seeders and planters. The microprocessor 330 receives signals from the ground speed sensor 340 and the user interface 350, such as the desired rate, the implement width and the calibration value. A feedback loop returns to the microprocessor 330 the rotation rate of the metering wheel 421 at any moment (the RPMs from the meter/singulator 352 which is comparable to the metering wheel 421). Based on this information, the microprocessor 330 calculates the desired rate at any moment and commands the metering wheel 421 to rotate at the desired rate. As previously indicated, the user interface 350 comprises operator setting buttons 355.

Planters

Like the air seeders, planters have several tanks for holding seed or fertilizer, and an air distribution system comprising a series of hoses. Product travels through the hoses, entering through a series of inlets into several chambers for storing the product. In one embodiment, each chamber has joined to it a fingered singulator disk. Each chamber is located just above a corresponding ground opener. The singulator disk rotates such that as each finger passes the place where product puddles into the chamber, a single seed/fertilizer falls into the finger. The disk continues to rotate such that each subsequent finger can pick up product. The filled fingers pass a brush that eliminates the chance of multiple seeds being in a single finger. The filled fingers pass another opening in the disk when the product is dropped onto an elevator opening that carries the product to the ground opener.

The driving mechanism 320 of the planters can operate in a mode as previously discussed. FIG. 21 applies to planters, as well as, seeders.

The driving mechanism 320 of the planter is activated into rotating the singulator disk 352 at the controlled rate output 370. In this mode, the controlled rate output 370 is a function of the operator settings and of the detected ground speed.

Sprayers

Figure 22:
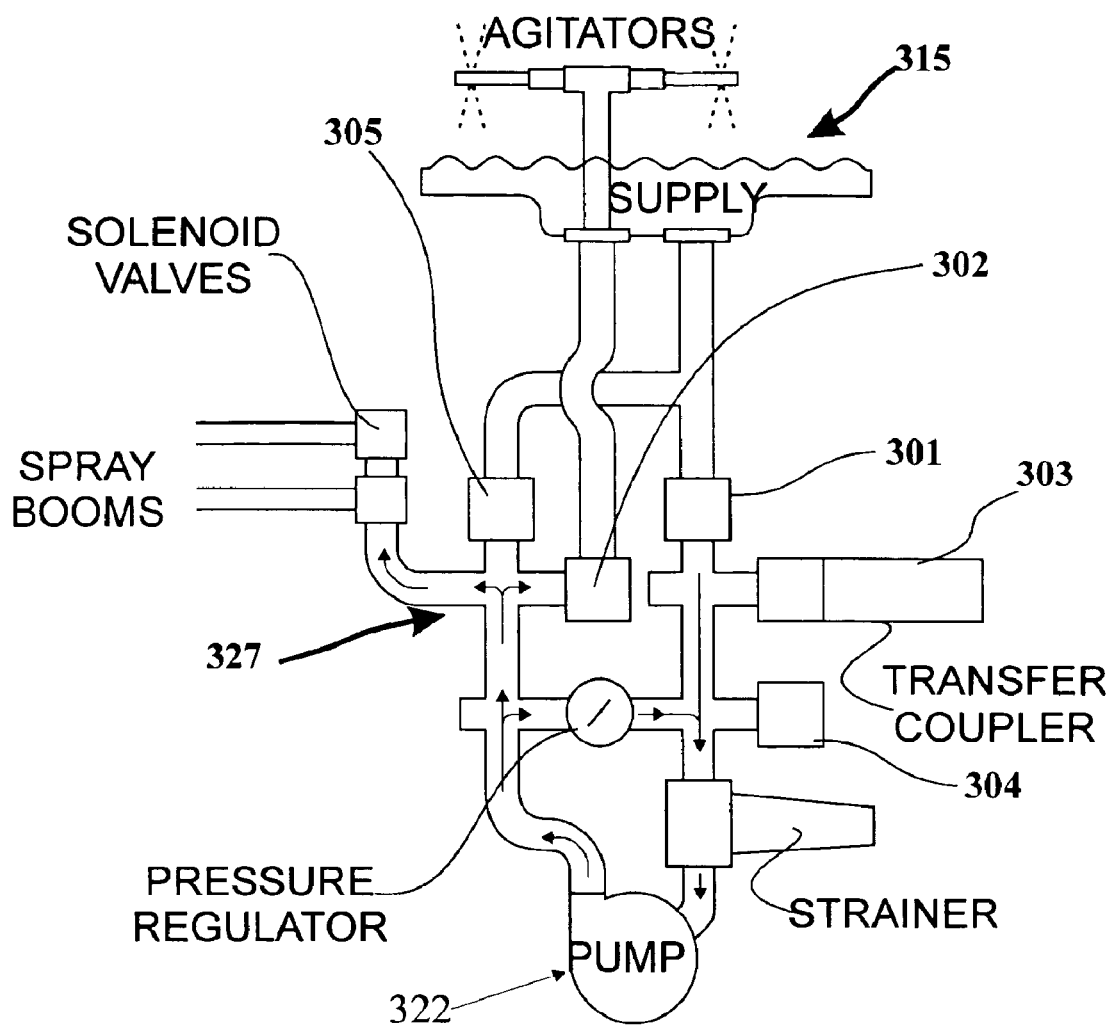
FIG. 22 represents a basic sprayer system.

Referring now to FIG. 22, a basic sprayer is depicted. Generally, a sprayer has at least one storage compartment 315 for chemicals. In an embodiment of the invention, the compartment 315 contains a pre-mixed chemical ready for distribution. In an alternative embodiment, the compartments 315 store only water and, as the water travels through the distribution lines 327, the water is injected with the correct amount of chemical. The required gallons/acre ratio is known and programmed into a microprocessor 330, connected to the user interface 350 in the cab of the tractor towing the sprayer. The gallons/acre ratio is dependent upon the type of crop, the type of chemical, the position in the field, and the like. A pump 322 pushes the product into the distribution lines 327. As product is pushed into the distribution lines 327, it travels down at the flow rate necessary to dispense the required gallons/acre out of the nozzle on the spray bar. During this process, the entire system automatically remains pressurized at the appropriate level. The flow rate is dependent upon the ground speed of the sprayer. (what are 301,302,303,304)

Figure 23:
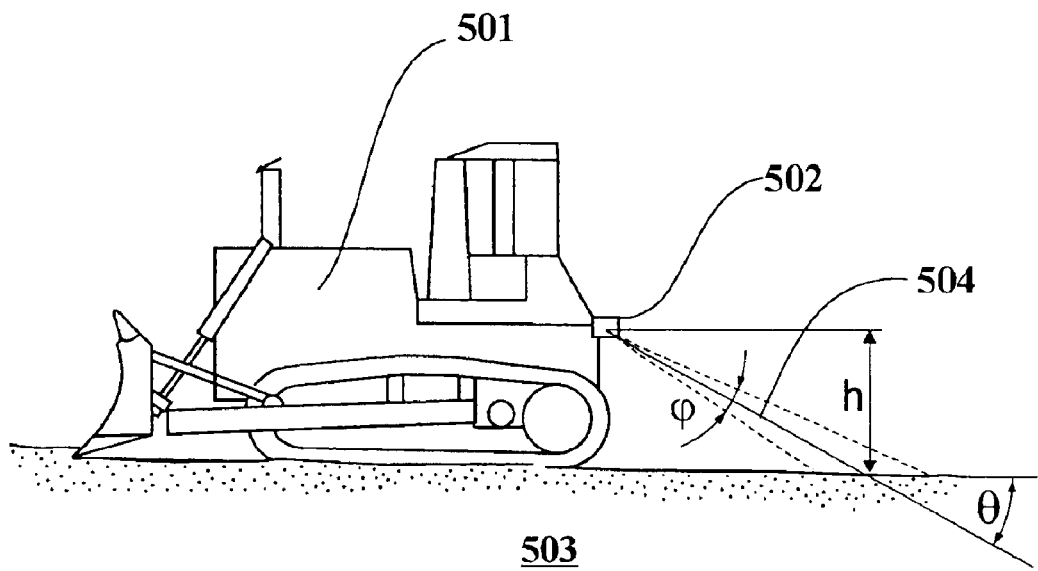
FIG. 23 shows a rearward pointing installation arrangement for a vehicle speed detection system on a bulldozer according to an embodiment of the invention.

In FIG. 23, the invention is shown applied to a vehicle speed detection system incorporated in a tracklaying vehicle such as a bulldozer. This vehicle speed detection system comprises a Doppler and displacement-measuring sensor 502 mounted on a rear part (e.g., ripper frame) of the vehicle body of a bulldozer 501 at a level h. The Doppler and displacement-measuring sensor 502 transmits an electromagnetic or ultrasonic wave beam 504 toward the ground 503 at a specified beam depression angle θ and receives a reflected wave from the ground 503. The ground speed of the bulldozer 501 is calculated based on these transmitted and received waves. The normal variation in the mounting angle is normally around (φ=±5 degrees.

Figure 24A:
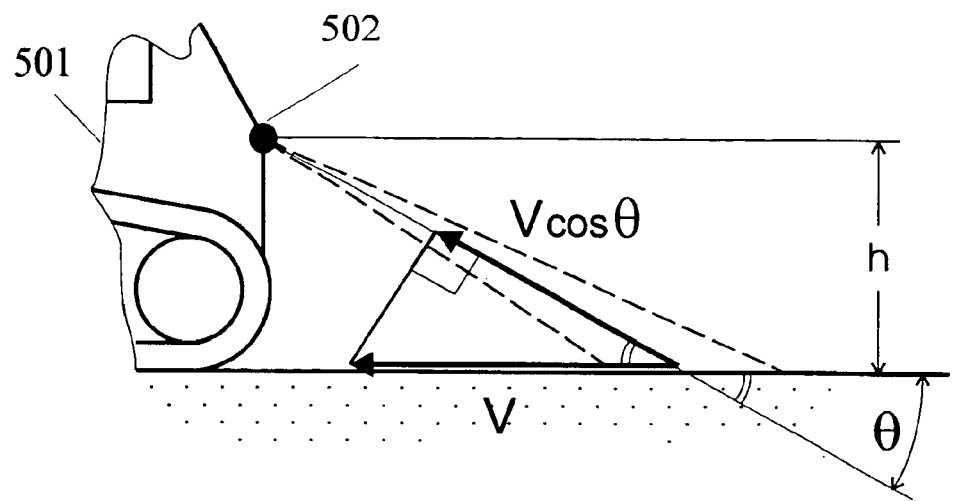
FIGS. 24A and 24B show the effects of slope and pitch on the ground speed sensor of this invention.
Figure 24B:
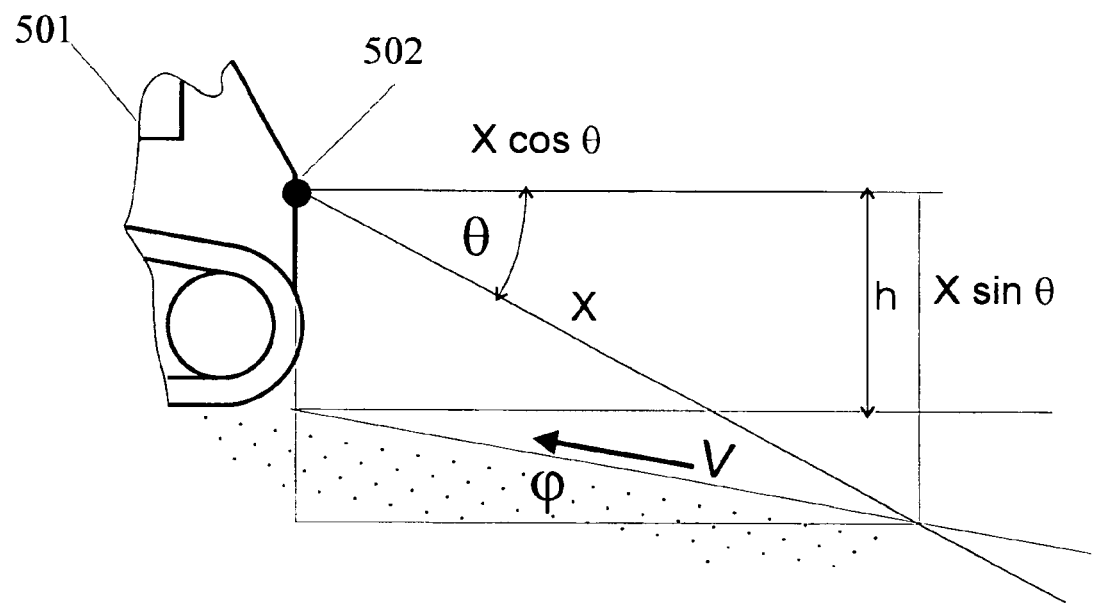

Referring now to FIGS. 24A and 24B which illustrate the logic of the correction executed in the vehicle speed detection system to eliminate the influence of the pitching angle of the vehicle.

FIG. 24A shown the relationship between the horizontal speed (v) of the vehicle 501 and the speed of the vehicle 501 in the direction that the waves are transmitted and is described by v cos(θ). Therefore, the relationship between Doppler shift frequency Δf and the vehicle speed v is described by the following equation (2), which is basically the same equation as (1).

$$\Delta f = 2f\, V \cos(\theta)/C \qquad (2)$$

where:

f is transmission frequency, and

C is electromagnetic wave propagation velocity.

In this embodiment, the sensor 502 moves in a curve about the center of rotation of the vehicle 501 when the vehicle 501 pitches. To this end, the sensor 502 is movably mounted to a frame of the vehicle 501.

The pitching movement rotates the sensor 502 changing its effective transmission angle relative to the ground 503. If the angle of the vehicle 501 relative to the ground 503 is known due to pitching, then the angle θ can be corrected and the Doppler velocity determined. This can be accomplished using an angular rate sensor as described in U.S. Pat. No. 6,230,107, which is incorporated herein in its entirety by reference, or by using a tilt sensor such as manufactured by Frederick.

However, an angular rate sensor only measures the change in the pitch angle and therefore it requires that a reference be provided such as by a gravity or tilt sensor, otherwise the results are inaccurate. Even using the tilt sensor poses problems as to when the sensor is giving an accurate reading in the presence of frequent and rapid angular motions. Pitch can also be accurately measured if a two antenna GPS receiver is present but then the system begins to get expensive. This is not a totally illogical solution, however, since GPS receivers are rapidly becoming less expensive as they are put in cell phones to satisfy federal 911 mandates. Of course, all of these solutions fail if the vehicle is operating on a hill unless an accurate map is available. What is desired is the velocity of the vehicle relative to the ground even if the ground is sloping.

The present invention solves this problem by measuring both the Doppler velocity and the distance that the transmitted waves travel to the ground 503 and return. By knowing this distance, which is the hypotenuse of the measurement triangle and by knowing the angle that the sensor transmits relative to the vertical axis of the vehicle 501, the measurement triangle is determined and the pitching angle of the vehicle 501 can be determined, assuming that the rear portion of the track or the rear wheels are touching the ground, and the transmission angle corrected to give an accurate velocity of the vehicle 501 independently of whether the vehicle 501 is traveling on level ground or a hill.

FIG. 24B illustrates the case of a counterclockwise pitch of the vehicle and where the vehicle is traveling up a hill. The distance X to the reflecting ground 503 is measured based on time-of-flight or phase relationships as discussed above and the measurement triangle determined. The base altitude of the triangle can be calculated as X sin(θ) and the altitude as X cos(θ) and then the pitch angle φ from tan(φ)=(X cos(θ)−h)/X sin(θ). The new transmission angle θ' then is θ+φ (for angles positive clockwise) permitting a corrected calculation of the velocity of the vehicle 501.

In some cases, it is desirable to add a compass such as a fluxgate compass or a Honeywell HMR3000 magnetic compass manufactured by Honeywell. This addition makes it possible to also accurately know the heading of the agricultural vehicle and can allow some location information of where the vehicle is on the field. This then permits control of product distribution by location on the field in a much less expensive, although not as accurate, method as the Beeline system discussed above. The device is not shown in the figures but can be added as a component on a printed circuit board that contains other related components. In some cases, it would be mounted elsewhere to minimize the effects of metallic parts of the vehicles.

Although pitch has been the main focus herein, a similar system can also be used to measure roll of the vehicle if it sends and receives radiation to the side of the vehicle. When the compass as discussed above and a dual system as described here is used, all of the angles, pitch, yaw and roll as well as the vehicle displacements (and thus velocities and accelerations) can be determined and a sort of low cost inertial measurement unit has been created.

Figure 25:
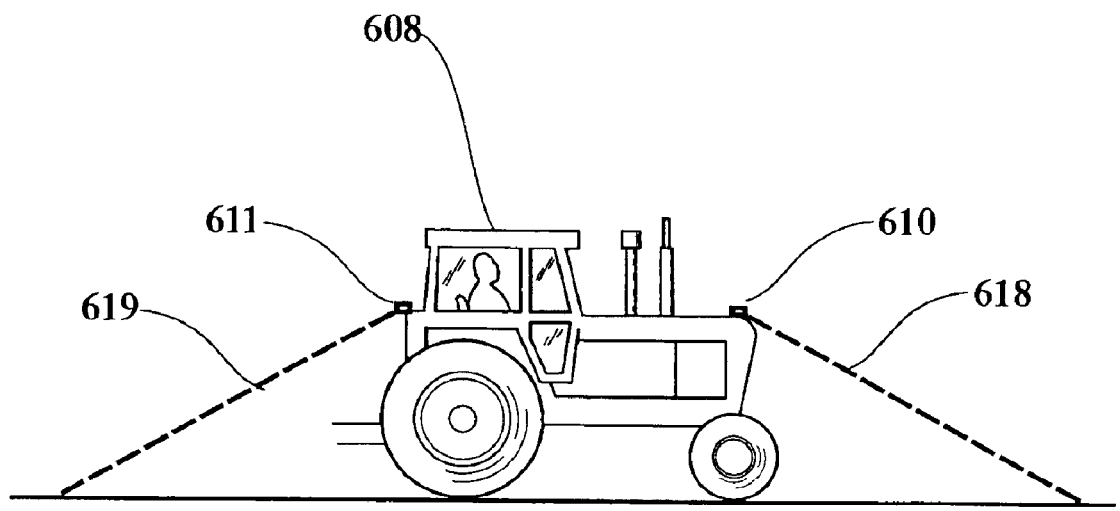
FIG. 25 shows a forward pointing installation arrangement for a vehicle speed detection system on a tractor according to an embodiment of the invention.

The speed sensing system or sensors 610 and 611 in accordance with the present invention is shown installed on an agricultural vehicle 608 in FIG. 25. The sensors 610 and 611 are installed high on the tractor so as to keep them away from contaminating dirt and other contaminants. The sensors 610 and 611 include transducers and are built such that their transducers emit signals along a respective path 618 and 619 that are nominally each at an angle θ with the ground of approximately 35 degrees. The vehicle is moving at a velocity V.

The sensors 610,611 may be installed on a frame of the agricultural vehicle 608 or on any of the parts of the agricultural vehicle 608 which may thus constitute the frame. That is, the agricultural vehicle 608 may include a storage compartment for storing product to be distributed, a conveying or distribution mechanism for dispensing the product to a field and a driving mechanism for conveying the product from the storage compartment to the distribution mechanism at a controlled rate. The sensors 610,611 may be mounted on the storage compartment, on the distribution mechanism and on the driving mechanism so that all of these could constitute the frame of the vehicle 608.

Figure 26:
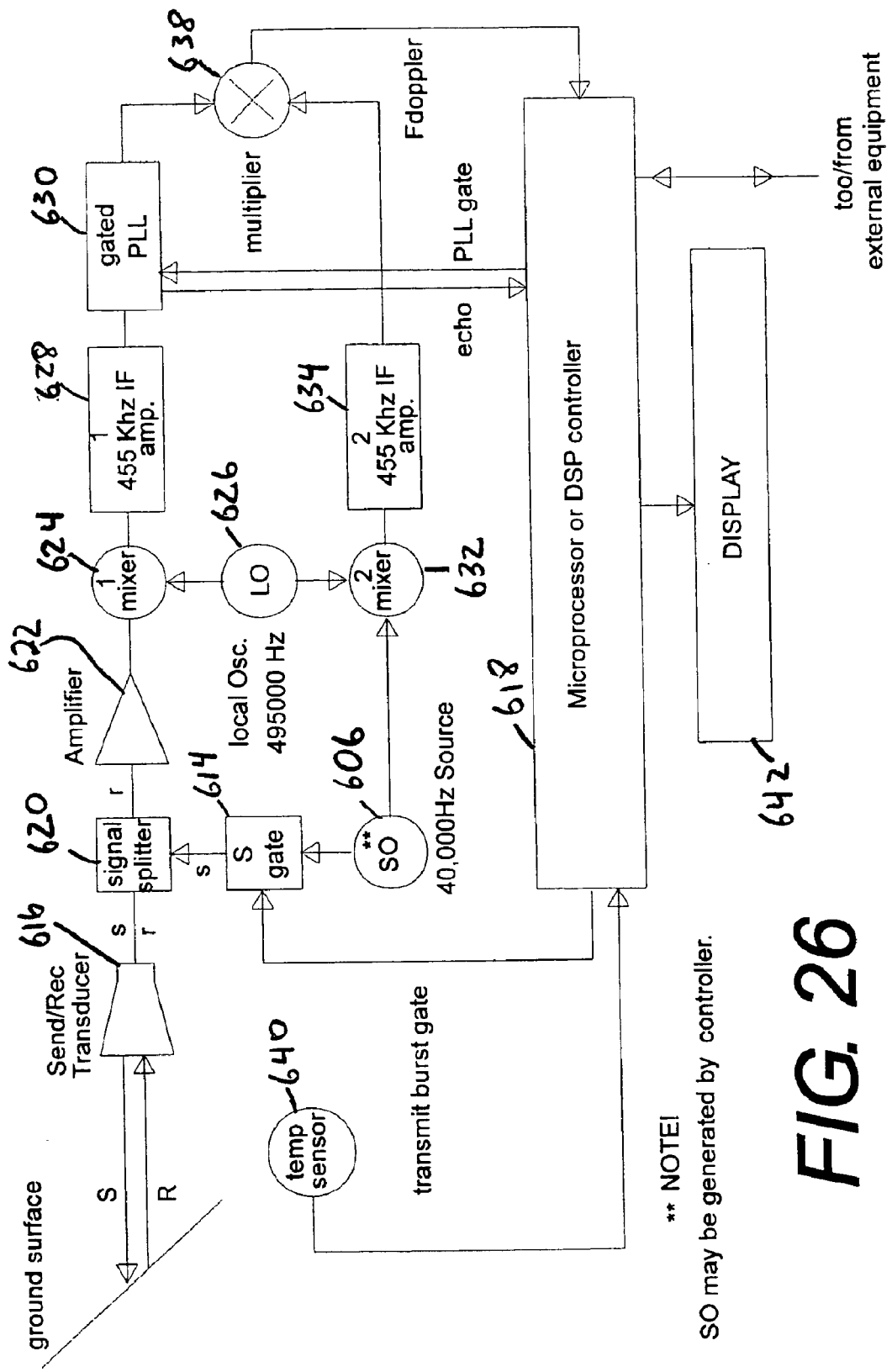
FIG. 26 is a block diagram for an ultrasonic distance and speed detector.

FIG. 26 shows a block diagram of an ultrasonic velocity and distance to ground sensor 610,611 in accordance with one embodiment of the invention. The microprocessor or DSP, the processor 612, generates a 40 KHz continuous signal (SO) from source 606 that is gated for a burst by gate 614 controlled by the processor 612. The burst is typically 16 cycles to allow the transducer 616 to reach full output in amplitude. The output of the gate 614 is fed through a signal splitter 620 to the Send/Receive transducer 616. The echo signal R from the ground is converted to a voltage by the Send/Receive transducer 616. This r signal is sent to the signal splitter 620 and then to an amplifier 622. The amplifier 622 drives a mixer 624 which mixes the LO (local oscillator) 626. The output of the mixer 624 goes to a 455 KHz intermediate frequency (IF) amplifier 628. The output of the IF amplifier 628 is connected to a gated PLL (phase locked loop) 630. This loop 630 is gated ON for lock during the received echo time. The output of the PLL 630 contains the IF frequency plus the Doppler frequency and is input to a multiplier 636.

The SO source 606 and the LO 626 are inputs to mixer 632, the reference channel. The output of mixer 632 drives an IF amplifier 634. The output of the amplifier 634 is provided to the multiplier 636 so that the output of the multiplier 636 is the product of IF1 and IF2. The output of the multiplier 636 will be the sum and difference of the two frequencies. The sum is then filtered out and the difference is the Doppler frequency. The Doppler frequency is measured by the microprocessor or DSP 612 and is scaled to indicate the speed in MPH or other convenient units.

The wheel slip of the tractor can be calculated, if desired, by taking the difference of the wheel speed and the ground speed by inputting the wheel speed into the to/from external equipment input of the microprocessor or DSP 612.

The IF amplifiers 628,634 have a narrow bandwidth to filter out noise from the echo signal. The IF signal has more cycles than the burst by the ratio of 455000/40000 or (11.375). This is important so that there are sufficient cycles for the PLL 630 to lock onto. For a 16 cycle 40 KHz burst, the number of cycles for PLL lock is 182 plus the ringing cycles. The PLL 630 filters out and averages the frequency of the echo. The PLL output runs at the frequency of IF1 until the next sample to the PLL 630.

A display 642 is provided coupled to the microprocessor or DSP 612 and displays the information obtained from the sensor.

The frequency of 455 KHz was selected because of the many ceramic filters that are available for this frequency. The IF bandwidth is determined by the IF filters 628,634. The drive level for the Send/Receive transducer 616 is high to maintain the best signal to noise ratio. Other frequencies of the IF filters 628,634 can be used in accordance with the invention.

The circuit can be made very compact by using surface mount components. All of the circuitry except the transducer drive operates at 3.3 volts.

The speed of sound varies significantly with air temperature and to a lesser extent with altitude. Compensation for the temperature effect can be achieved through measuring the ambient temperature via temperature sensor 640 coupled to the microprocessor or DSP 612 and calculating the value of the sound velocity, C, as is well known in the art. Similarly, a barometric sensor can be used to measure the atmospheric pressure and its effect on the speed of sound can also be calculated as is also known in the art. Alternately, a second ultrasonic transducer can be placed within the field of the first transducer but at a known displacement and the speed of sound can be measured. The measured or calculated value for C would then be used in the calculations of equations (1) or (2).

Thermal gradients caused by the sun heating the ground can also have a significant effect on the returned waveform. This problem has been solved and is disclosed in commonly assigned U.S. Pat. No. 6,517,107, which is incorporated herein by reference in its entirety.

Finally, wind can also affect the system by causing density changes in the air and diffracting the sound waves in much the same way as thermal gradients. The techniques for solving the thermal gradient problem such as through the use of a logarithmic compression circuit will also correct for this effect. To the extent that wind shortens the time for the waves to travel to the ground in one direction, it will lengthen that time in the other direction and the two effects cancel. A strong side-wind can deflect the path of the sound waves and create an increased path to and from the ground and thus introduce an error. Normally this is small since the wind velocity is normally small compared with the speed of sound. In rare cases where this effect needs to be considered, an anemometer can also be incorporated into the system, and coupled to the microprocessor or DSP 612, and the wind speed can then be used to correct for the path length of the ultrasound waves.

Figure 27:
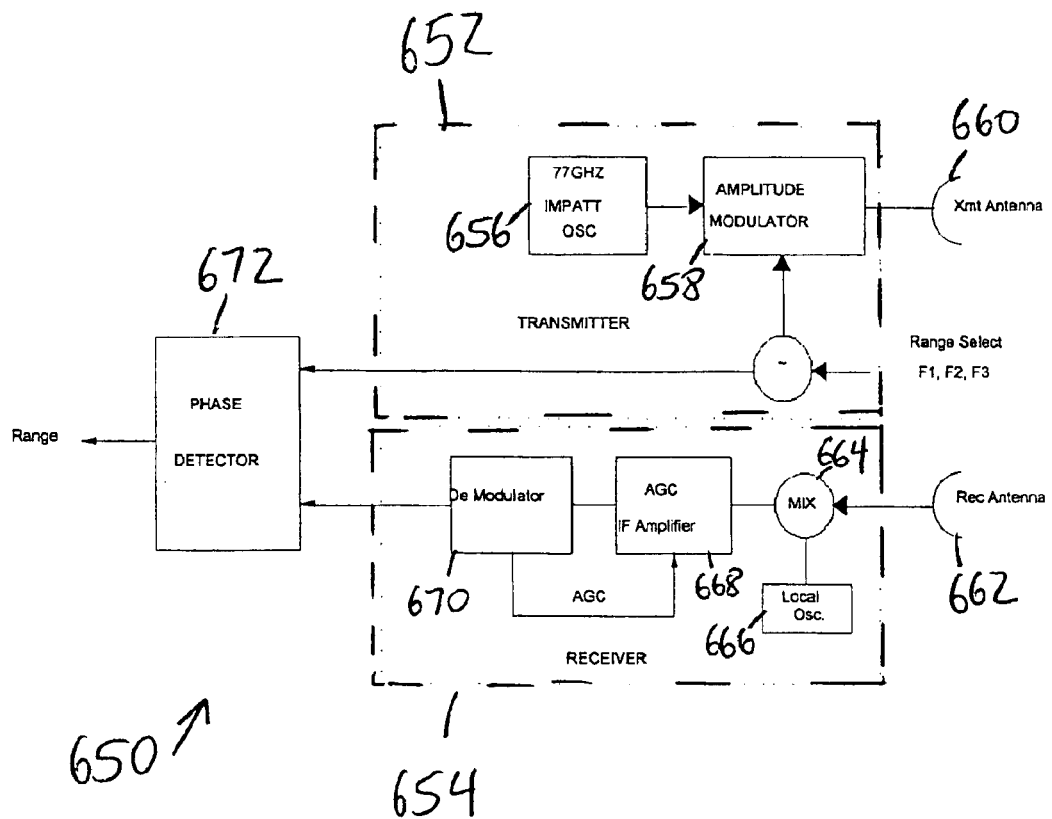
FIG. 27 is a schematic of a circuit for use in determining the distance to object.

FIG. 27 shows a circuit 650 of a distance sensor which is also capable of use in any of the embodiments disclosed herein for determining the distance between the sensor and an object. For example, with reference to the embodiments disclosed in FIGS. 17–26, the sensor can be used as a distance-to-ground sensor for determining the distance between the mounting location of the sensor and the ground.

The circuit 650 operates on a radar frequency and includes a transmitter 652 and a receiver 654. The transmitter 652 includes a 77 GHz IMPATT oscillator 656 providing a signal to an amplitude modulator 658. The amplitude modulator 658 also receives a signal indicative of a selected range F1, F2 or F3 and then directs a transmission of a signal at a specific frequency from a transmitting antenna 660. The receiver 654 includes a receiving antenna 662 which receives a signal reflected from an object, wherein it is desired to determine the distance between the sensor (in which the transmitting antenna 660 and the receiving antenna 662 are mounted) and the object.

Receiver 654 also includes a mixer 664 provided a signal by a local oscillator 666 which combines the signal from the receiving antenna 662 and the local oscillator 666 and feeds the combined signal to an AGC IF amplifier 668. The amplifier 668 amplifies the signal and feeds the amplified signal to a demodulator 670, with a feedback loop being formed to the amplifier 668. Optionally, the receiver 654 can be set up with an AFC loop for auto-tuning purposes. In this case, the frequency drift of the IMPATT oscillator 656 will have little or no effect on the operation of the circuit 650.

The signal from the demodulator 670 and the selected frequency range are fed to a phase detector 672 which derives the distance between the sensor in which the circuit 650 is embodied and the object based on the detected phase difference. From successive distance measurements, the velocity of the object can be determined.

Advantages of the circuit 650 are that it is a relatively simple circuit which can be constructed from readily available electronic components.

Thus, disclosed above, among other things, is an arrangement for obtaining information about objects in an environment around a vehicle comprises light emitting means arranged on the vehicle for emitting infrared light into the environment around the vehicle, receiver means arranged on the vehicle for receiving infrared light from the environment around the vehicle and measurement means coupled to the light emitting means and the receiver means for measuring time between emission of the infrared light by the light emitting means and reception of the infrared light by the receiver means. The measured time correlates to distance between the vehicle and an object from which the infrared light is reflected. The light emitting means may comprise an array of laser diodes, a pulsed laser or a continuous laser beam directing infrared light in a line and means for controlling the laser beam to change a direction of the infrared light such that infrared light traverses a volume of space alongside the vehicle. In the latter case, the receiver means could comprise a single pixel receptor. Otherwise, the receiver means may comprise a CCD array, a CMOS array, an HDRC camera, a dynamic pixel camera and an active pixel camera.

A processor or control circuitry is usually coupled to the receiver means, by the use of wires or even wirelessly, for providing an identification of the object from which light is reflected. The processor preferably utilizes pattern recognition techniques such as a neural network or even possibly a modular neural network to determine the distance between the vehicle and the object, the position of the object and/or the identity of the object from which light is reflected. The processor can be designed to create a three-dimensional map of a portion of the environment surrounding the vehicle based on the received optical waves or energy, and then extract features from the three-dimensional map. In the latter case, a display is provided in the passenger compartment visible to a driver of the vehicle for displaying features or representations derived from features extracted from the three-dimensional map.

As to the position of the light receiving components and associated receivers, they may be collocated or spaced apart from one another. When used for blind spot detection, they should be positioned around the vehicle to encompass the blind spots of the driver.

A system for controlling a vehicular system based on the presence of an object in an environment around a vehicle comprises any of the foregoing constructions of the arrangement for obtaining information about an object in the environment surrounding the vehicle. A vehicular system is then adapted to be controlled or adjusted upon the determination of the presence of an object in the environment around the vehicle. To this end, a processor is coupled to the arrangement and the vehicular system for obtaining the information about the object based at least on the infrared light received by the receiver means and controlling the vehicular system based on the obtained information. The vehicular system may be a display visible to a driver of the vehicle for displaying features or representations derived from features extracted from a three-dimensional map generated by the processor from the optical waves or energy received by the receiver means. The vehicular system could also be a steering wheel having an adjustable turning resistance, which is adjustable with a view toward avoiding accidents, and an audio alarm and a visual warning viewable by a driver of the vehicle.

A main feature of one embodiment of the invention is the combination of an optical system with superimposed infrared patterns. In other words, the basic system is a passive optical system. Another feature is the use of a high dynamic range camera that can be used to get the image. A third feature is to use modulated light or triangulation to determine the distance to an object in the blind spot. Another feature of the invention is to interpret and identify the image rather than just offering it to the driver. Still another feature of the invention is to provide methods of obtaining three dimensional information about objects in the vicinity of the vehicle by using modulated illumination and phase information from the reflected light.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claims:

1. A vehicle, comprising
   a ground speed sensor arranged to detect the speed of travel of the vehicle on the ground,
   said ground speed sensor comprising
      a wave transmitter arranged to transmit waves toward the ground,
      a wave receiver arranged to received waves reflected from the ground after transmission by said wave transmitter, and
      a processor coupled to said wave transmitter and said wave receiver and arranged to determine the speed of travel of the vehicle on the ground based on the waves transmitted by said wave transmitter and the waves received by said wave receiver,
      the waves being transmitted by said wave transmitter in pulses or modulated such that said processor is able to determine the distance between a wave-transmission and reception point and the ground and the velocity of the vehicle based on analysis of the waves transmitted by said wave transmitter and the waves received by said wave receiver.

2. The vehicle of claim 1, further comprising a control unit for controlling said wave transmitter, said control unit being arranged to direct said wave transmitter to transmit waves in pulses.

3. The vehicle of claim 1, further comprising a control unit for controlling said wave transmitter, said wave transmitter including a modulator for enabling the transmission of modulated waves, said control unit being arranged to control said modulator such that said wave transmitter transmits modulated waves.

4. The vehicle of claim 1, further comprising a control unit for controlling said wave transmitter, said control unit being arranged to affect the transmission of waves by said wave transmitter to enable said processor to determine the distance between a wave-transmission and reception point and the ground based on an analysis of the waves transmitted by said wave transmitter and the waves received by said wave receiver.

5. The vehicle of claim 1, wherein said processor is arranged to determine the speed of travel of the vehicle on the ground based on the time difference between the transmitted waves and the received waves.

6. The vehicle of claim 1, further comprising:
   storage means defining a compartment in which product to be distributed is stored;
   a distribution mechanism for distributing the product;
   a driving mechanism for conveying the product from said storage means to said distribution mechanism at a controlled rate; and control means for controlling said driving mechanism, said ground speed sensor being coupled to said control means to provide the detected speed of travel of the vehicle to said control means such that said control means controls said driving mechanism based on the detected speed of travel of the vehicle.

7. The vehicle of claim 6, further comprising a user interface coupled to said control means for enabling input of commands to said control means such that said control means controls said driving mechanism based in part on the commands input via said user interface.

8. The vehicle of claim 7, wherein said user interface comprises operator settings or input means.

9. The vehicle of claim 7, wherein said user interface comprises a display coupled to said control means for displaying information about the product.

10. The vehicle of claim 6, wherein said control means is arranged to calculate the rate at which said driving mechanism conveys product from said storage means to said distribution mechanism based on the detected speed of travel of the vehicle.

11. The vehicle of claim 6, wherein said driving mechanism comprises a metering wheel rotatable at an adjustable rate and arranged in communication with said storage compartment to meter the product into said distribution mechanism, said control means being arranged to control the rotation rate of said metering wheel.

12. The vehicle of claim 6, further comprising a frame, said storage means, said distribution mechanism, said driving mechanism and said processor being arranged on said frame.

13. The vehicle of claim 6, wherein said distribution mechanism comprises at least one singulator disk arranged in communication with said storage compartment to meter the product into said distribution mechanism, said control means being arranged to control the rotation rate of said at least one singulator disk.

14. The vehicle of claim 6, wherein said distribution mechanism comprises a pump having a variable output flow rate and arranged in communication with said storage compartment to vary the flow of the product into said distribution mechanism, said control means being arranged to control the output flow rate of said pump.

15. The vehicle of claim 6, further comprising a compass coupled to said control means to provide a directional heading of the vehicle to said control means such that said control means controls said driving mechanism based on the directional heading of the vehicle.

16. The vehicle of claim 1, wherein said ground speed sensor further comprises compensation means for eliminating the influence of a pitching angle of the vehicle on the detection of the speed of travel of the vehicle.

17. The vehicle of claim 1, wherein said wave transmitter is arranged to transmit waves which impact the ground at an angle θ and said processor is arranged to calculate the speed of the vehicle in the direction that the waves are transmitted (V cos θ) and then calculate the speed of travel of the vehicle in a horizontal plane (V) by dividing the speed of the vehicle in the direction that the waves are transmitted by cos θ.

18. The vehicle of claim 1, wherein said wave transmitter is arranged to transmit electromagnetic waves at a frequency f and which impact the ground at an angle θ and said processor is arranged to calculate the speed of the vehicle in the direction that the waves are transmitted (V cos θ) and then calculate the speed of travel of the vehicle in a horizontal plane (V) by dividing the speed of the vehicle in the direction that the waves are transmitted by 2f cos θ and multiplying by the electromagnetic wave propagation velocity.

19. The vehicle of claim 1, wherein said wave transmitter and said wave receiver are collocated in a common sensor.

20. The vehicle of claim 19, further comprising a frame and mounting means for movably mounting said sensor to said frame such that said sensor moves in a curve about a center of rotation of the vehicle upon pitching of the vehicle whereby pitching of the vehicle changes rotates said sensor changing an effective transmission angle of said sensor relative to the ground.

21. The vehicle of claim 20, further comprising first measuring means for measuring the pitching angle of the vehicle and second measuring means for providing a reference angle for determining pitching of the vehicle, said first and second measuring means being coupled to said processor such that said processor determines the pitching of the vehicle relative to the ground based on the pitching angle measured by said first measuring means and the reference angle measured by said second measuring means.

22. The vehicle of claim 21, wherein said second measuring means comprise a gravity or tilt sensor.

23. The vehicle of claim 1, further comprising a two antenna GPS receiver for enabling measurement of the pitching angle of the vehicle relative to the ground.

24. The vehicle of claim 1, wherein said wave transmitter is arranged to transmit waves at an known angle to the ground, said processor being arranged to calculate the Doppler velocity and distance that the transmitted waves travel to the ground and return and calculate the pitching angle of the vehicle relative to the ground based on the known angle of transmission of the waves, the calculated Doppler velocity and the calculated distance of travel of the waves.

25. The vehicle of claim 1, further comprising a detection system for detecting contact between a rear portion of the vehicle and the ground, said processor being arranged to provide the speed of travel of the vehicle on the ground only when said detection system detects contact between the rear portion of the vehicle and the ground.

26. The vehicle of claim 1, further comprising a frame, said wave transmitter being mounted on said frame to transmit waves at an angle of about 35° to the ground when said frame is level.

27. The vehicle of claim 1, further comprising a frame, said wave transmitter and said receiver being mounted on said frame at a height of at least 1 meter from a bottom of the vehicle.

28. The vehicle of claim 1, wherein said processor comprises means for compensating for slipping of a wheel of the vehicle.

29. The vehicle of claim 1, further comprising a display coupled to said ground speed sensor for displaying the detected speed of travel of the vehicle.

30. The vehicle of claim 1, further comprising a temperature sensor coupled to said processor and arranged to measure ambient temperature, said processor being arranged factor in the ambient temperature as measured by said temperature sensor in the determination of the speed of travel of the vehicle.

31. The vehicle of claim 1, further comprising a barometric sensor coupled to said processor and arranged to measure atmospheric pressure, said processor being arranged factor in the atmospheric pressure as measured by said barometric sensor in the determination of the speed of travel of the vehicle.

32. The vehicle of claim 1, further comprising an anemometer coupled to said processor and arranged to measure wind speed, said processor being arranged factor in the wind speed as measured by said anemometer in the determination of the speed of travel of the vehicle.

33. The vehicle of claim 1, further comprising a bulldozer body, said wave transmitter and said wave receiver being arranged on said bulldozer body.

34. The vehicle of claim 1, wherein said wave transmitter comprises at least one laser.

35. The vehicle of claim 1, wherein said wave transmitter comprises a pulsed laser.

36. The vehicle of claim 1, wherein said wave transmitter comprises a continuous laser beam directing infrared light to scan in a line and transmitter control means for controlling said scanning laser beam of infrared light such that the infrared light traverses an area of the ground near the vehicle.

37. The vehicle of claim 36, wherein said wave receiver comprises a single pixel receptor.

38. The vehicle of claim 1, wherein said wave receiver comprises at least one of a CCD array, a CMOS array and an HDRC camera, a dynamic pixel camera and an active pixel camera.

39. The vehicle of claim 1, wherein said wave transmitter is arranged to transmit ultrasonic waves and said wave receiver is arranged to receive ultrasonic waves.

40. The vehicle of claim 1, wherein said wave transmitter is arranged to transmit radar waves and said wave receiver is arranged to receive radar waves.

41. The vehicle of claim 1, wherein said wave transmitter is arranged to transmit infrared waves and said wave receiver is arranged to receive infrared waves.

42. The vehicle of claim 1, wherein said wave transmitter is arranged to transmit electromagnetic waves and said wave receiver is arranged to receive electromagnetic waves, said processor being arranged to determine both the distance between a wave transmission and reception point and the ground based on a phase difference or time of flight between the transmitted and received waves and the speed of travel of the vehicle on the ground based on the Doppler velocity.

43. The vehicle of claim 42, wherein said wave receiver comprises a notch filter for filtering light other than infrared light emitted by said wave transmitter.

44. The vehicle of claim 42, wherein said wave receiver comprises a light valve.

45. The vehicle of claim 1, wherein said processor is arranged to determine the speed of travel of the vehicle on the ground based on a plurality of time intervals between transmission of waves by said wave transmitter and reception of waves by said wave receiver.

46. The vehicle of claim 1, wherein said processor is arranged to determine the speed of travel of the vehicle on the ground based on a measurement of the Doppler frequency.

47. The vehicle of claim 1, wherein said wave transmitter and said wave receiver are collocated in a common sensor, further comprising:
a frame, said sensor being movably mounting to said frame such that said sensor moves in a curve about a center of rotation of the vehicle upon pitching of the vehicle whereby pitching of the vehicle changes rotates said sensor changing an effective transmission angle of said sensor relative to the ground;
first measuring means for measuring the pitching angle of the vehicle;
second measuring means for providing a reference angle for determining pitching of the vehicle, said first and second measuring means being coupled to said processor such that said processor determines the pitching of the vehicle relative to the ground based on the pitching angle measured by said first measuring means and the reference angle measured by said second measuring means;

an additional wave transmitter and wave received collocated in an additional common sensor, said additional common sensor being movably mounting to a side of said frame such that said additional common sensor moves in a curve about a center of rotation of the vehicle upon roll of the vehicle whereby roll of the vehicle changes rotates said additional common sensor changing an effective transmission angle of said additional common sensor relative to the ground;
third measuring means for measuring the roll angle of the vehicle;
fourth measuring means for providing a reference angle for determining roll of the vehicle, said third and fourth measuring means being coupled to said processor such that said processor determines the roll of the vehicle relative to the ground based on the roll angle measured by said third measuring means and the reference angle measured by said fourth measuring means; and
whereby an inertial measurement unit is formed by said first, second, third and fourth measuring means, said compass, said wave transmitter, said wave receiver and said processor.

48. A vehicle, comprising
wave emitting means arranged on the vehicle for emitting waves at an angle toward the ground near the vehicle, and
receiver means arranged on the vehicle for receiving waves reflected from the ground near the vehicle;
a vehicular system adapted to be controlled or adjusted based on the velocity of the vehicle relative to the ground; and
a processor coupled to said wave emitting means, said receiver means and said vehicular system for determining the velocity of the vehicle relative to the ground and the distance to the ground based on the transmission of waves by said wave emitting means and reception of waves by said receiver means and using the determined distance to correct the determined velocity of the vehicle relative to the ground and controlling the vehicular system based on the corrected velocity,
the waves being transmitted by said wave emitting means in pulses or modulated such that said processor is able to determine the distance between a wave-transmission and reception point and the ground and the velocity of the vehicle based on analysis of the waves transmitted by said wave emitting means and the waves received by said wave receiver means.

49. The vehicle of claim 48, wherein said processor is arranged to measure time between transmission of the waves by said wave emitting means and reception of the waves by said receiver means.

50. The vehicle of claim 48, further comprising a control unit for controlling said wave emitting means, said control unit being arranged to direct said wave emitting means to emit waves in pulses.

51. The vehicle of claim 48, further comprising a control unit for controlling said wave emitting means, said wave emitting means including a modulator for enabling the transmission of modulated waves, said control unit being arranged to control said modulator such that said wave emitting means transmits modulated waves.

52. The vehicle of claim 48, further comprising a control unit for controlling said wave emitting means, said control unit being arranged to affect the transmission of waves by said wave emitting means to enable said processor to determine the distance between a wave-transmission and reception point and the ground based on an analysis of the waves transmitted by said wave emitting means and the waves received by said receiver means.

53. The vehicle of claim 48, wherein said wave emitting means is arranged to transmit ultrasonic waves and said receiver means is arranged to receive ultrasonic waves, said processor being arranged to determine both the distance between a wave transmission and reception point and the ground based on a time of flight between the transmitted and received waves and the speed of travel of the vehicle on the ground based on the Doppler velocity.

54. The vehicle of claim 48, wherein said wave emitting means is arranged to transmit electromagnetic waves and said receiver means is arranged to receive electromagnetic waves, said processor being arranged to determine both the distance between a wave transmission and reception point and the ground based on a phase difference or time of flight between the transmitted and received waves and the speed of travel of the vehicle on the ground based on the Doppler velocity.

55. An agricultural product distribution vehicle, comprising: storage means for storing agricultural product to be distributed;

conveying means for conveying agricultural product from said storage means to the ground; and control means for controlling a rate of transfer of the agricultural product from said storage means through said conveying means for distribution to the ground, said control means including an operation system for automatically controlling the transfer of agricultural product at a rate dependent on the product to be distributed and the determined average needs of the field and the vehicle ground speed and a user interface for inputting operator settings related to the product and field properties; and a ground speed sensor arranged to detect the speed of travel of the vehicle on the ground, said ground speed sensor comprising a wave transmitter arranged to transmit waves toward the ground, a wave receiver arranged to received waves reflected from the ground after transmission by said wave transmitter, and a processor coupled to said wave transmitter and said wave receiver and arranged to determine the speed of travel of the vehicle on the ground based on the waves transmitted by said wave transmitter and the waves received by said wave receiver, the waves being transmitted by said wave transmitter in pulses or modulated such that said processor is able to determine the distance between a wave-transmission and reception point and the ground and the velocity of the vehicle based on analysis of the waves transmitted by said wave transmitter and the waves received by said wave receiver.

56. The vehicle of claim 55, further comprising a control unit for controlling said wave transmitter, said control unit being arranged to direct said wave transmitter to transmit waves in pulses.

57. The vehicle of claim 55, further comprising a control unit for controlling said wave transmitter, said wave transmitter including a modulator for enabling the transmission of modulated waves, said control unit being arranged to control said modulator such that said wave transmitter transmits modulated waves.

58. The vehicle of claim 55, further comprising a control unit for controlling said wave transmitter, said control unit being arranged to affect the transmission of waves by said wave transmitter to enable said processor to determine the distance between a wave-transmission and reception point and the ground based on an analysis of the waves transmitted by said wave transmitter and the waves received by said wave receiver.

59. The vehicle of claim 55, wherein said wave transmitter is arranged to transmit ultrasonic waves and said wave receiver is arranged to receive ultrasonic waves, said processor being arranged to determine both the distance between a wave transmission and reception point and the ground based on a time of flight between the transmitted and received waves and the speed of travel of the vehicle on the ground based on the Doppler velocity.

60. The vehicle of claim 55, wherein said wave transmitter is arranged to transmit electromagnetic waves and said wave receiver is arranged to receive electromagnetic waves, said processor being arranged to determine both the distance between a wave transmission and reception point and the ground based on a phase difference or time of flight between the transmitted and received waves and the speed of travel of the vehicle on the ground based on the Doppler velocity.

* * * * *